United States Patent [19]
Check, Jr.

[11] 4,251,874
[45] Feb. 17, 1981

[54] ELECTRONIC POSTAL METER SYSTEM

[75] Inventor: Frank T. Check, Jr., Orange, Conn.

[73] Assignee: Pitney Bowes Inc., Stamford, Conn.

[21] Appl. No.: 950,302

[22] Filed: Oct. 16, 1978

Related U.S. Application Data

[63] Continuation-in-part of Ser. No. 846,526, Oct. 28, 1977, abandoned.

[51] Int. Cl.[3] ....................... G06F 15/28; G01G 23/42
[52] U.S. Cl. .................................... 364/900; 364/466; 177/25
[58] Field of Search ............... 364/900, 466, 467, 107; 177/25

[56] References Cited

U.S. PATENT DOCUMENTS

| | | | |
|---|---|---|---|
| 3,635,297 | 1/1972 | Salava | 364/466 X |
| 3,692,988 | 9/1972 | Dlugos et al. | 364/466 |
| 3,890,492 | 6/1975 | Manduley et al. | 364/466 |
| 4,051,913 | 10/1977 | Gudea | 364/466 X |
| 4,084,242 | 4/1978 | Conti | 364/466 |
| 4,093,999 | 6/1978 | Fuller et al. | 364/900 |
| 4,131,946 | 12/1978 | Dlugos | 364/466 |
| 4,139,892 | 2/1979 | Gudea et al. | 364/466 X |
| 4,144,550 | 3/1979 | Donohue et al. | 364/107 |

*Primary Examiner*—Edward J. Wise
*Attorney, Agent, or Firm*—David E. Pitchenik; William D. Soltow, Jr.; Albert W. Scribner

[57] ABSTRACT

An electronic postal meter system is separated into a meter unit and an input/output control unit. The two units are linked by a communications link which preferably uses light transmitting fibers to transmit data and instructions. The meter unit is used to process and store only that data which pertains to the critical accounting functions of the meter or to the control of the printer driven by the electronics control within the meter unit. Less critical functions, such as zip-to-zone conversions, are restricted to the less secure control unit. By restricting the meter unit to highly critical data and by enclosing only the meter unit in a secure housing, the overall security of the meter system is enhanced. Novel failure detect circuitry for a printer setting detector array and a novel event-indicating signal generator circuit are disclosed. The significant routines employed in the operation of the meter system are described.

21 Claims, 53 Drawing Figures

| | BIT 3 | BIT 2 | BIT 1 | BIT 0 |
|---|---|---|---|---|
| 1D | RMRS TIME OUT | INIT TIME OUT | NOT USED | NOT USED |
| 1E | ASC+DESC ≠ CONTROL SUM | MEMORY ERROR | PHOTO CELLS (READ) | INTERRUPT ERROR |
| 1F | DESC < POST | DESC < $100 | ALWAYS ON | ALWAYS OFF |

ELECTRONIC POSTAL METER SYSTEM

RELATED APPLICATIONS

This case is a continuation-in-part of application Ser. No. 846,526 filed Oct. 28, 1977 now abandoned.

BACKGROUND OF THE INVENTION

The present invention relates to an electronic postal meter and more particularly to an electronic meter which is highly secure from tampering involving the data processing capabilities of the meter.

Postal meters in use today are, almost universally, mechanical devices in which postage values are set, printed, and accounted for by means of mechanical assemblies such as linkages and registers. Such meters include a mechanical ascending register which provides a record of the amount of postage printed over the life of the meter. The meter also includes a mechanical descending register which provides a record of the amount of postage remaining for use in the meter. To prevent tampering with the critical functions of such mechanical meters, a number of different mechanical interlocks have been used. Such interlocks prevent a user from printing postage amounts without changing the contents of the ascending and descending registers. Similarly, such interlocks make it nearly impossible for a user, without leaving telltale signs, to reset the descending register himself to "recharge" the postal meter.

Electronic postal meters have been developed. In such meters, a computer device such as a microprocessor may calculate postage amounts and cause an electrically driven printer to be set to the proper postage amount. All data, including critical accounting data, is stored in electrical format in memory units.

The advantages of electronic postal meters are known. Such meters, having fewer mechanical parts, should last longer and prove more reliable than mechanical meters. Furthermore, electronic postal meters are extremely versatile devices which may perform functions that cannot practically be performed in a purely mechanical meter. For example, an electronic postal meter may include logic circuitry for determining the destination zone of a package given the zip code of the point of origin and the zip code of the point of destination. Moreover, such meters can generally be more readily changed to accommodate changes in the postal regulations or rates. Also, such meters are generally capable of performing at high speeds, a necessity for high volume mailing operations.

While electronic postal meters have many advantages, they also present certain problems which had already been solved in the widely-used mechanical postal meters. The use of electronics to perform the necessary meter functions renders obsolete many of the mechanical interlocks formerly developed to prevent tempering with the meter contents. Naturally, this increases the risk that a user knowledgeable in the electronic technologies employed in a postal meter may find a way to print postage amounts without these amounts being registered in the descending or ascending registers. Similarly, a knowledgeable and unscrupulous user may attempt to develop a method for "recharging" the meter without the normally necessary payment to the Post Office.

Another problem which can arise with electronic postal meters is that their proper operation depends upon the proper functioning of many components which cannot be readily inspected. For the most part, these components are "binary" in nature; that is, their output is either on or off. A failed component may, unless noticed, provide an unchanging output which would be interpreted erroneously by the microprocessor.

Still another problem with electronic postal meters is that such meters will not necessarily be disabled upon a malfunction or failure in a particular section or upon the occurrence of certain events. The meter will continue to function, albeit perhaps improperly, until instructed to stop.

SUMMARY OF THE INVENTION

The present invention is an electronic postal meter which is highly secure from tampering. The system includes a meter section which has a postage printer and an electronic control unit for setting the postage printer and for processing and storing postal accounting and meter setting information. The meter section further includes a secure housing which encloses the postage printer and the electronic control unit to prevent tampering with either. The system also includes a control unit for processing and storing information other than postal accounting or meter setting information. A communications link is provided between the meter section and the control unit.

By isolating that section of the system including the printer and the critical accounting and meter setting functions from the remaining functions of the meter, the access to the critical accounting and meter setting circuitry can be severely restricted without restricting access to the less critical sections of the meter. The less critical sections may include such things as postage tables or the like, which can thus be more readily altered without affecting the accounting information or meter setting information isolated within the secured housing. Thus, a meter serviceman could update postage tables or computation sections without first having to call in a Postal Service representative.

In one embodiment, the meter verifies the proper operation of the detectors upon which it relies by temporarily driving parallel amplifier inputs to predetermined signal states while checking the outputs of the amplifiers for the presence of both of two possible signal states. Unless both signal states are detected, the meter operation will be inhibited.

In stil another embodiment, an event-indicating signal generator circuit is incorporated into the meter. This circuit includes means for generating at least one event-indicating signal upon the occurrence of a predetermined physical event. Each different event-indicating signal is applied to a different data input terminal of the processor so that the processor can respond appropriately to the particular type of event.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
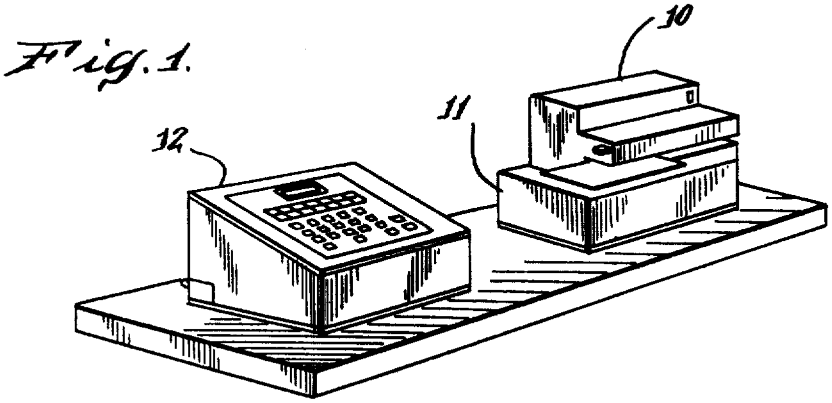
FIG. 1 is a perspective view of the housings for one embodiment of an electronic postal meter system into which the present invention may be incorporated.

Referring now to FIG. 1, the meter section of an electronic postal meter system may be a relatively small unit 10 which, in one embodiment, contains electronic circuitry for performing necessary postal calculations for storing critical accounting data and for controlling a postage printer. Meter unit 10 is controlled by a control unit 12 which preferably has a segmented numeral display, backlighted legend panels and a keyboard for entering data and commands into the meter unit. The meter unit 10 rests on a relatively larger base 11 which will, according to a preferred embodiment of the invention, include a power supply such as an AC to DC converter circuit for converting 110 volt alternating line voltage to a positive or negative DC voltage suitable as power supply voltage for the logic circuitry contained in meter unit 10. The connections between the AC to DC converter in base 11 and the meter unit 10 can be conventional, detachable connectors which permit the meter to be removed from the base for servicing. Preferably, a monitored mechanical interlock is used to secure the meter to the base. When such an interlock is released in order to remove the meter from the base, a signal is generated which can disable the meter (i.e., assure preservation of its contents) before the meter is actually separated from its base. This signal is generated within an event-indicating signal generator circuit described in detail later.

Figure 2:
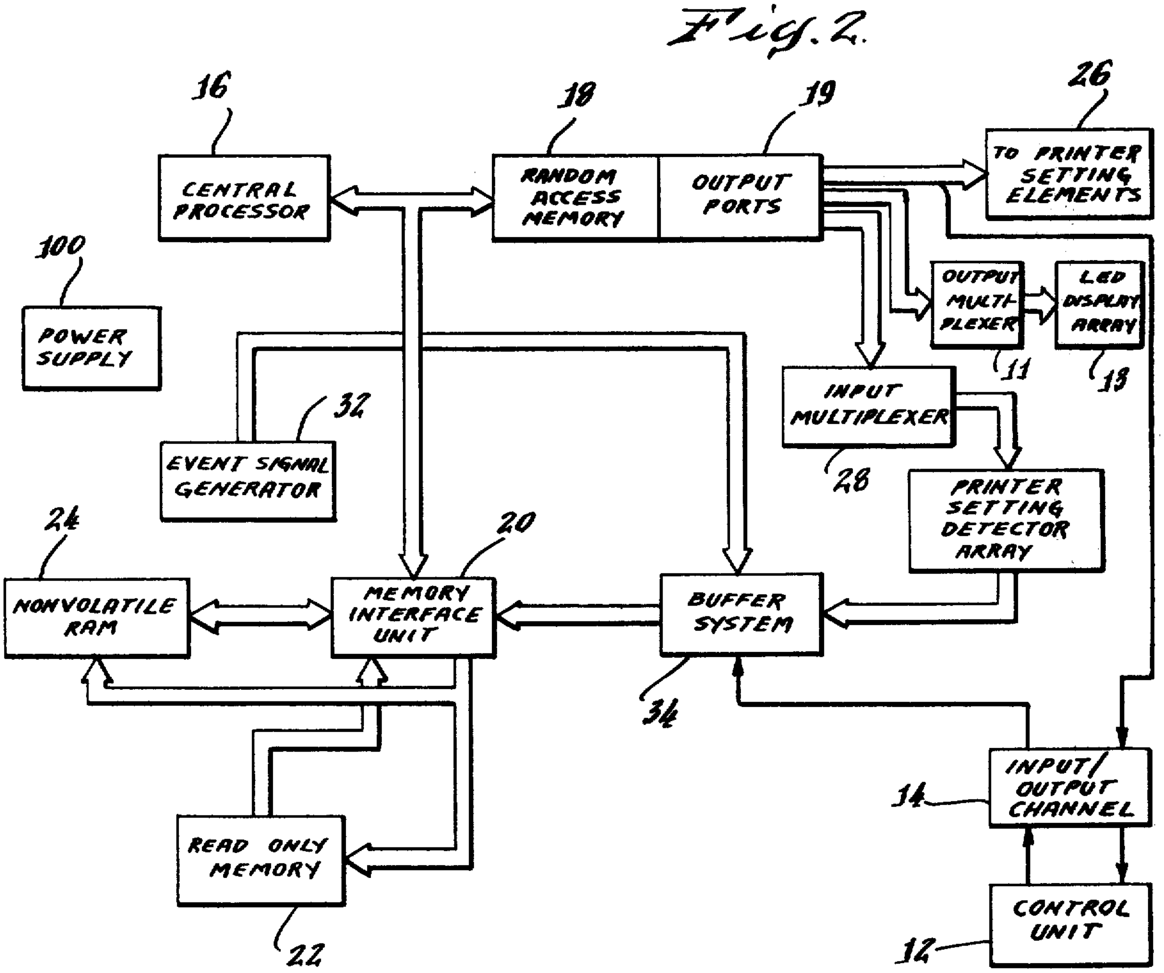
FIG. 2 is a basic block diagram of an electronic postal meter incorporating the present invention.

Referring to FIG. 2, circuitry for the meter unit 10 may be linked to the remote control unit 12 through a communications link consisting of input/output channel 14. The meter unit 10 accepts data and instructions sent to it through channel 14 from the control unit 12. In turn, the meter unit 10 provides signals to the control unit 12 through channel 14 representing the results of calculations, requests for instructions and error messages.

Control unit 12 may include a keyboard for remotely entering data and instructions into the system and a printer or display for presenting the results of calculations, instruction requests and error messages to an operator. While unit 12 is represented as a single device, the input and output sections of unit 12 obviously could be physically independent units. For example, the output section might be a printer or CRT display while the input section might be a keyboard terminal. Unit 12 might also be a larger host computer which would control meter unit 10 as one component of a more complex mail-handling system.

A central processor unit 16 in the meter communicates with random access memory 18, output ports 19 associated with the random access memory 18 and with a memory interface unit 20 which generally controls the flow of data and instructions between central processor unit 16, read-only memory 22 and a special purpose, non-volatile random access memory 24. A power supply circuit 100, to be described in detail later, provides power for these and other components. In a preferred embodiment of the invention, the components may be commercially-available solid state devices. For example, central processor unit 16, random access memory 18 and read-only memory 22 may be, respectively, 4040, 4002 and 4001 chips available in a MCS-40 Micro Computer Set from Intel Corporation of Santa Clara. California. These particular chips employ negative logic; that is, a binary "1" is represented by a negative voltage such as −15 volts whereas a binary "0" is represented by a more positive voltage such as zero voltage or ground.

Output signals from the central processor unit 16 are transmitted through output ports 19, which share input/output data paths with random access memory 18, to printer setting elements 26, to an input multiplexer 28 which controls a printer setting detector array 30 to the input/output channel 14, and to an output multiplexer 11 which controls an LED display array 13.

Inputs to the meter unit include both internal and external inputs in a preferred embodiment. The external inputs are provided by control unit 12 through channel 14 to a buffer or input port system 34. Internal inputs representing the status of components of a printer setting device are provided by the printer setting detector array 30 under the control of multiplexer 28. Multiplexer 28 may be a conventional shift register multiplexer device such as a 4003 chip available from Intel Corporation. Additional internal inputs are provided by an event-indicating signal generator circuit 32. The outputs of signal generator circuit 32 are applied to buffer system 34. Outputs from buffer system 34 are applied to the memory interface unit 20.

The central processor unit 16 performs calculations using data provided through the input buffer system 34 and instructions stored in read-only memory 22. Read-only memory 22 serves as a program store for the routines and subroutines required within meter unit 10. Random access memory 18 provides a working memory for the central processor unit 16. The random access memory 18 is a volatile device; i.e., data stored in the memory is lost upon loss of power to the meter. To preserve critical accounting data, such as the contents of the ascending and descending registers, the non-volatile random access memory 24 has been provided. Non-volatile memory 24 is powered with a battery back-up unit to permit the contents of the memory 24 to be saved in the event of a loss of power in meter unit 10.

Figure 3:
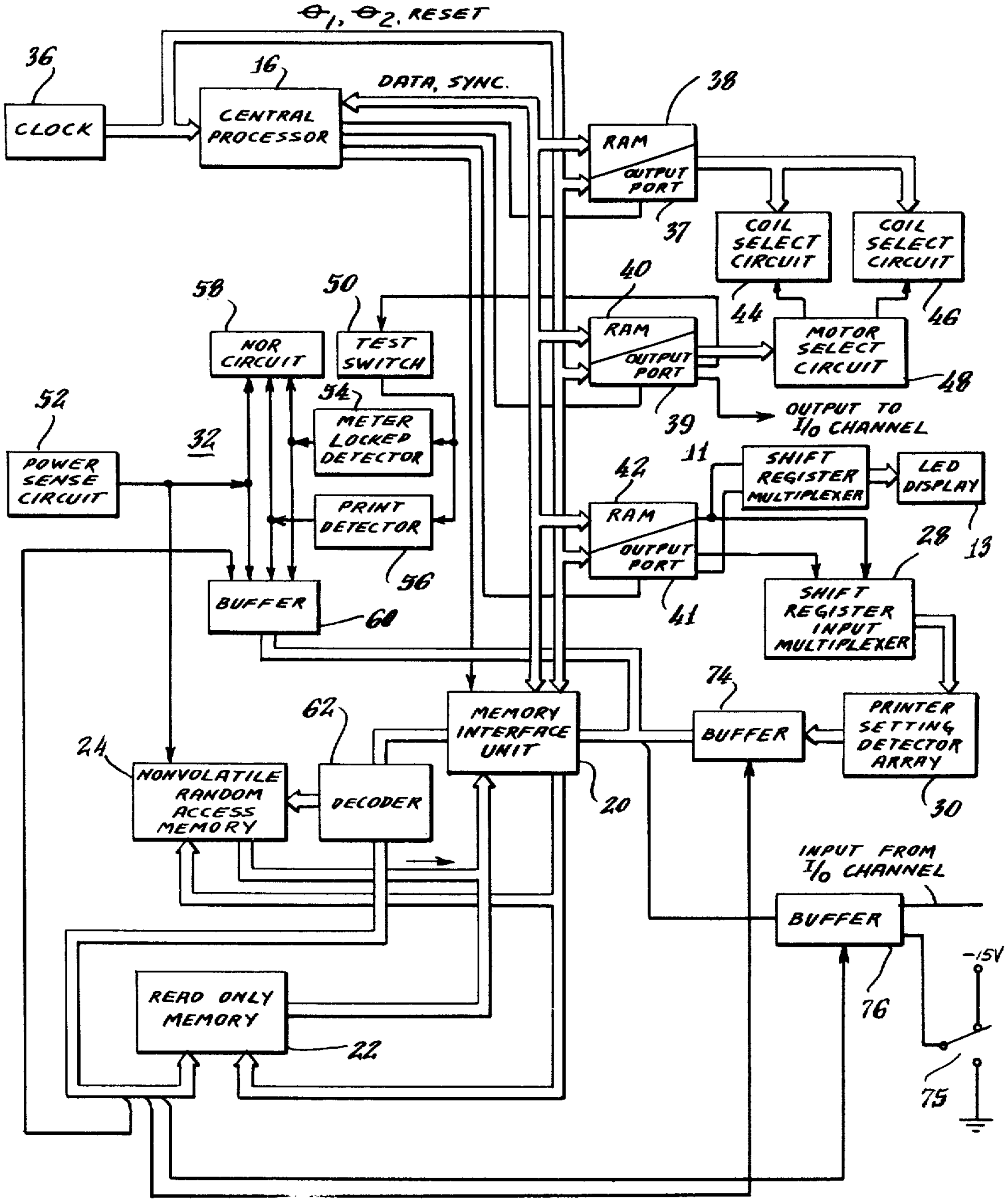
FIG. 3 is a more detailed block diagram of the meter unit of the electronic postal meter system.

Further details as to the organization of the meter unit 10 appear in the description relating to FIG. 3. The operations of central processor unit 16 are timed by a clock circuit 36 which supplies two trains of non-overlapping clock pulses $\theta 1$ and $\theta 2$ and a reset signal. These signals are applied to the central processor unit 16, to memory interface unit 20 and to a number of random access memory units 38, 40, 42, which collectively comprise random access memory 18.

Outputs from an output port 37 associated with random access memory unit 38 are applied to a pair of coil select circuits 44, 46, which are used in setting one type of postage printing device. The coil select circuits 44 and 46 are connected to a motor select circuit 48 which, under the control of outputs from an output port 39 associated with random access memory unit 40, determines which of the two motors will be energized. Details of the coil select circuits 44 and 46 and the motor select circuit 48 are provided in a following section of this specification. Another output from output port 39 controls a test switch 50, which is part of the signal generator circuit 32.

The signal generator circuit 32 includes a power level sensing circuit 52, a meter locked detector 54 and a print detector 56. The power level sensing circuit 52 monitors the output of the power supply for the postal meter and generates an interrupt signal whenever the onset of a power failure is detected. This interrupt signal triggers a computer routine in which the contents of the ascending and descending registers are updated in the non-volatile random access memory 24 bofore the meter shuts down.

The print detector circuit 56 includes a photoelectric device for sensing the start of a mechanical printing operation by the meter. This information is used for updating the ascending and descending registers of the meter by the amount of postage being printed. The meter locked detector 54 includes a photoelectric device which senses whether the meter, itself a relatively small unit, remains attached to its original, relatively large base. If mechanical latches are opened in anticipation of removing the meter from the base, an output from detector 54 causes a signal to be generated. This signal is employed to disable the meter.

The outputs of power level sensing circuit 52, meter locked detector circuit 54 and print detector circuit 56 are applied to a logic buffer 60. Since the response of the central processor unit 16 will be different for different ones of the event-indicating signals, the signals must be applied as separate internal inputs to the system through the logic buffer 60. A signal appearing on the output of buffer 60 is applied to memory interface unit 20 which, in response to a command from the central processor unit 16, transfers the signal to the processor for decoding.

The memory interface unit 20 provides outputs to a decoder circuit 62. The decoder circuit 62 is used to select whether non-volatile random access memory 24, read-only memory unit 22 or one of a number of input logic buffers 60, 74, 76 is to be enabled.

One input to buffer 76 is provided by a switch 75 which can cause either a binary 1 (−15 v) or a binary 0 (0 volts) to be applied to the buffer 76. Another input to buffer 76 is provided from the input/output channel 14. Outputs to the input/output channel 14 are provided by output port 39 associated with random access memory 40. Logic buffer 74 receives signals from printer setting detector array 30. There are more detectors in the detector array than logic buffer 74 can accommodate at one time. A shift register input multiplexer 28, operating under the control of signals provided through the output port 41 multiplexes the inputs from detector array 30 to logic buffer 74. Multiplexer 28 may be a 4003 device available from Intel Corporation.

In accordance with the present invention, the entire meter unit disclosed in FIG. 3 is contained within a secure housing which cannot be entered other than by an authorized representative of the U.S. Postal Service. The meter unit stores and processes only critical accounting data and printer setting information. Since other information, such as postage rates or zip-zone conversion tables, are not stored within the meter unit 10 but rather within the control unit 12, critical financial or printing circuits can be highly secured. A lower degree of security may be accorded to information which is stored within the control unit 12 since a person who tampers with information other than accounting data or printer setting data cannot bring about improper operation of the meter printer. Moreover, because the information which is stored and processed within the meter unit is not changed simply because of a change in governmental regulations or rates, the lower degree of security accorded all other information makes it easier for the manufacturer or service technician to "update" postal rate tables or zip-zone calculations without the inconvenience and problems which attend entry into the high security sections of a meter.

Thus, by isolating the accounting data and calculations and the printer setting information in a highly secured unit and by excluding all less-critical data, the meter security and maintainability are enhanced.

Figure 4:
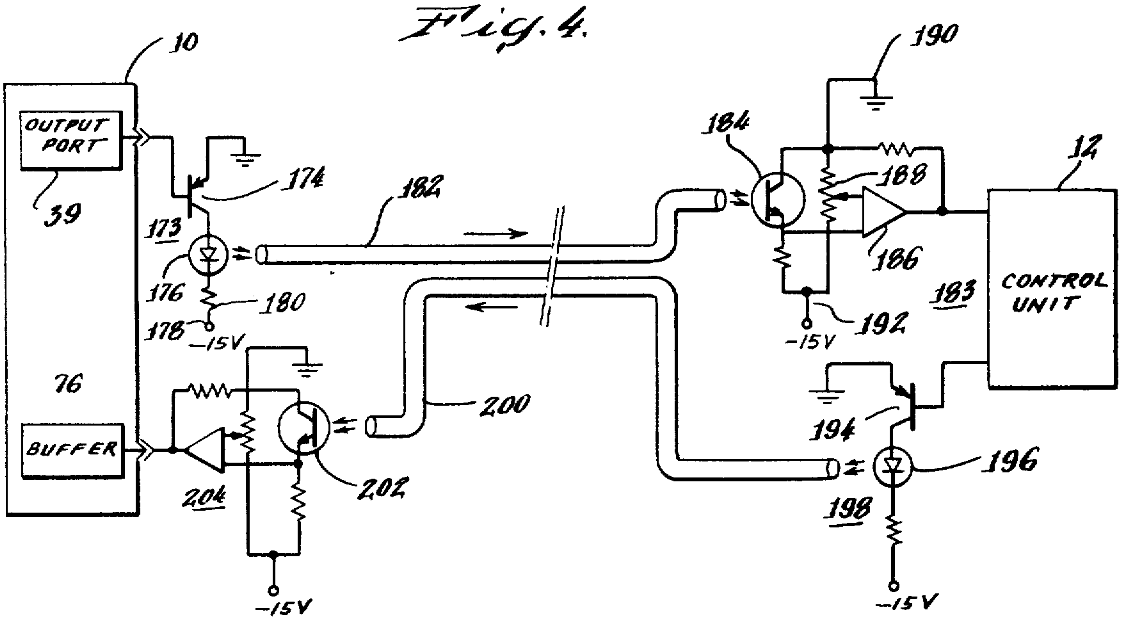
FIG. 4 is a schematic diagram of a preferred embodiment of a noise-rejecting input/output channel linking the meter unit to the control unit of the system.

The security of the meter unit 10 is enhanced by means of the input/output channel used. This input-/output channel is described in detail with reference to FIG. 4. To simplify the drawing, meter unit 10 is shown as including only output port 39 and input buffer 76. Binary signals to be transmitted to the output section of control unit 12 from postal meter 10 are applied in serial fashion to an electrical-to-optical transducer 173. The signals are applied at the base terminal of a transistor 174 having a grounded emitter and a collector connected to the anode of a light-emitting diode 176. The cathode of diode 176 is connected to a −15 volt source 178 through a current-limiting resistor 180.

The light-emitting diode 176 is adjacent one end of a first light-transmitting fiber 182, the opposite end of which is adjacent a phototransistor 184 in a first optical-to-electrical transducer circuit 183. The emitter of phototransistor 184 is connected to one input of a comparator amplifier 186, the second input to which is provided through a voltage divider 188 connecting a ground terminal to a −15 volt source 192. The input to the comparator amplifier 186 provided through the voltage divider 188 establishes a threshold voltage which the output of phototransistor 184 must exceed before the transistor output voltage will cause a change in the output of comparator amplifier 186. Thresholding reduces the chance that noise voltages generated within meter unit 10 or either of the transducers 173 or 183 will be wrongly interpreted as signal voltages.

Binary signals representing data or instructions to be input to the meter unit 10 from the input section of control unit 12 are applied to a second electrical-to-optical transducer circuit 198. The signals are applied at the base terminal of a transistor 194 in circuit with a light-emitting diode 196 adjacent one end of a second light transmitting fiber 200. The opposite end of fiber 200 is adjacent a phototransistor 202 in a second optical-to-electrical transducer 204. Transducer 204, which is identical in construction to transducer 183, converts the optical signals to electrical signals which are applied to one input of buffer circuit 76 of meter unit 10.

Since the input-output information transmitted through the channel 14 is transmitted in the form of optical signals and since extraneous electric fields cannot induce noise voltages in such optical fibers, the channel 14 effectively resists induction of such noise voltages. Of course, light-transmitting fibers 182 and 200 must be coated or otherwise shielded from extraneous light.

Moreover, because the maximum output of the light emitting diodes is limited, even a normally destructive voltage surge or static electrical discharge at the control unit 12 cannot be transmitted at destructive levels to the meter unit 10. Even a direct short circuit across one of the electrical-to-optical transducers will not be destructive, since the output of the optical-to-electrical transducer is also inherently limited regardless of the intensity of the optical input.

The information transmitted in either direction over channel 14 is transmitted one bit at a time. In one embodiment, a binary 0 is represented by short light pulse while a binary 1 is represented by a longer light pulse. Successive pulses are separated by periods of time during which the light-emitting diode is de-energized; i.e., produces no light.

Data is transmitted to and from the meter over channel 14 in 64 bit sequences consisting of 16 4 bit words. While some messages do not require all 16 words, the fixed message length was preferred over a variable message length because of the greater ease with which messages of fixed length could be handled and stored within the system.

Critical accounting data, such as the contents of the ascending and descending registers are updated and stored in the non-volatile random access memory 24. When the power supply voltage falls below a predetermined level, the signal provided by power level sensing circuit in signal generator circuit 32 will ultimately disable the meter while critical accounting data is preserved.

Figure 5:
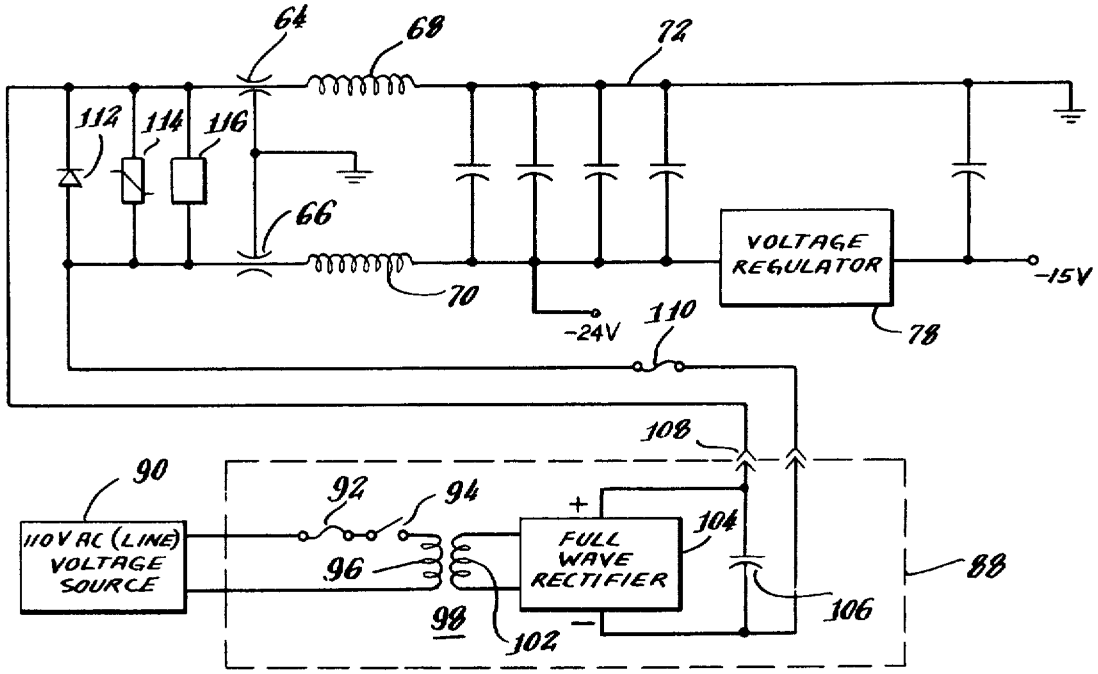
FIG. 5 is a detailed schematic diagram of a preferred circuit for protecting against abnormal variations of a supply voltage.

While the operation of power level sensing circuit 52 is normally adequate to preserve the critical accounting data in the typical loss of power situation, more complete protection against data loss or damage due to abnormal variations in the supply voltage is provided in the circuit described with reference to FIG. 5. The protective circuit to be described operates in combination with an AC to DC converter 88 which accepts an alternating current input from a line voltage source 90. A fuse 92, a switch 94 and the primary coil 96 of a step-down transformer 98 are connected in series across the terminals of the line voltage source 90. A secondary coil 102 of transformer 98 provides a stepped down alternating voltage to a full wave rectifier circuit 104 having a filter capacitor 106 connected across its output terminals. The AC to DC converter 88 is located in the base 11 of the meter and is connected to the protective circuitry within meter unit 10 through conventional, detachable connectors 108, referred to hereafter as power supply terminals.

A circuit interrupter 110, which may be a conventional fuse, is connected in series with one of the leads from the power supply terminals 108. A diode 112, a metal oxide varistor 114 and an overvoltage detector 116 are connected in parallel with one another across the terminals 108; that is, across the output terminals of the full wave rectifier 104 in AC to DC converter 88. Feed-through capacitors 64 and 66 are connected in series with the leads from terminals 108. A pair of inductances 68 and 70 are connected in series with the feed-through capacitors 64 and 66, respectively. A set 72 of filter capacitors is connected across the inductances 68 and 70.

A conventional voltage regulator circuit 78 on the output side of inductances 68 and 70 acts on the generated logic level voltage to establish a required, second logic level voltage. For example, the input to voltage regulator 78 may be a minus 24 volts while its output may be a minus 15 volts. Such voltages are commonly required to operate negative logic circuits.

The components described above act to block or suppress abnormal variations in the voltage provided at terminals 108. Such abnormal variations may result from variations in the line voltage, from failure of one or more components in the AC to DC converter 88, or from an attempt to operate the postal meter with an unauthorized power source connected across terminals 108. The latter situation might occur where a well meaning user attempts to bypass a temporarily malfunctioning AC to DC converter 88 by attaching his own DC power supply at terminals 108. Potentially, the same situation may be caused by an illegal user who, having stolen a meter from its base, is trying to convert the remaining postage in the meter to his own use.

The diode 112 has no effect on the operation of the meter so long as the DC voltage applied across terminals 108 is of the correct polarity. However, if the polarity of the voltage applied across terminals 108 is reversed for any reason, the diode 112 short circuits the protective circuitry, causing a current to be applied through fuse 110 far in excess of the interrupt current required to blow the fuse. When fuse 110 is blown, the meter unit is disabled while contents of the memory 24 are saved. The fuse 110 can be replaced relatively easily by a trained serviceman. However, replacement of the fuse requires that a meter unit seal be broken. Therefore, even successful attempts by unauthorized personnel will be readily detected by the postal authorities.

Metal oxide varistor 114 is a conventional circuit component having a voltage-dependent, nonlinear impedance characteristic which tends to suppress voltage spikes.

Overvoltage detector 116 is also a conventional circuit component which has a normally high impedance when the voltage applied across it is less than a predetermined value. If the applied voltage exceeds the predetermined value, however, a breakdown effect occurs causing a high current to be applied through device 116 and interrupter 110. Thus, interrupter 110 will be blown whenever normal voltage of the wrong polarity or excessive voltage of the right polarity is applied across terminals 108.

The feed-through capacitors 64 and 66, inductances 68 and 70 and filter capacitor 72 provide quick suppression or rapidly occurring voltage spikes and thus prevent meter damage which might otherwise occur before the varistor 114 and detector 116 can function.

Filter capacitors 72 also provide temporary power storage which gives the meter additional time to shut down in an orderly fashion in the event of a power loss. Feedthrough capacitors 64 and 66 and inductors 68 and 70 also filter any high frequency noise voltages which might be induced in the DC power lines.

The meter unit described above controls a postage printer, one embodiment of which is described with reference to FIGS. 6, 7 and 8. The printer is a modified Model 5300 postage meter manufactured by Pitney Bowes, Inc., Stamford, Conn. The basic Model 5300 postage meter is a mechanical device with mechanical registers and actuator assemblies. The modified meter contains only a print drum 80 and a set 82 of print wheel driving racks. Since the modified meter is intended to be used in an electronic system, the mechanical registers and actuator assemblies have been removed.

The print wheels (not shown) within drum 80 are set by a mechanism driven by first stepping motor 84 and a second stepping motor 86. Signals for controlling the operation of the stepping motors 84 and 86 are provided by the meter unit described above. The stepping motor 84 drives the upper and lower set 82 of postage wheel driving racks (consisting of racks **82*a*, 82*b*, 82*c*, 82*d*) through a gearing assembly including upper and lower nested shafts 118*a*, 118*b*, 118*c* and 118*d*, respectively. The angular positions of the upper shafts 118*a*, 118*b* and the lower shafts 118*c*, 118*d* are controlled by a master gear 120 which may be driven in either a clockwise or a counterclockwise direction by the stepping motor 84**.

The print drum 80 has four independently-positioned print wheels (not shown) which provide a postage impression to the maximum sum of $99.99. Each print wheel provides a separate digit of this sum and can be set from "0" to "9". The print wheels are sequentially set by the meter setting mechanism by means of the four driving racks **82*a*, 82*b*, 82*c*, 82*d*. The driving racks are slidable within print drum shaft 122 in the directions indicated by the double-headed arrows 124**.

The settings of the upper racks, **82*a* and 82*b* are controlled by pinion gears 126*a* and 126*b*, respectively. The settings of the lower racks 82*c* and 82*d* are controlled by a similar set of pinion gears not shown in the drawings. The pinion gear 126*a* is attached to the inner shaft 118*a* while the pinion gear 126*b* is attached to the concentric outer shaft 118*b*. The pinion gears which control the settings of driving racks 82*c*, 82*d* are similarly attached to nested shafts 118*c* and 118*d*, shown only in FIG. 8. The angular positions of the nested shafts 118*a*, 118*b*, 118*c*, 118*d* are controlled by shaft-mounted spur gears 128*a*, 128*b*, 128*c*, 128*d*. The master gear 120 can be shifted laterally along an axis parallel to the axis of the spur gears 128*a*, 128*b*, 128*c*, 128*d* to intermesh with a single gear at a time. The master gear 120 is rotatably mounted within a slot 130 in a yoke 132 which slides along a splined shaft 134. The yoke 132 is held away from rotatable engagement with splined shaft 134 by an interposed sleeve bushing 136. The master gear 120 engages the gears 128***a*, 128*b*, 128*c*, 128*d* in the sequential order: 128*b*, 128*a* 128*d*, 128*c*. In this order, gear 128*b* controls the setting of the "tens of dollars" print wheel, gear 128*a* controls the "dollars" print wheel, gear 128*d* controls the "tens of cents" print wheel and gear 128*c* controls the "units cents" print wheel.

The yoke 132 includes a pair of upper and lower tooth trough walls 138 and 138' located on the upper and lower surfaces of the yoke 132. As the yoke 132 and master gear 120 slide laterally along the splined shaft 132, the upper and lower laterally-extending walls 138 and 138' slide along either side of one of the teeth in each of the spur gears. The tooth troughs prevent rotational movement of any of the spur gears other than a spur gear meshed with master gear 120.

The lateral position of yoke 132 and the master gear 120 is controlled by stepping motor 86, the output shaft of which carries a splined gear 140. The splined gear 140 meshes with a rack 142 attached to yoke 132 at an L-shaped, lower extension 144. The clockwise or counter-clockwise rotation of splined gear 140 upon energization of stepping motor 86 is translated into lateral movement of yoke 132 through the rack and pinion arrangement. The splined gear 140 prevents counterclockwise rotation of yoke 132 about the axis of shaft 146 due to any friction between rotating sleeve bushing 136 and the yoke 132. A roller 148 mounted beneath the L-shaped extension 144 prevents any clockwise movement of the yoke 132 about the axis of shaft 146.

When the print wheels within print drum 80 have been set to the correct postage value position, drum 80 is rotated by shaft 122 in a direction indicated by arrow 150 to imprint the postage. The drum 80 is then returned to a home or rest position sensed by a slotted disk 152 mounted on shaft 122. When a slot 154 in disk 152 is interposed between the arms of an optical detector 156, the shaft 122 is at its home position.

All optical detectors in the setting mechanism are basically U-shaped structures having a light emitting diode located in one arm and a phototransistor located in the other arm. Light emanating from the light emitting diode is transmitted to the phototransistor only when a slot in an interposed disc is aligned with the arms of the detector.

The home or "0" positions of nested shafts 118*a* and 118*b* are similarly sensed by slotted discs and, respectively, in combination with optical detectors 160*a* and 160*b*. The home or "0" positions of the lower pair of nested shafts are sensed by similar slotted discs and optical detectors, none of which are shown in the drawing.

The shafts and gears are returned to the home position upon startup of the meter system. Subsequent setting is accomplished by stepping the motor 84 through a calculated number of steps using previously-established settings as a reference.

The angular movement of the stepping motor shaft 146, (and consequently splined shaft 134 and master gear 120) is monitored through an assembly including gears 162 and 164, slotted monitoring wheel 166 and optical detector 168. When the stepping motor shaft 146 turns, gear 162, which is mounted on shaft 146, must also turn through the same angle. Gear 162 intermeshes with gear 164 carried by the slotted monitoring wheel 166 causing the wheel to rotate in correspondence with rotation of shaft 146. Every fifth slot 170 on monitoring wheel 166 is extra long to provide a check on the monitoring wheel operation. Each slot on wheel 166 corresponds to a change of one unit of postage value. Optical detector 168 has two photosensors. One of the photosensors is mounted near the bight of the U-shaped detector structure; that is, near the periphery of monitoring wheel 166. This photosensor monitors every step of the stepping wheel 166. The other sensor is located near the ends of the arms of detector 168. This photosensor receives light from an associated light source on the opposite side of the monitoring wheel 166 only when the extra long slot 170 is aligned with the detector arms. Thus, this sensor monitors every fifth step of the monitoring wheel 166. The number of slots on wheel 166 which pass through detector 168 during rotation of motor 84 are counted in the electronic section of the meter unit. If the counter does not contain a count of five when the output from the second photosensor in detector 168 is sensed (indicating long slot 170 is aligned in the detector), an error condition exists.

The lateral position of yoke 132 and master gear 120 is monitored by a position indicator including a pair of spaced plates 206, 208 attached directly to yoke 132. Plates 206 and 208 include slot patterns which are binary-encoded representations of the position of the yoke relative to optical detectors 210, 212, 214, all of which are attached to an L-shaped bracket 216 on stepping motor 86. Each different slot pattern identifies a particular position of yoke 132.

Figure 9:
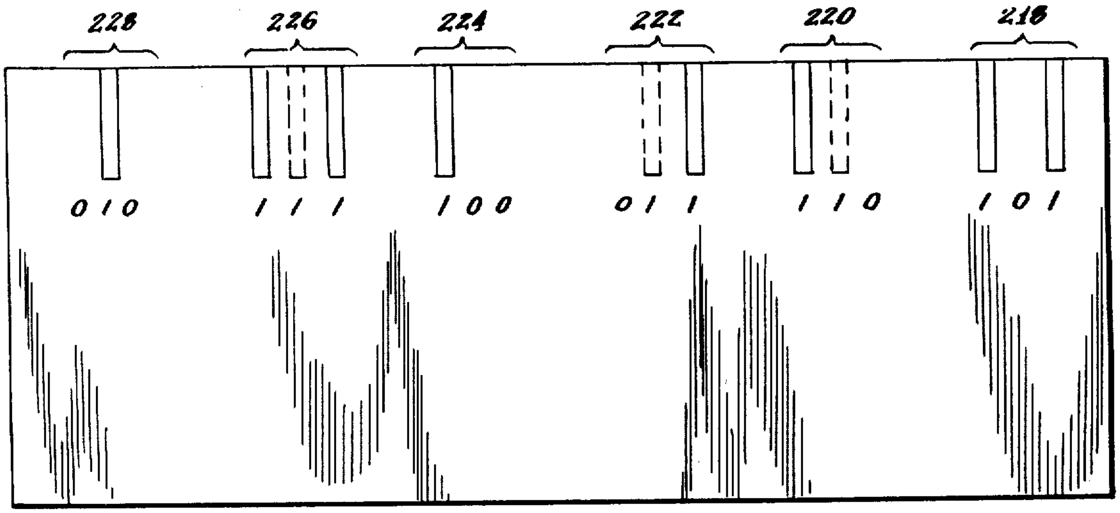
FIG. 9 is a top view of position encoder plates for a preferred form of postage printer.

The slot patterns may be seen more clearly with reference to FIG. 9, which is a plan view of plate 206. Slots appearing in plate 208, which is vertically aligned with plate 206 and therefore substantially hidden, are shown in dotted outline form.

In a preferred embodiment of the invention, plates 206 and 208 have six different binary slot patterns identifying six lateral positions for yoke 132. Each of the slot patterns consists of a unique triplet in which the presence of a slot in either plate 206 or plate 208 is interpreted as a binary one while the absence of a slot in any position where a slot might appear is interpreted as a binary zero. The binary indicia for the two outside positions in each triplet are included on plate 206. The binary indicia for the center position in each triplet is included on plate 208. The binary indicia are distributed between two vertically aligned plates only because optical detectors 210, 212, 214 are too bulky to permit three detectors to be placed side by side on a single plate of reasonable size. From a logic standpoint there is no significance to the fact the indicia are distributed between two plates. The indicia are read and interpreted as if they were contained on a single plate.

Position 218, identified by the binary slot pattern "101" is the detected slot pattern when master gear 120 is meshed with the spur gear for the "tens of dollars" bank of the postage meter. Position 220, identified by binary slot pattern "110", is detected when master gear 120 meshes with the spur gear for the "dollars" printing wheel. Position 222, identified by binary pattern "011", is detected when master gear 120 meshes with the spur gear which sets the "tens of cents" print wheel on the postage meter. The "cents" print wheel is set by master gear 120 in position 224, identified by the binary pattern "100".

Positions 226 and 228, identified by binary patterns "111" and "010", respectively, serve security purposes. After each of the print wheels has been set by the master gear 120, yoke 132 is shifted to an "enabled" position 228 which is the only position in which shaft 122 can rotate to imprint the set postage. A conventional mechanical interlock between the yoke 132 and a shutter bar (not shown) is released only in this position to assure the printing cannot occur if the meter is not ready due to any reason or if an error has occurred or if insufficient funds are available in the meter register.

Position 226, referred to as a disabled position, is a position wherein each of the spur gears 128*a*, 128*b*, 128*c*, 128*d* is mechanically locked by the projecting troughs 138 and 138'. In the "disabled" position, which is the position to which the yoke 132 is driven upon loss of power, the printer is mechanically locked and cannot be reset even by external force applied directly to the print wheels in print drum 80.

Figure 10:
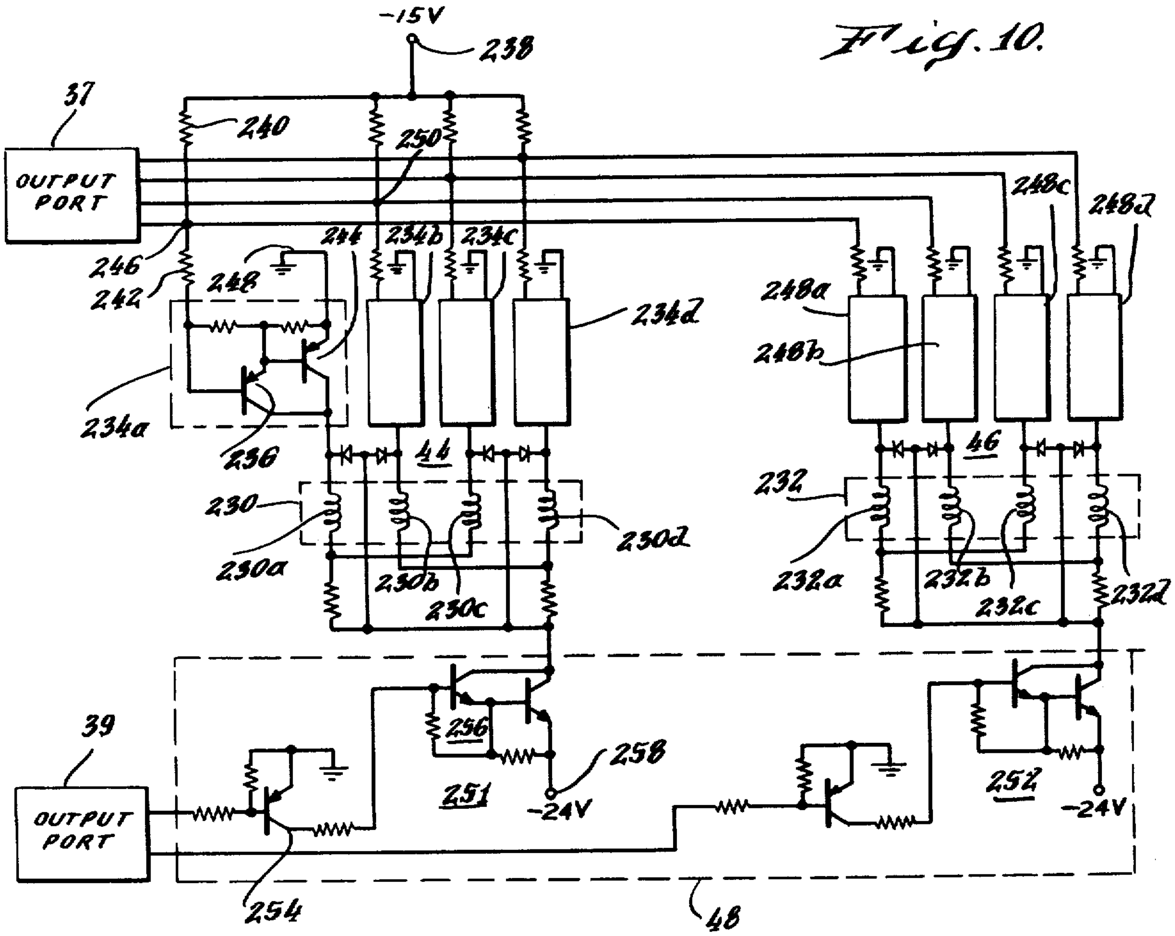
FIG. 10 is a detailed schematic diagram of the interface between the meter unit electronics and the drive motors for one embodiment of postage printer.

The electrical interconnections of the stepping motors 84 and 86 with the output ports 37 and 39 are described with reference to FIG. 10. The four parallel output leads from output port 37 are connected to the coil select circuits 44 and 46 for the stepping motors 84 and 86, respectively. Each of the stepping motors is a conventional eight-phase stepping motor, which is rotated in predetermined angular increments by energizing different combinations of four coils contained within the motor.

The coils for stepping motor 84, included within a coil system 230, are identified as coils 230*a*, 230*b*, 230*c*, and 230*d*. Similarly, the coil system 232 for motor 86 includes coils 232*a*, 232*b*, 232*c*, 232*d*. Each of the individual coils in each motor is connected in series with a Darlington amplifier. For example, coil 230*a* is connected in series with Darlington amplifier 234*a* in which the base terminal of a first transistor 236 is connected to a −15 volt source 238 through series resistors 240 and 242. A second transistor 244 has a grounded emitter, a base terminal connection to the emitter of transistor 236 and a collector connected to the collector of transistor 236. Darlington amplifier 234*a* is off or nonconducting when the associated output 246 from output port 37 is at a binary 0 or ground potential. In this state, the Darlington amplifier prevents current flow from an associated ground terminal 248 through the second transistor 244 and thus through coil 230*a*. When the output 246 drops to a more negative or binary 1 level, the Darlington amplifier 234*a* is switched to an on or conducting state.

Darlington amplifiers 234*b*, 234*c* and 234*d* are identical to amplifier 234*a* except for the connections to different output leads and different motor coils.

The coils in coil system 232 are similarly connected in series with Darlington amplifiers 248*a*, 248*b*, 248*c*, 248*d*. Corresponding coils in each of the coil systems 230 and 232 are connected to the same output terminal of output port 37. For example, coils 230*b* and 232*b* are connected through respective Darlington amplifiers 234*b* and 248*b* to output 250. A binary 1 signal on output 250 switches both Darlington amplifiers 234*b* and 248*b* into their on or conducting state. However, coil current will be established in only the motor selected by operation of motor select circuit 48.

Motor select circuit 48 is connected to outputs from output port 39 and comprises switching circuits 251 and 252 connected in series with coil systems 230 and 232, respectively.

Switching circuit 251 includes an inverter amplifier 254 which provides an increased current at its collector terminal when the input to the amplifier 254 falls to the more-negative binary 1 level. The output of inverter amplifier 254 is applied to a Darlington amplifier 256 which, when conducting, provides a current path from a ground for each of the coils in coil system 230 to a −24 volt source 258.

Switching circuit 252 is identical in construction to switching circuit 251 but is energized in an alternative manner. When a binary 1 signal appears at the input to switching circuit 251, a binary 0 signal is applied to switching circuit 252 and vice versa. Thus, depending upon the inputs to the switching circuits 251 and 252, either coil system 230 or coil system 232 will be connected in a closed circuit loop. The other coil system will be open circuited. Since the coil system for only one of the two drive motors is complete at any one time, the output port 37 can be used to control the operation of both motors using the common output connections.

Figure 11:
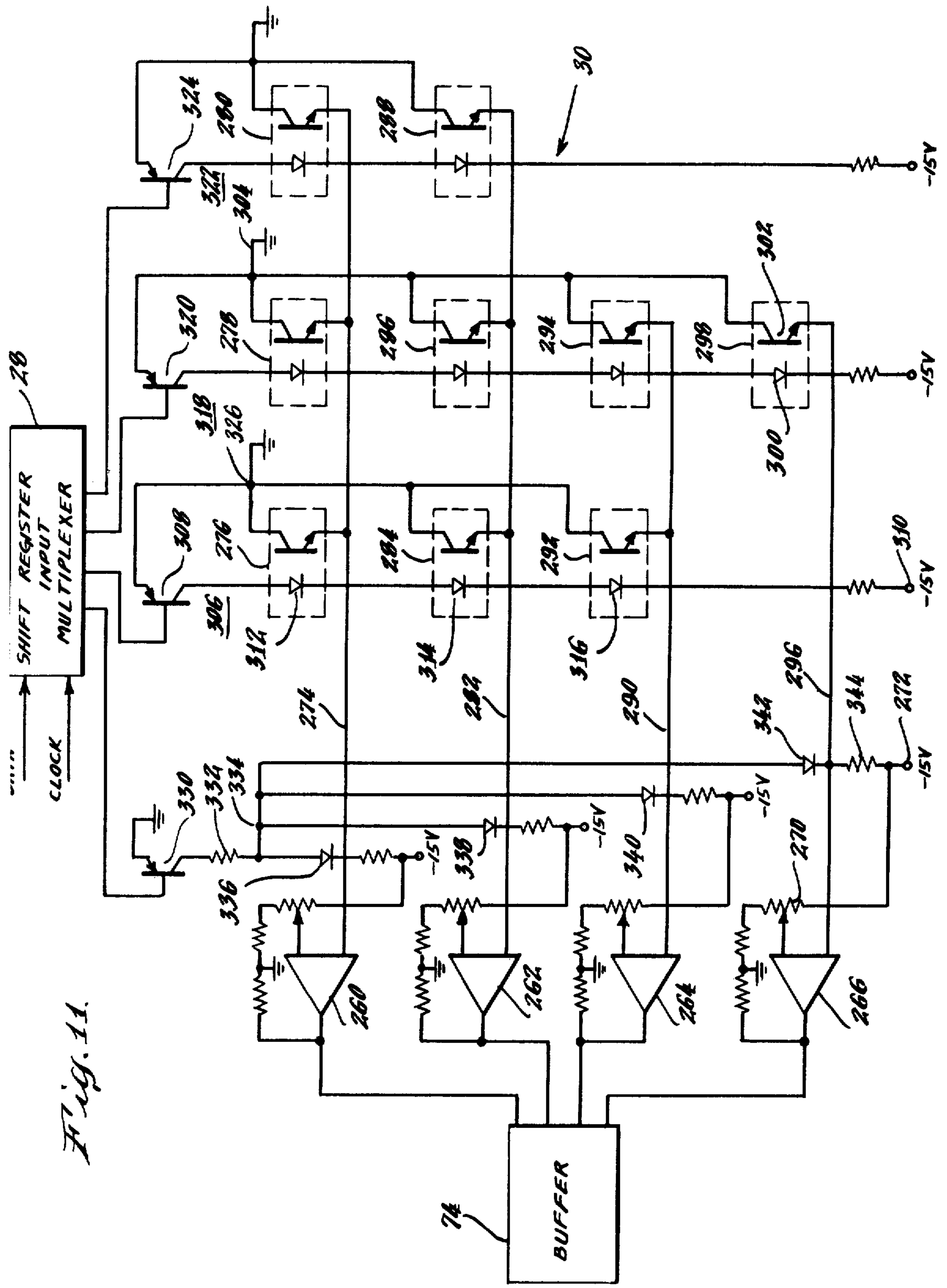
FIG. 11 is a detailed schematic diagram of a postage printer setting detector array, including the input connections to the meter section electronic control section.

Referring to FIG. 11, the states of the optical detectors which monitor the printer setting mechanism are inputted to the system through printer setting detector array 30 which includes a novel failure detect system. The inputs from the printer setting detector array 30 are applied to logic buffer 74 which may be a conventional 4 bit parallel input buffer circuit. Each of the inputs to buffer 74 is fed by one of four comparator amplifiers 260, 262, 264, 266. Each of these comparator amplifiers has one input connected through a voltage divider to a −15 volt reference source. For example, comparator amplifier 266 has an input 268 to which a predetermined negative voltage may be applied by means of a voltage divider 270 and a −15 volt source 272.

A second input to each of the comparator amplifiers is connected to a bus from the output side of one or more of the optical detectors. More particularly, input 274 to comparator amplifier 260 is connected to the output side of detectors 276, 278 and 280. Input 282 to comparator amplifier 262 is connected to the output sides of detectors 284, 286, 288. Input 290 to comparator amplifier 264 is connected to the output side of a pair of detectors 292 and 294 while input 296 to comparator amplifier 266 is connected to the output side of a single detector 298.

Each of the optical detectors is identical to detector 298 which includes a light emitting diode 300 and a phototransistor 302, which conducts only when its base area is illuminated by optical radiation from the light emitting diode 300. It will be recalled from the description of FIGS. 6–8 that a slotted disc is interposed between the light emitting diode and the phototransistor or light detector. The slotted disc rotates with one of the shafts of the printer setting mechanism. When the slot in the disc rotates into alignment with the light source and the light detector, the phototransistor is gated into conduction to provide a current path between a ground terminal, such as terminal 304 and the amplifier input.

The detectors are connected in what might be described as a column and row matrix with the rows consisting of buses 274, 282, 290 and 296. Each column consists of a single series circuit including a transistor having its base terminal connected to the shift register input multiplexer 28, a −15 volt source and two or more serially-connected light emitting diodes. For example, column 306 consists of transistor 308, −15 volt source 310 and three serially-connected light emitting diodes 312, 314, 316, which are components of optical detector circuits 276, 284 and 292, respectively. Column 318 consists of transistor 320 and serially-connected light emitting diodes in detector circuits 278, 286, 294 and 298. Column 322 consists of an identical transistor 324 and the light emitting diodes in the detector circuits 280 and 288.

The base terminals of the transistors 308, 320 and 324 are connected to the second, third and fourth stages, respectively, of the shift register 28. The first stage of shift register 28 is connected to an error detect circuit to be described in more detail later. Inputs to shift register 28 include a data input and a clock input. In operation, the optical detectors to be monitored are selected by loading a binary 1 into shift register 28. The binary 1 is then shifted upon successive clock pulses to the shift register stage connected to the column containing the detectors to be read. For example, if the detectors 276, 284 and 292 are to be read, the binary 1 is shifted to the second stage of shift register 28 to drive transistor 308 into a conductive state. When transistor 308 conducts, a current path is formed, permitting current to flow from ground terminal 326 through light emitting diodes 312, 314 and 316 to the −15 volt source 310. Under these conditions, output signals from comparator amplifiers 260, 262 and 264 are interpreted by the electronics control unit as outputs from optical detectors 276, 284 and 292.

Similarly, if the binary 1 had been shifted to the third stage of shift register 28, transistor 320 would have been energized to establish a current path through the light emitting diodes for the detectors in column 318. Changes in the inputs to the comparator amplifiers would have been interpreted as changes in the states of the detectors in column 318.

It is evident that shift register 28 and the array of detector connections provide a multiplexing function by which different sets of up to four detectors can be connected to the four parallel inputs to buffer circuit 74 at one time. Thus, while only nine detectors have been shown in columns 306, 318 and 322, up to 12 detectors could have been accommodated if necessary or desirable.

The error checking or failure detect feature referred to above simultaneously drives the inputs to all four comparator amplifiers from a binary 1 (−15 volt) level to a binary 0 (0 volts) level each time the printer setting detector array is called in operation. The failure detect circuit includes a transistor 330 having its base terminal connected to the first stage of shift register 28, its emitter terminal connected to a ground terminal and its collector connected through a resistor 332 to a common junction 334 of diodes 336, 338, 340 and 342. The opposite terminals of each of these diodes is connected through a resistor to a −15 volt source. For example, diode 342 is connected to −15 volt source 272 through resistor 344.

Before a binary 1 is loaded into the first stage of shift register 28, transistor 330 is non-conducting which means that the inputs 274, 282, 290 and 296 to the comparator amplifiers 260, 262, 264 and 266, respectively, should be at the binary 1 level. When the first stage of the shift register 28 goes negative (i.e., receives a binary 1 signal) transistor 330 is triggered into conduction to provide a current path from ground through each of the diodes 336, 338, 340 and 342 to the inputs of the respective comparator amplifiers. Thus, the second input to each of the amplifiers will change state immediately, causing the outputs of the amplifiers to simultaneously change state. Under the control of a routine described in more detail later, the electronics control unit of the meter unit will monitor the outputs of the comparator amplifiers to see whether all outputs have changed states simultaneously. If the outputs fail to change states as expected, an error signal is generated to inform a user of the system of a probable failure in one of the comparator amplifiers or associated circuit components. Thus, the operability of the comparator amplifiers is verified at the beginning of each printer setting detector operation.

Figure 12:
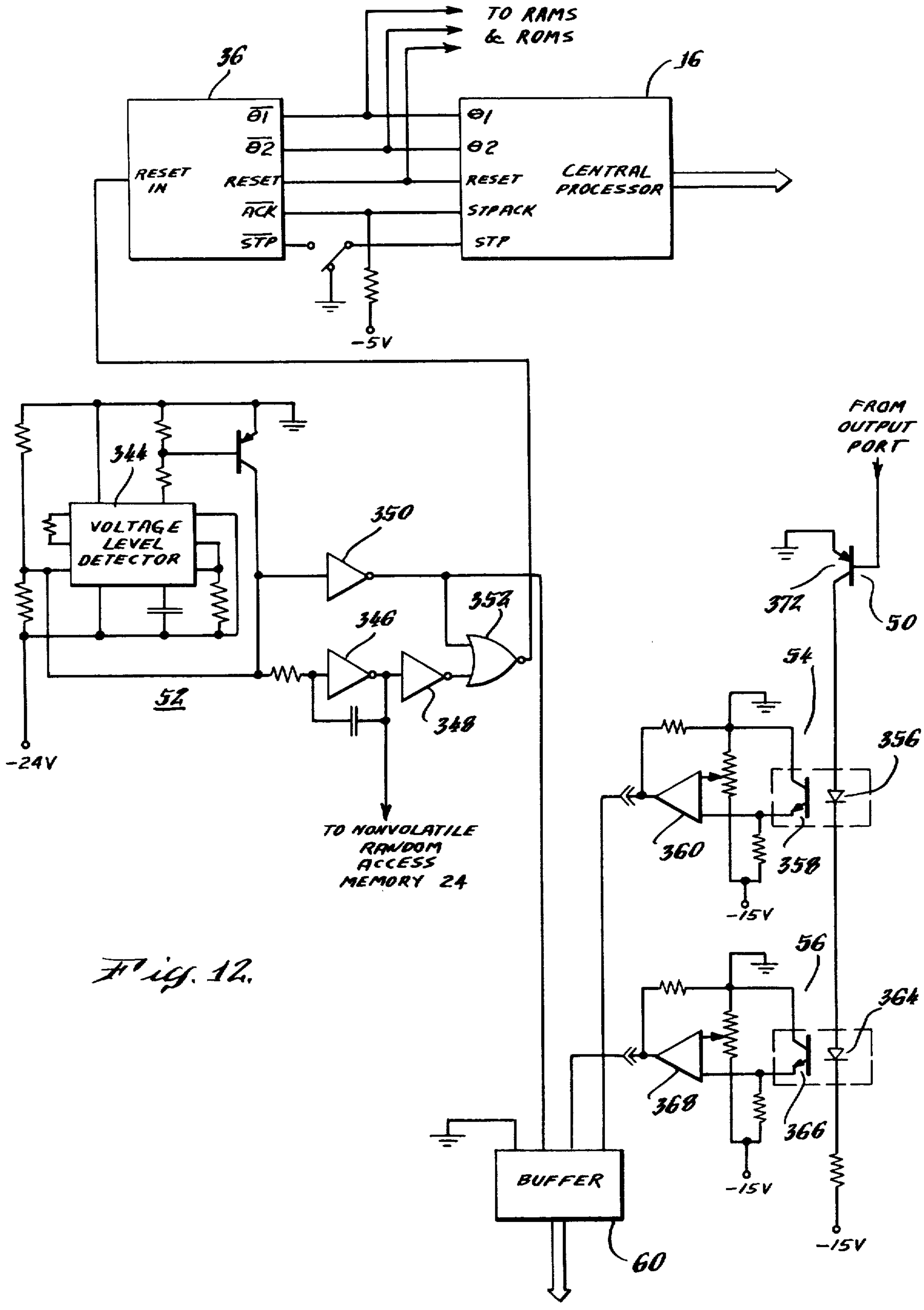
FIG. 12 is a detailed schematic diagram of an interrupt generator circuit for the electronic control of the meter section.

There are a number of conditions under which the operation of the meter unit 10 must be responsive to the occurrence of physical events, in order to preserve critical accounting data, disable the meter from further operation or optimize the meter operation. The necessary signals for triggering this response are provided by signal generator circuit 32 which will now be described in detail with reference to FIG. 12.

As was mentioned briefly with reference to FIG. 3, signal generator circuit 32 includes a test switch 50, a power sense circuit 52, a meter locked detector 54 and a print detector 56. The power sense circuit 52 is driven by the system −24 volt source. This source is connected to a conventional voltage regulator circuit 344, employed as a voltage level detector circuit. The output of inverter amplifier 346 is applied both to non-volatile random access memory 24 and to the input of a serially-connected inverter amplifier 348. The output of voltage regulator 344 is applied to an inverter amplifier 350 which, together with inverter amplifier 348, provides an input to input buffer 60.

The power sense circuit 52 does not affect the operation of the meter unit as long as the voltage remains at suitable levels. However, if the voltage begins to decrease, indicating an impending power failure, circuit 52 generates a signal which when detected by the central processor 16, causes the processor to enter a routine which cannot be exited other than by a complete shutdown and re-start of the meter.

Meter-locked detector circuit 54 includes a light emitting diode 356 adjacent a phototransistor 358. Components 356 and 358 physically located adjacent the base of the meter unit and are normally optically linked. Thus, under normal conditions, phototransistor 358 conducts. If the meter unit is unlocked from the base, however, the optical link is broken, driving the lower input to a comparator amplifier 360 to a −15 volt or binary 1 level. When this occurs, the output of comparator amplifier 360 changes state. Comparator amplifier 360 provides an input to buffer circuit 60.

The print detector circuit 56 determines when a print operation has begun; that is, when the print drum 80 actually starts to rotate away from its home position to a printing position. Print detector 56 includes a light emitting diode 364 located on the opposite side of a slotted disk (not shown) on the print drum shaft 122 from a phototransistor 366. When the printer leaves the home position during a print operation, the slot moves out of alignment between diode 364 and phototransistor 366. Phototransistor 366 then turns off causing the lower input of a comparator amplifier 368 to be driven by a binary 1 level. The output of comparator amplifier 368 is connected to buffer circuit 60.

In order to test the operation of the print detector 56 or the meter locked detector 54, a test interrupt switch 50 consisting of a transistor 372 is included in series with the light emitting diodes 356 and 364. The base terminal of transistor 372 is connected to output port 39, which can be seen in FIG. 3. Normally, the voltage on the base terminal of transistor 372 is kept at a binary 1 level to provide a current path from a ground terminal through the light emitting diodes 356 and 364 to a −15 volt source. To simulate an event, the base voltage on transistor 372 is temporarily driven to a binary 0 level to open the current path through the light emitting diodes 356 and 364. The interruption in current to the light emitting diodes has the same effect upon comparator amplifiers 360 and 368 as an event-indicating condition. The test condition is readily identified by the central processor since two inputs to buffer circuit 60 will have simultaneously changed state.

Figure 13:
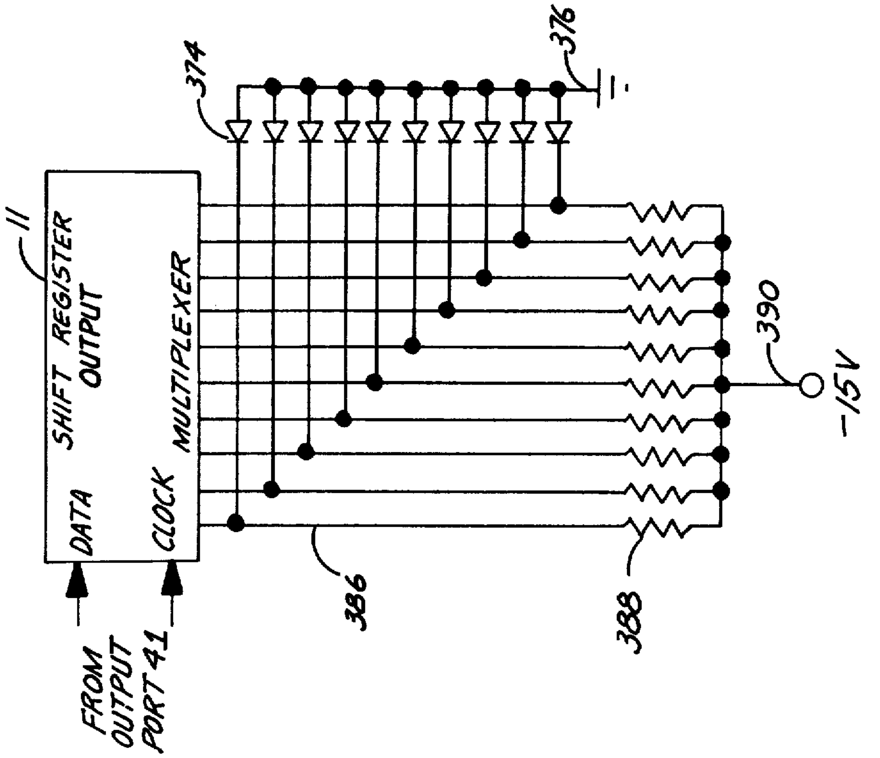
FIG. 13 is a detailed schematic diagram of a condition - indicating LED display.

Light emitting diode or LED display 13 is included to provide a user with a visual display of certain error conditions. Referring to FIG. 13, the LED display includes a number of light emitting diodes, such as LED 374 having a common anodic connection to a ground terminal 376. Each of the light emitting diodes has a cathode connection to a different output line from shift register output multiplexer 11. For example, the cathode of light emitting diode 374 is connected to output line 386, and each of the other output lines, is connected to a minus 15 volt source 390 through identical pull-down resistors, such as resistor 388.

Depending upon the error conditions to be displayed binary 1's or 0's entered one bit at a time into shift register 11 through a data input terminal and are shifted through the register 11 by a series of clock pulses. Both the data and the clock pulses are provided through output port 41. When a binary zero appears at a particular stage of the shift register, both the anode and the cathode of the light emitting diode connected to that stage will be at the same potential; that is, ground. The light emitting diode produces no optical radiation under these conditions. However, when the shift register stage contains a binary 1 (minus 15 volts) the 15 volt potential across the light emitting diode connected to that stage causes the diode to emit light.

The particular error condition or status represented by each of the light emitting diodes is described in more detail with reference to a subsequent figure.

Figure 14:
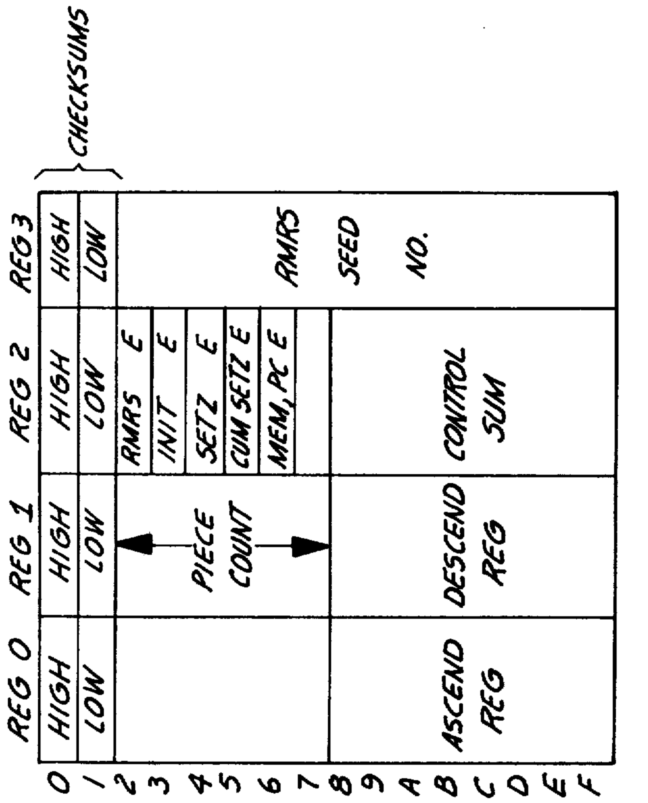
FIG. 14 is a representation of the assignment of memory locations in a nonvolatile memory.

Specific types of data are assigned to specific locations within the nonvolatile, random access memory 24 and the volatile random access memories 38, 40, 42. FIG. 14 illustrates the assignment of memory locations within nonvolatile random access memory 24.

Memory 24 is a 256 bit memory divided into four 64 bit registers. Each register contains 16 four bit words. The memory locations and the data handled within the system are expressed in hexadecimal format. That is, the lowest numbered word in a particular register would be word 0 while the highest numbered word would be word /F, which is actually the 16th word of the register. Any particular word can be identified by two digits. The first digit represents the register containing the word while the second digit represents a particular level of word in the memory. For example, memory location 00 in nonvolatile memory 24 would be the four bit word located in the extreme upper left hand corner of FIG. 14 while memory location 3F would be the word appearing in the lower right hand corner of FIG. 14.

The first two words of each of the nonvolatile memory registers are used to store the high and low order characters, respectively, of checksums which are used to check for read/write errors which might arise during the transfer of data. The checksums are generated by subroutines which are described in more detail later. Basically, however, these checksums are simply the summation of all binary digits of data stored in the remaining words of the register.

Nonvolatile memory locations 08-0F are assigned to an ascending register which contains a running total of all postage printed by the meter over its entire life cycle. Memory locations 18-1F contain the descending register, representing the total amount of postage available for metering operations before the meter must be re-funded. Memory locations 28-2F contain a control sum obtained by adding the contents of the ascending register and the descending register. Since the ascending register should be incremented during each printing operation by the same amount by which the descending register is decremented, the control sum should remain a constant until the meter is re-funded. When more postage is added to the meter, the control sum (and the descending register) will be incremented by the amount of the added postage. The control sum will remain constant at the new higher level until a subsequent re-funding operation occurs.

Memory locations 12–17 are reserved for a piece count total which represents the total number of metering operations performed by the meter over its lifetime. This information is significant in planning maintenance schedules. Locations 22–26 of the nonvolatile memory are used to store four bit error indicators representing specific types of errors. Location 22 stores indications of error which occur during a RMRS or remote meter resetting routine which may be employed to re-fund the meter from a remote location. The RMRS will be described in general terms later. Location 23 is a storage area for error codes associated with the initialization of the meter. During initialization the meter is reset to 0. Errors occurring during the resetting are represented by 1's in the specific memory locations. Location 24 and 25 store error codes associated with the setting of the meter. Memory location 26 stores error codes relating to the operation of the memory units and the photocells of the meter. Most of register 3 of the nonvolatile memory 24 is used to store an RMRS seed number.

Figures 15, 16:
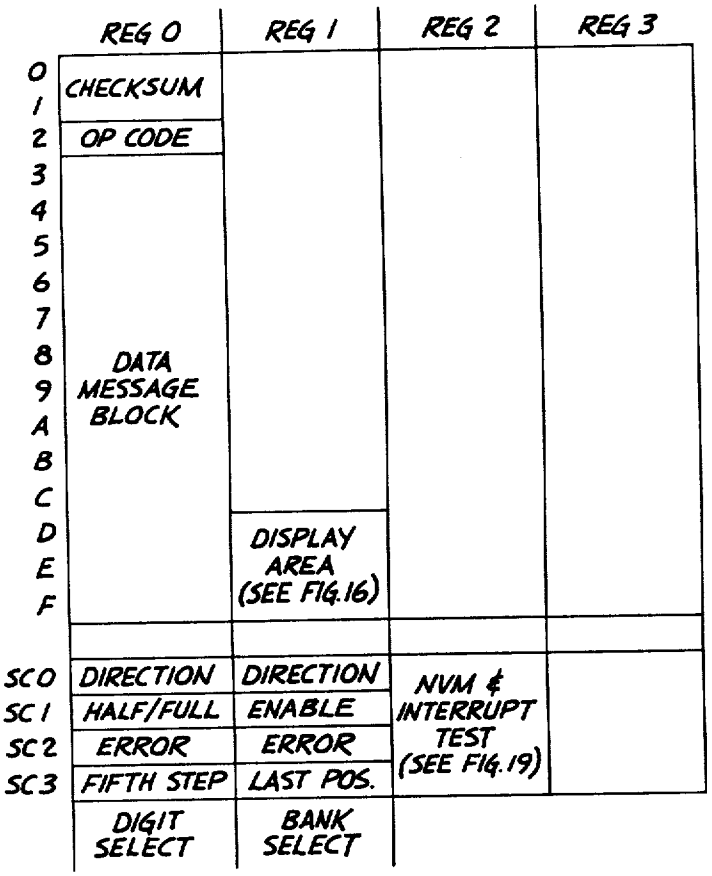
FIG. 15 is a representation of the assignment of memory locations in random access memory unit 38.
FIG. 16 is a more detailed representation of the assignment of memory locations for display indicator bits within unit 38.

Referring to FIG. 15, random access memory 38 is also preferably a 256 bit memory register. Memory location 02 is used to store a message op code for a data message stored in location 03-0F. Memory locations 1D-1F store the information used to control the LED display while the remainder of registers 1 through 3 of random access memory 38 is given over to working memory in which intermediate results, etc. are stored.

Each of the registers of memory 38 includes four 4 bit status characters, labeled SC0 through SC3. These locations, while physically similar to the data storage locations of the memory, are accessed differently and are used to store status indications rather than data. Status characters SC0-SC3 of register 0 are used to store status indicators associated with the digit select stepping motor of the printer. Status character 0 indicates whether the motor is energized to step up (/F) or step down (1). Status character SC1 indicates whether the master gear of the printer is on a full step (0) or a half step (F). Status character 2 indicates an error condition occurring on a half step (bit 2=1), a full step (bit 1=1), or a fifth step (bit 0=1) while status character 3 indicates the contents of the fifth step counter. SC3 equals 0 indicates the 5th step counter is a multiple of five at the right time.

The status characters associated with register 1 provides status indications for the operation of the bank select stepping motor. SC0 indicates whether the motor is energized to step up (F) or step down (1). Status character 1 indicates whether the meter is in its disabled position (0) or an enabled position (≠0). Bit 0 of status character 2 equals 1 when the motor has failed to take one complete step on the specified direction and a bit 1=1 when not all 0's are observed during the stepping process. Status character 3 indicates the last position of the motor as read by the encoder.

Figure 19:
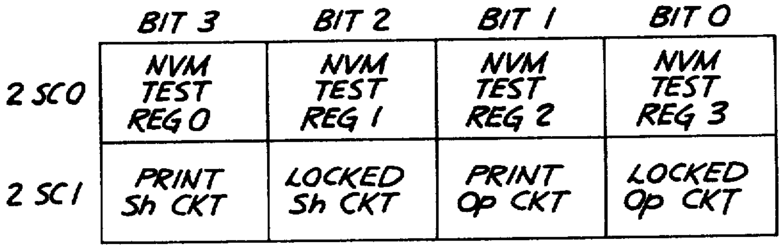
FIG. 19 is a more detailed representation of the assignment of memory locations for status character bits within unit 42.

Status characters SC0 and SC1 of register 2 contain information relating to the NVM and interrupt test routines. The individual bits of each of these status characters are described in more detail with reference to FIG. 19. Status character 0 contains one NVM test bit for each of the registers. The value of each bit indicates whether a nonvolatile memory test described in more detail in a description of a TNVM subroutine indicates proper memory operation. The individual bits associated with status character 1 indicate the results of open circuit and short circuit tests of the meter locked detector 54 and the print detector 56. The meaning of these bits is discussed in more detail in a description of a TINT subroutine.

The assignment of individual bits in words 1D-1F of memory 38 are shown in FIG. 16. The first two bits of word 1D are used to provide an RMRS time out error indication and an initialization time out error indication. A user is given a certain number of opportunities to carry out the tasks needed to perform remote resetting or to initialize the printer. If, for any reason, these tasks are not complete within a given number of attempts, the meter is disabled and these bits are set to 1.

With reference to word 1E, bit 3 is set to 1 when the contents of the ascending and descending register do not equal the control sum, bit 2 is set to 1 when a check sum error is indicated, bit 1 is set to 1 when an error associated with the reading of photocells is detected. Referring to word 1F, bit 3 is set to 1 when the amount of postage remaining in the descending register is less than the amount of postage to which the meter has been set.

Bit 2 is driven to 1 whenever the amount of postage indicated by the descending register falls below $100. This information is useful to a user since it provides notice that the meter will have to be re-funded in the not too distant future. Bit 1 of word 1F is always on while bit 0 is always off. These two bits simply provide an indication that the meter is on but that no short circuits have occurred which would cause the LEDS to become erroneously energized.

Figure 17:
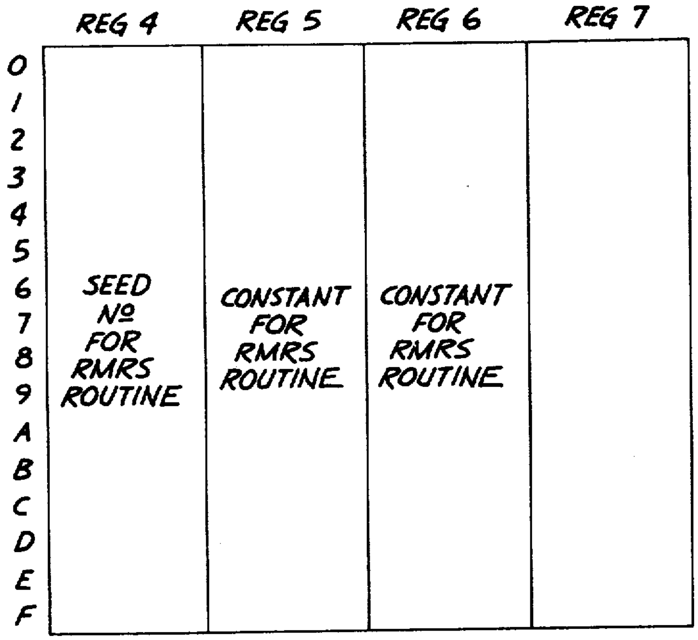
FIG. 17 is a representation of the assignment of memory locations in random access memory unit 40.

With reference to FIG. 17, random access memory 40 contains the same seed number for the RMRS routine as is also stored in register 3 of the non-volatile memory. Words 50-5F and 60-6F of random access memory 40 are used to store constants used in the RMRS routine while words 70-7F are reserved for intermediate calculations, temporary storage, etc.

Figure 18:
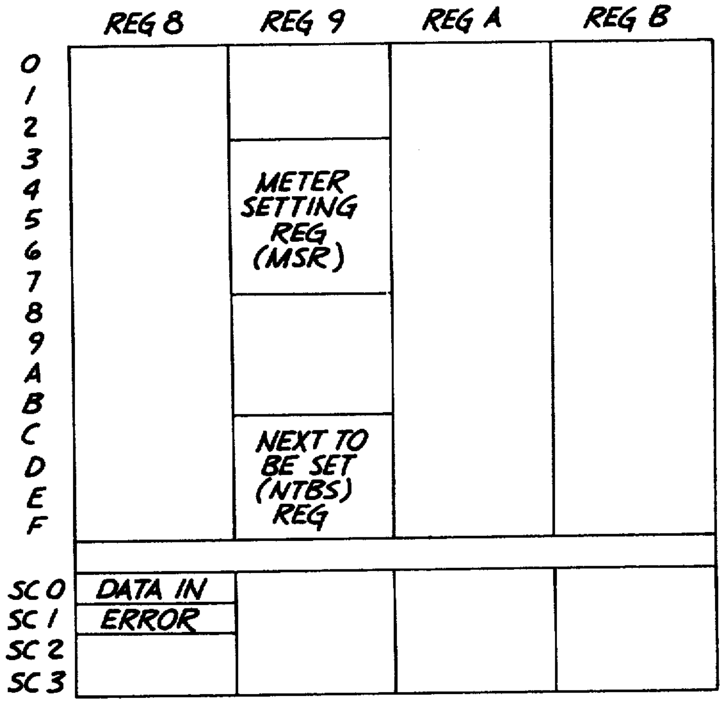
FIG. 18 is a representation of the assignment of memory locations in random access memory unit 42.

Referring to FIG. 18, locations 94–97 of random access memory 42 store the current setting of the meter in a meter setting or MSR register. The next postage amount to be set into the meter is stored in an NTBS register comprising words 9C-9F of the memory unit.

Status characters are stored at SC0 and SC1 of register 8. Status character SC0 contains the data currently being read at a specified input port, while status character SC1 is used to store an error code associated with the test of the printer setting detectors. The generation of these error codes and others are described in somewhat more detail in the discussion of the individual subroutines during which they are generated.

In the flow charts of the main program and the subroutines, references often made either expressly or by implication to a postage meter program printout incorporated into the specification as an Appendium A.

The programming language of the printout is an assembly level language developed specifically for the MCS-40 components manufactured by Intel Corporation. While a comprehensive explanation of each of the instructions in this language may be found in the Intel 4004 and 4040 Assembly Language Programming Manual, copyright 1974, by Intel Corporation, 3065 Bowers Avenue, Santa Clara, California 95051, all of the instructions used in the program are listed in Appendium B along with a brief explanation of each of the instructions.

Figure 20:
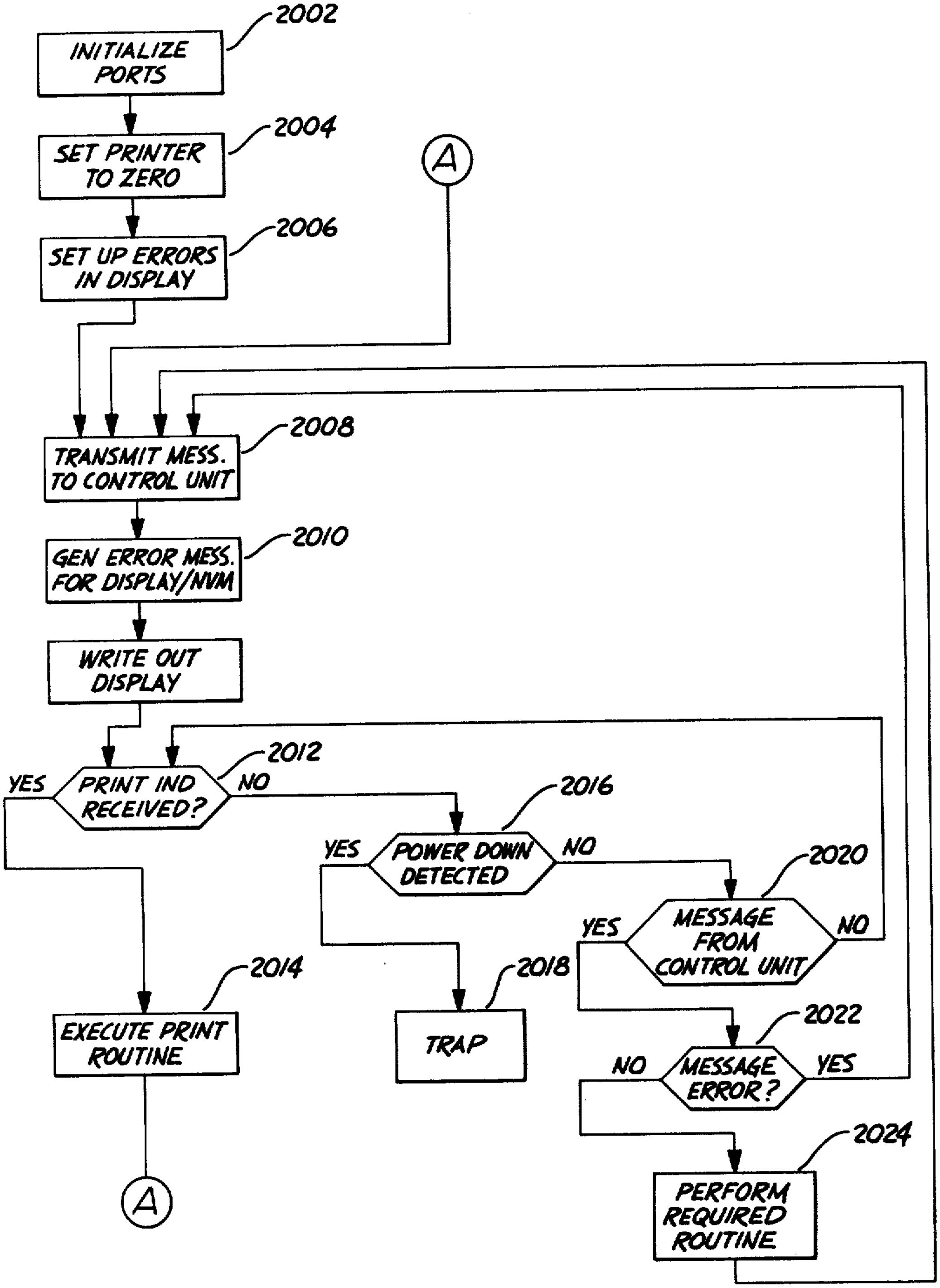
FIG. 20 is a simplified flow chart of the operation of the postal meter system.

In describing the flow charts, the following number convention shall be used. Those operations or decision blocks that are identified in a particular routine will be identified by a four digit number. The first two digits identify the figure in which the particular block appears. The last two digits are unique to a particular block within that figure. For example, the first operation of FIG. 20 is identified as operation 2002. That figure is a greatly simplified flow chart of the overall operation of the meter. After the meter is powered up, the first step 2002 is to initialize output ports to the motors of the meter, the photocells in the printer setting detector array, the LED display and the event-indicating photocells. The printer is then set to zero (block 2004) and any error flags stored from the previous cycle of operation are written (block 2006) into the LED display. A ready-to-receive message or an error message is transmitted (block 2008) to the control unit for the meter. Error checks are made after the transmission routine and error messages generated (block 2010). The error messages are written into the nonvolatile memory and out to the LED display. A check is then made as to whether a print command is being received from the control unit (block 2012). If it is, a print routine is executed (block 2014) after which control is returned to block 2008. If a print command is not being received, a check is made as to whether a power loss has been detected (block 2016) If a power loss has been detected, a jump is made to a trap routine (2018) from which control cannot be retrieved without completely shutting down and restarting the meter.

If no print command has been received, and if a power loss is not sensed, a check is then made (block 2020) as to whether a message is pending from the control unit. If no message is pending, control is returned to block 2012. If a message is pending, the input is decoded and made (block 2022) for errors within the message. If errors have occurred, program execution continues at block 2008 which sends a responsive message to the control unit. Error messages are generated and written out to the LED display and into the nonvolatile memory. If the message was error free, the required routine is performed (block 2024) before the program control returns to block 2008.

As was mentioned earlier, the messages which are transmitted to and from the control unit 12 are organized into sixteen four bit words for reasons of simplicity even though most messages do not require the full 16 words. Preferred formats for the various messages are set out in Appendium D. The first two words of any message, whether transmitted to or from the control unit, is a checksum obtained by adding the remaining words of the message. The third word of any message is an op code identifying the particular type of operation to be performed or which has been performed in response to the message. Words identified by a D are data words. Words identified by an E are error words while words identified by an S are specifier words. Words identified by R indicate the address of a register to be written into or read. A word identified by a B is a four bit status word.

Figure 21:
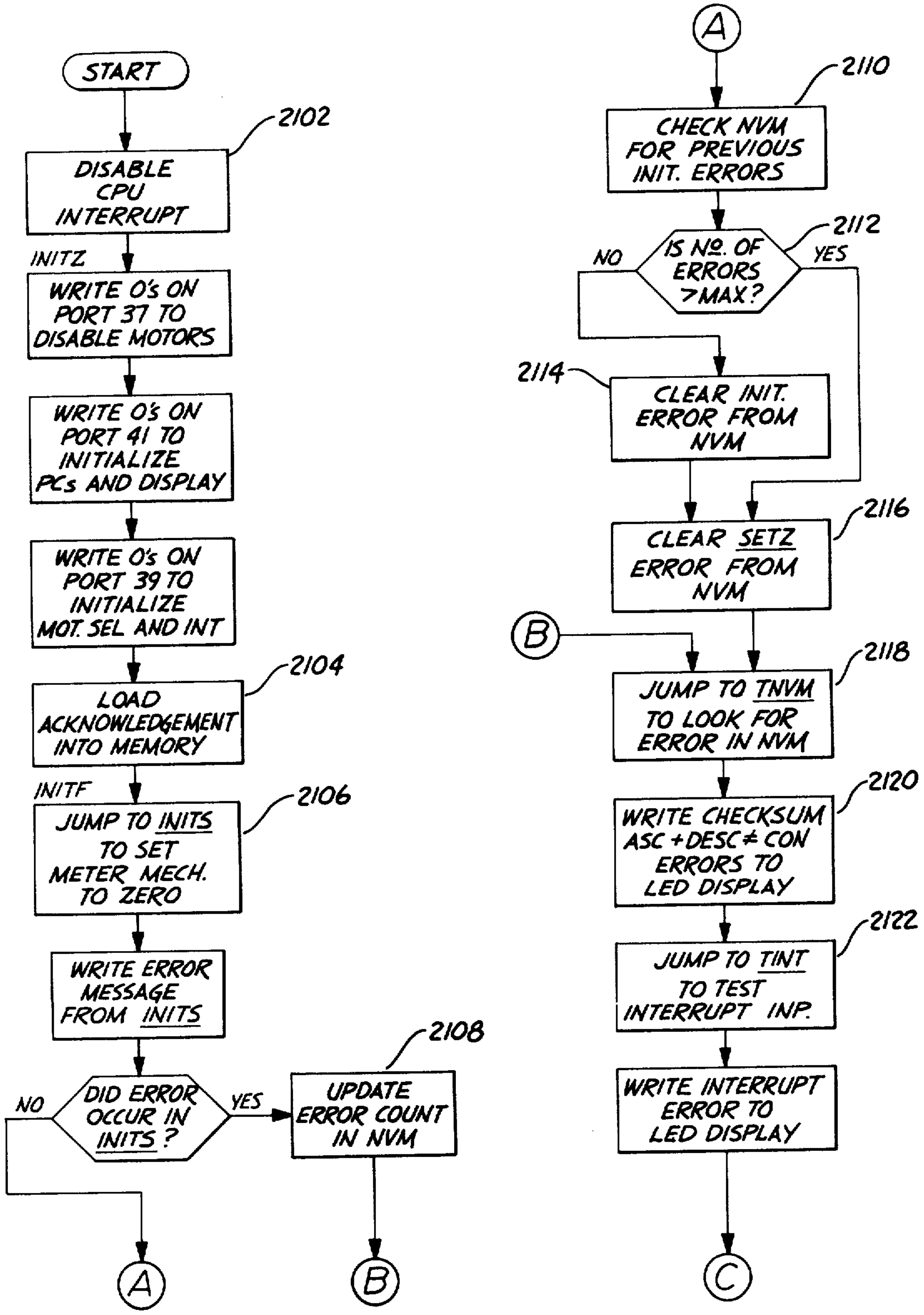
FIGS. 21–26, taken collectively, comprise a more detailed flow chart of the main program for the postal meter system.
Figure 22:
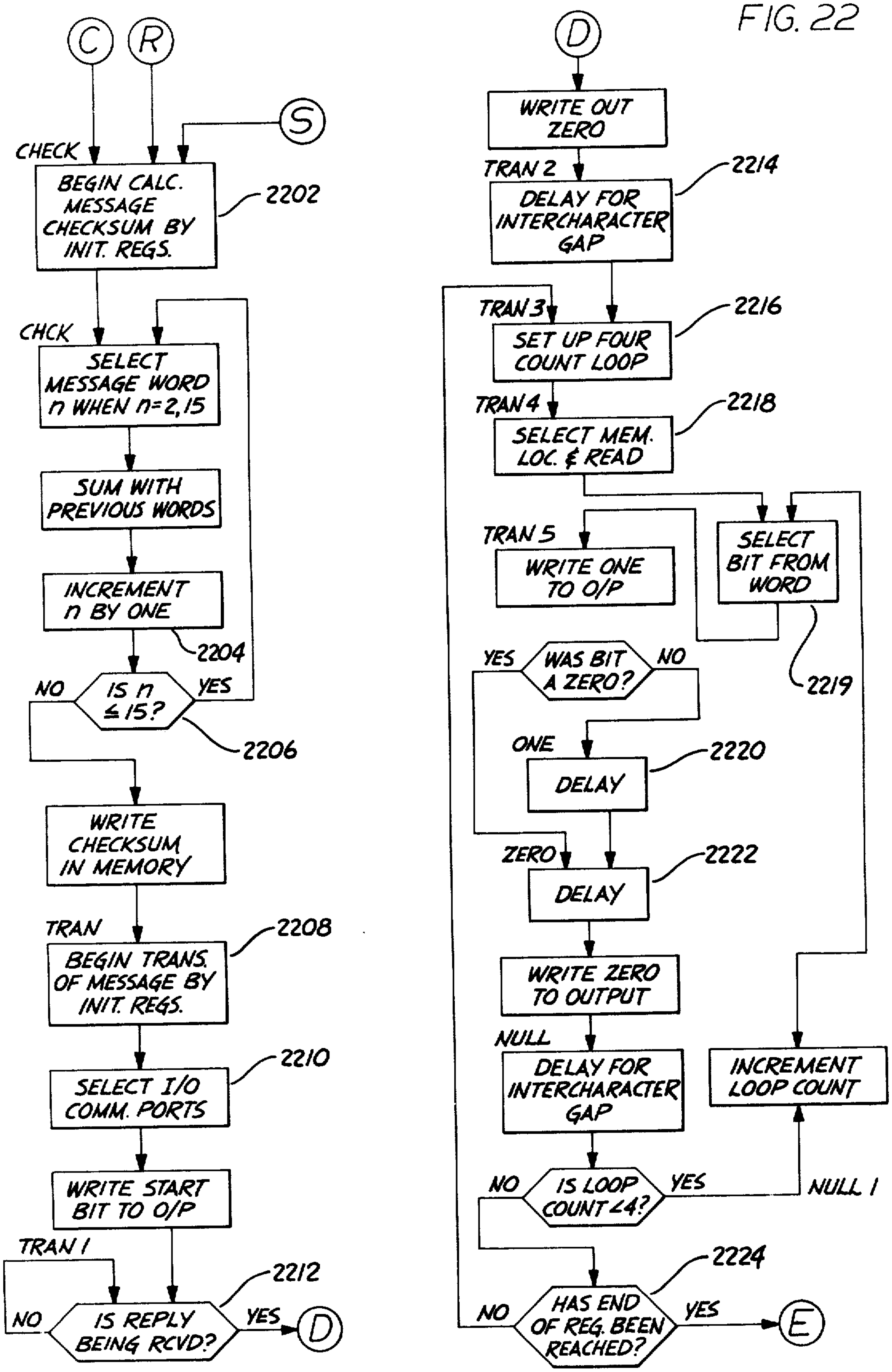
Figure 23:
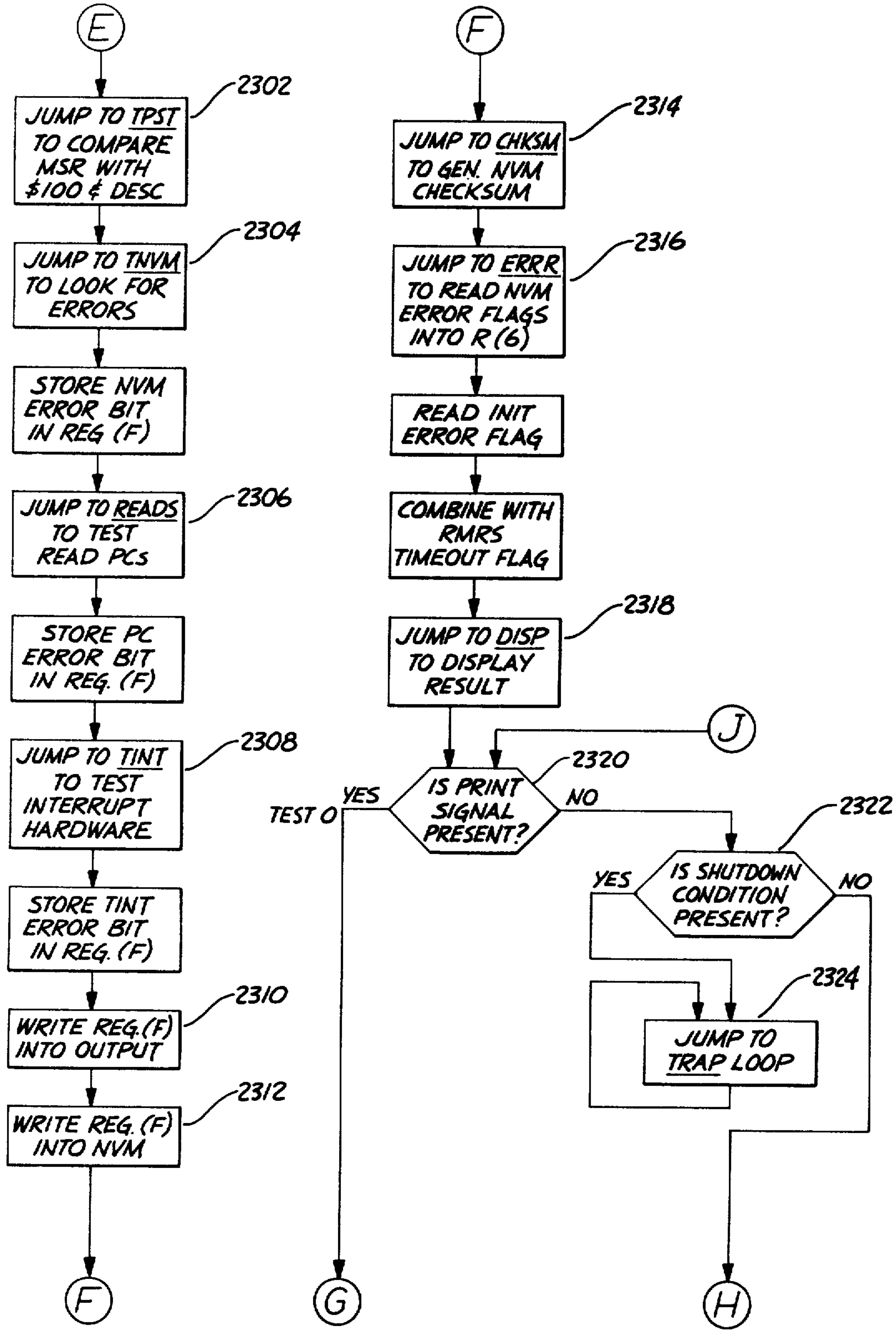
Figure 24:
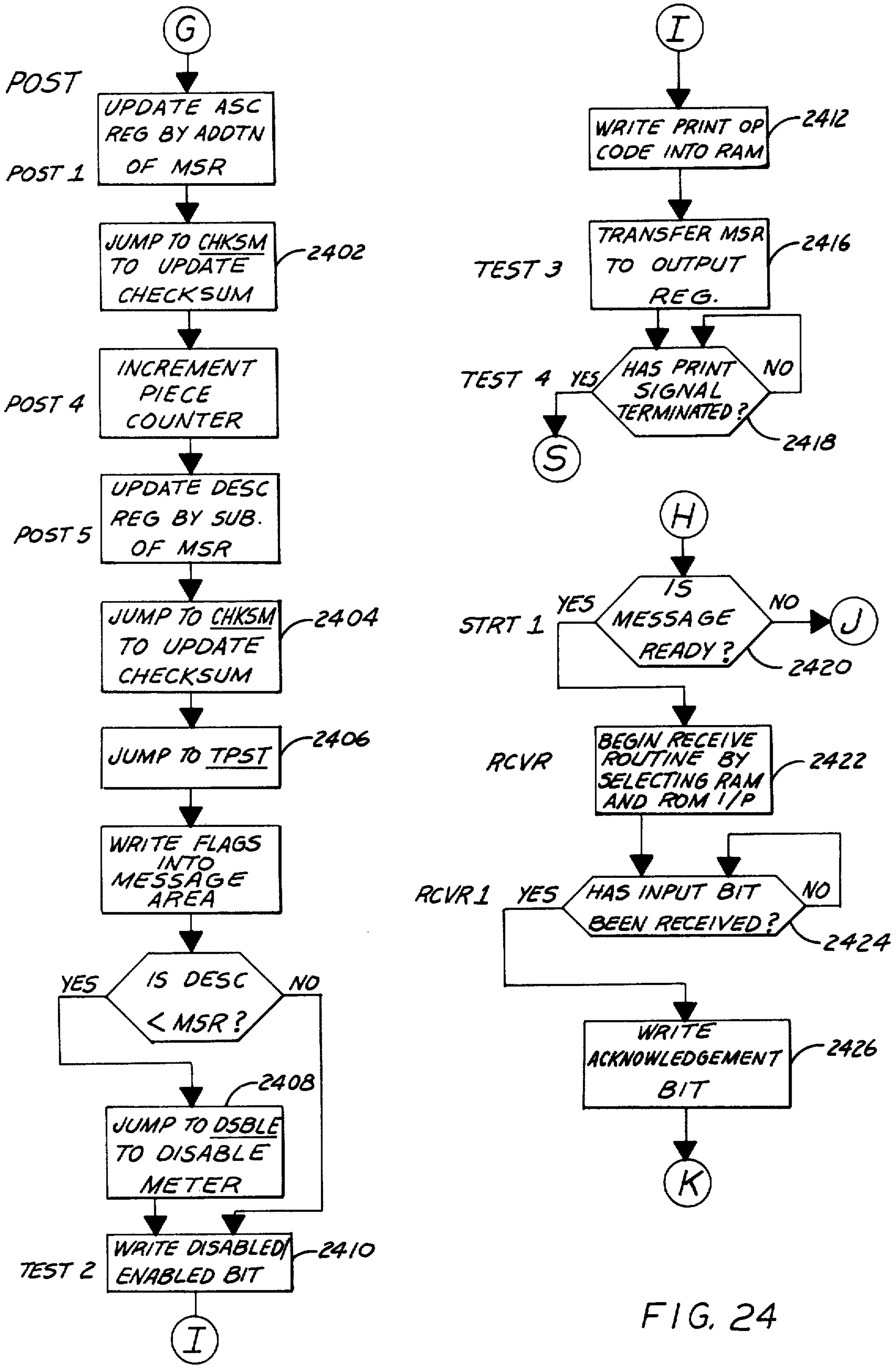
Figure 25:
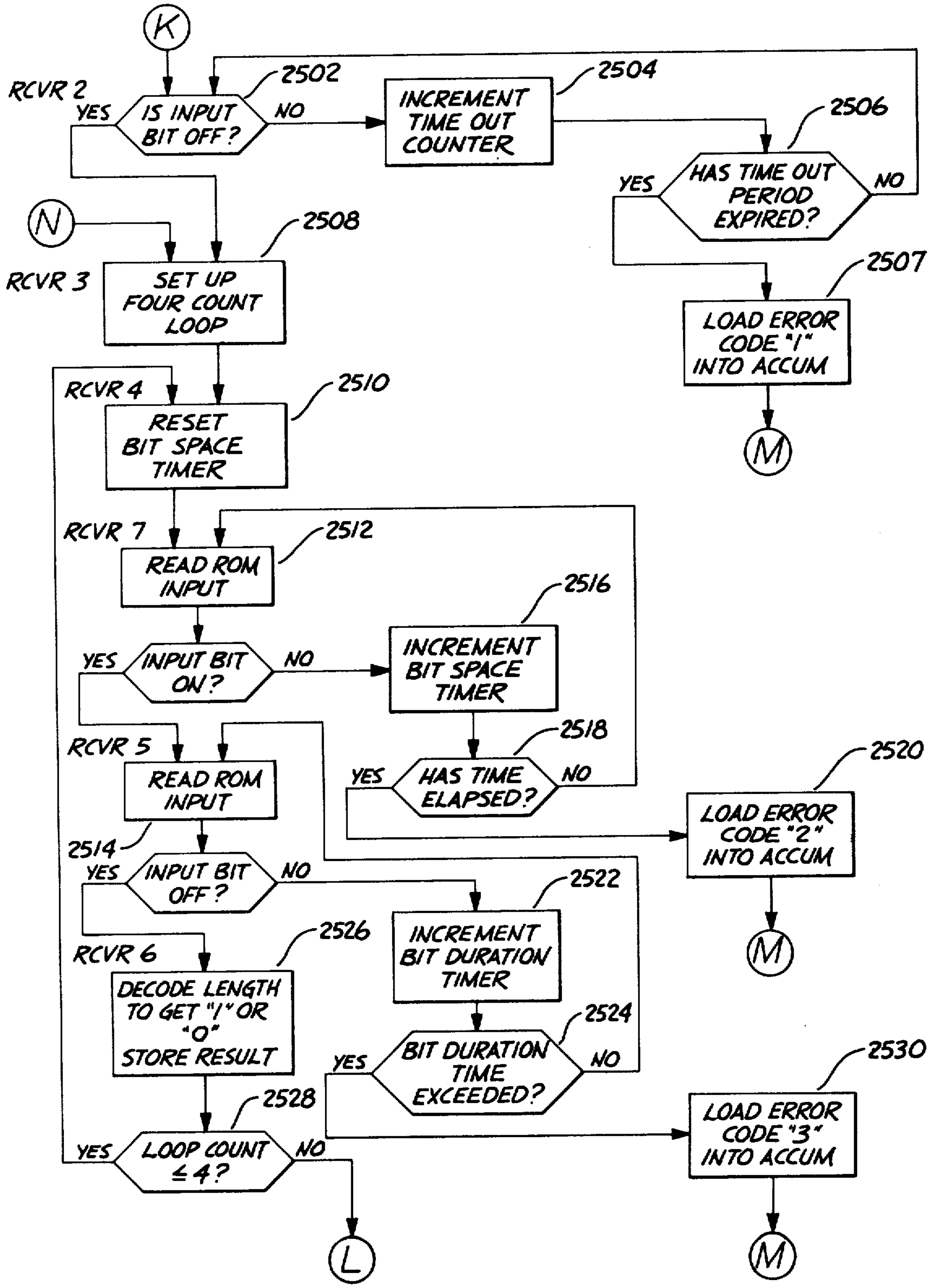
Figure 26:
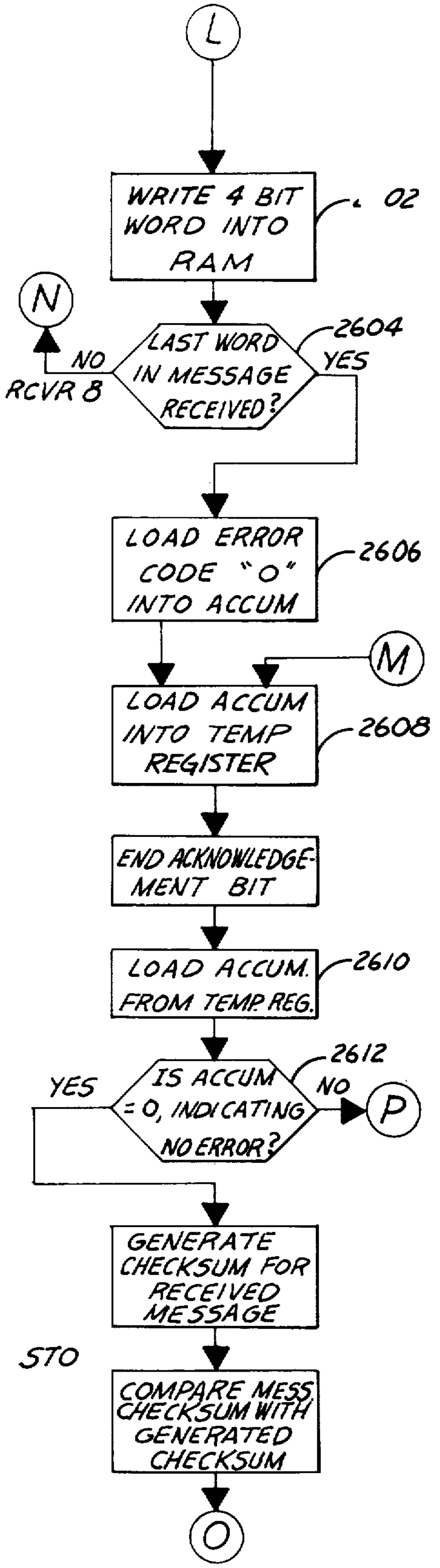
Figure 26:
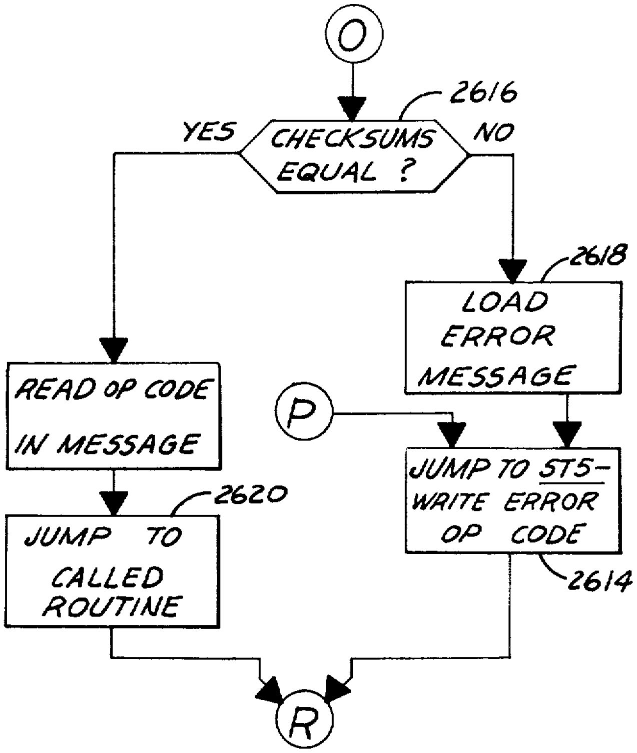

FIGS. 21-26, taken collectively, illustrate the main program for the postage meter. Interconnections between various blocks of the flow chart are shown either as direct arrow connections wherein the arrowhead indicates the direction of the program flow or as indirect connections linked through encircled alphabet characters. An example of an indirect connection is shown in FIG. 21 where an encircled A appears both at the bottom of the left hand column of blocks and at the top of the right hand column. The two points indicated by an encircled character are treated as being directly connected.

The particular CPU chip employed in one embodiment of this invention includes an interrupt input terminal which is disabled (block 2102) as the first step in the main program. Each of the output leads from the output ports 37 and 41 are loaded with 0's to disable the two stepping motors which drive the printer, to initialize the shift registers which control the photocells in the printer setting detector array and the LED display. A binary 4 is loaded into output port 39 to disable the motor select outputs while energizing the event-indicating photocells. The completion of these steps is followed by writing a predetermined code (block 2104) into random access memory. The code is later transmitted to the control unit.

Control of the meter then jumps (block 2106) to an INITS subroutine which sets the printer to 0. This subroutine and all other subroutines called by the main program are described in more detail with reference to later figures. After the INITS subroutine is performed, a check is made for any errors noted during execution of that subroutine. Error codes are written into nonvolatile memory (block 2108), after which a check is made (block 2110) for errors which occured during previous intialization attempts. The initialization subroutine is described as an unconditional routine; that is, regardless of noted errors, it will continue to attempt to reset the meter to zero when called, until a check (block 2112) indicates that the number of unsuccessful initialization attempts has exceeded a predetermined number. If initialization is successfully completed before the predetermined number is reached, an initialization error flag is cleared (block 2114) from nonvolatile memory. Error flags which were generated during previous attempts to set the meter to a specified postage are cleared (block 2116) from non-volatile memory before control jumps to a TNVM subroutine (2118) which tests NVM memory, generates error flags and writes those flags into a specified index register in the central processor.

But if an error had occurred during execution of the INITS subroutine, these intermediate steps would have been skipped with control branching from block 2108 directly to block 2118. Checksum errors and control sum errors are retrieved from nonvolatile memory and written out to the LED display (block 2120) before TINT subroutine (block 2122) is called to test the interrupt input photocells. TINT error codes are written out to the LED display.

A checksum generation routine is performed as part of the main program. The first step in this routine is to initialize the registers (block 2202) to be used. One of the last fourteen words from a previously generated 14 word message (which excludes the checksum words of the message (is retrieved from memory and summed with previously retrieved words in the same message. After the addresses are incremented (block 2204), a check (block 2206) is made as to whether the last word in the message register has been read out of memory. If it hasn't, the cycle is repeated. If it has, the generated checksum is written into memory and the TRAN or transmission routine begins.

Registers to be used are initialized (block 2208), the input/output ports for the communication with the control unit 12 are selected (block 2210) and a start bit is written to the output port dedicated to communication with the control unit. After the start bit is written, a check (block 2212) is made whether an acknowledgement is received. The program continues to recycle through the checking step 2212 until an acknowledgement is received. Once a one is received, a 0 is written out to the control unit and a programmatical delay 2114 occurs to establish an intercharacter gap. A four count loop is set up (block 2216) before a memory location is selected and read (block 2218). The first bit of the retrieved word is read in operation 2219. A binary one is written to the output port which communicates with the control unit and a decision made as to whether the data bit retrieved from memory was a 0. If the bit was not a 0, (i.e., was a 1) control branches to a first delay routine 2220/ which is followed in sequence by a second delay routine (block 2222). If however, the check shows that the bit retrieved from memory was a zero, delay routine 2222 is accessed directly. After delay routine 2222 is finished, a zero is written (block 2223) to the output.

Thus, where the bit being transmitted is a binary one, the output is maintained at a 1 level (light being generated by the LED) for a longer period of time than where the transmitted bit is a 0. After a delay for an intercharacter gap, a check is made as to whether the loop count is less than four; that is, whether all bits in the selected word have been read. If it is, the loop count is incremented to select the next bit of the word before control returns to block 2219. If the loop count equals four, a check is made (block 2224) as to whether the end of the message register has been reached. If not, control is returned to block 2216 at which a four count loop is again set up to read the next word from the message register.

When the last word of the message register is transmitted, the main program continues at block 2302 which is a jump to a TPST subroutine which compares the contents of the meter setting register to the contents of the descending register and to the absolute amount of $100.00. After the TPST subroutine is executed, the TNVM subroutine is called (block 2304) to look for errors bits. Any error bit is stored in the specified register and a jump is made (block 2306) to a READS subroutine which tests the photocells monitoring the printer setting. Error codes generated as a result of the test are stored in the same register as the nonvolatile memory error codes and the jump is made (block 2308) to the TINT subroutine which tests the hardware associated with the interrupt circuitry. Any resulting error code is stored in the same register as error codes produced by the preceding steps. The contents of this register are written both into a specified random access memory (block 2310) and into nonvolatile memory (block 2312).

A CHKSM subroutine is then called (block 2314) to generate new checksums for the altered contents of the nonvolatile memory. An ERRR subroutine is called to retrieve the error flags from nonvolatile memory and to read them into a specified index register in the CPU. Initialization error flags and RMRS time out error flags are read and combined and written into a display area with a DISP subroutine which is called (block 2318) to display the results on LED display 13. A determination (block 2320) is made as to whether a print signal is present. As was mentioned earlier, this signal is generated only when the print drum of the printer has actually begun to move from its home position toward a postage imprinting position. If no print signal is sensed, a check 2322 is made as to whether a shut-down condition is present. A shut-down condition as defined is an underpower condition. If such a condition is sensed, a jump is made to a TRAP loop 2324 which cannot be exited until the meter is completely shut down and powered up again.

If a print signal is detected at block 2320, the main program enters a POST routine which updates the ascending and descending registers, the piece counter and the checksums for the nonvolatile memory registers. The contents of the ascending register are modified by adding the contents of the meter setting register and the CHKSM routine is called (block 2404) to update the checksums associated with those registers. The piece counter is incremented by one and the descending register is decremented by subtracting the contents of the meter setting register. The CHKSM subroutine is again called (block 2404) to update the checksums associated with those registers.

A jump is made to the TPST subroutine (block 2406) to compare the contents of the meter setting register both with $100.00 and with the contents of the descending register. Flags indicating whether the meter setting register exceeds either or both of these levels are written into the message area. If the contents of the descending register are less than the contents of the meter setting register, indicating there is insufficient postage to perform the print operation, a jump is made to a DSBLE routine (block 2408) to disable the meter. A disabled bit is then written (block 2410) into memory. If, however, the amount of postage in the descending register is sufficient, the step 2408 is bypassed and an enabled bit is written in the memory. The print op code is written into random access memory (block 2412) and the meter setting register contents are transferred to an output register (block 2416). An inquiry 2418 is made as to whether the print signal has terminated. Until the print signal does terminate, program control remains at this inquiry. When the print signal has terminated, control is returned to block 2202.

Where no print signal had been sensed at block 2320 and no shut-down condition was sensed at block 2322, program control is transferred directly from block 2322 to a block 2420 at which a check is made as to whether the control unit is ready to send a message. The first step in the message receiving routine (block 2422) is the selection of the input port which receives signals from the control unit 12 and of the random access memory registers into which data messages are written. The processor then waits (2424) until an input bit is received to write out an acknowledgment bit (2426). A check is made (2502) as to whether the input bit has terminated. If it hasn't, a timer is incremented (block 2504) and a check is made (block 2506) as to whether a predetermined period of time has expired. This timing loop is repeated until the input bit is terminated or until the predetermined time has elapsed. In the latter instance, an error code 1 is loaded in the accumulator to indicate that too much time was required to remove the acknowledgment bit. If the time out period has not expired, program control continues at a block 2508 in which a four count loop is set up.

A bit space timer, which checks the interval between incoming bits, is reset in operation 2510 before the input port from the communications channel is read in block 2512. A check is then made as to whether the input bit is on. If it is, the input is again read in block 2514. If if isn't, the bit spacing timer is incremented (block 2516) and a check is made (block 2518) as to whether the maximum allowed space between bits has been exceeded. If the time interval between bits is too great, an error code 2 is written (block 2520) into the accumulator. If the input bit is on at the time of operation 2514, a second decision is made as to whether the input bit has returned to zero. If the input bit has not returned to a zero level, a bit duration timer is incremented (block 2522) and a determination 2524 is made as to whether a maximum bit duration has been exceeded. If the maximum bit duration is exceeded an error code "3" is loaded into the accumulator. If the maximum bit duration has not been exceeded, the input read cycle is repeated until it is determined that the input has returned to a zero level. Since the only difference between a binary 1 and a binary 0 in a message being received is the length of time during which the LED remains energized, it is necessary to decode the length or duration of LED energization (block 2526) to determine whether a 1 or a 0 is being received. The result is stored and a determination (block 2528) is made as to whether the loop count is less than or equal to four. If it is, program control is looped back to block 2510. If the loop count equals four, program control continues with the four bit word being written (block 2602) into random access memory.

If the last word in the message has not yet been received (block 2604), program control returns to block 2508 to read the next four bit word in the message. If the last word has been received, an error code 0 is loaded into the accumulator in block 2606. The contents of the accumulator, whether they are a zero from block 2606 or a nonzero error code from one of blocks 2507, 2520, or 2530 are loaded into a temporary register (block 2608) before the acknowledgment bit is ended. The contents of the temporary register are then reloaded into the accumulator (block 2610) and a determination is made as to whether the accumulator content equals zero (block 2612). A zero accumulator indicates that no errors have occurred during receipt of the message from the control unit. A nonzero accumulator indicates that an error has occurred. Under the latter conditions, a jump 2614 is made to ST5, to write an error op code. If, however, there were no errors, a checksum is generated for the received message and is compared with the message transmitted checksum. A determination is then made (block 2616) as to whether the two checksums are equal. Any inequality indicates that a discrepancy exists between the message as transmitted by the control unit and as received by the meter. An error message indicating a discrepancy is loaded (block 2618) into the accumulator and the error op code is written (block 2614).

If the two check sums are equal, the op code (which is the third word of the message) is read and a jump is made (block 2620) to the routine called by the message. Thereafter, program control returns to block 2202 for another complete cycle of the post-initialization portion of the main program.

Figure 27:
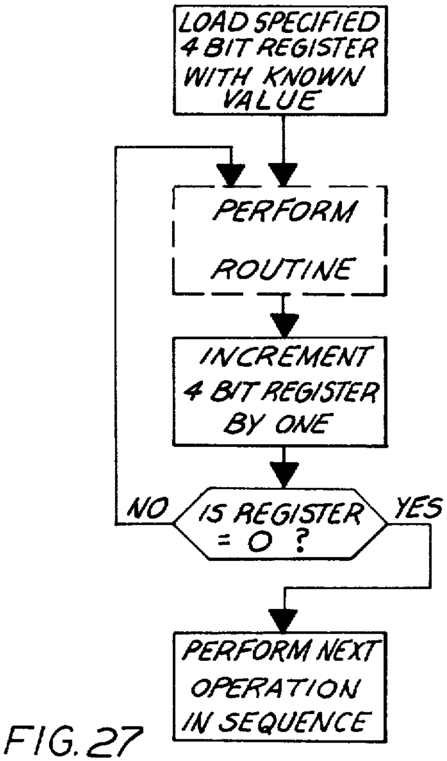
FIG. 27 is a flow chart of a routine for establishing counter loops or, with slight modification, fixed time delays.

The main program and the subroutines use a number of multi-count loops and fixed time delays for reading words, for writing words, for establishing delays for stepping motor operation, and for similar purposes. The programmatical technique for establishing the multi-count loops and fixed time delays is shown in FIG. 27.

A specified four bit register is loaded with a known value less than the maximum capacity of the register. Where the technique is being used to establish a multi-count loop, the routine into which the loop is incorporated is performed once before the four bit register is incremented. A check is then made as to whether the register contents are equal to 0 (maximum register capacity plus 1). If the register does not equal 0, the routine is again performed and the register is again incremented. This loop repeats itself until the check reveals that the register contents equal 0. At this point, the loop is exited and the next operation in the sequence performed.

The only difference between the use of this technique to establishing multi-count loops and its use to establish a fixed time delays is that no routine is performed within the time delay loop; i.e., the "perform routine" block shown in dotted outlines is completely omitted where only a fixed time delay program execution is desired.

In the instruction set used with the Intel 4040 central processor, a single ISZ instruction performs both the incrementing step and the zero equality check.

Figure 28:
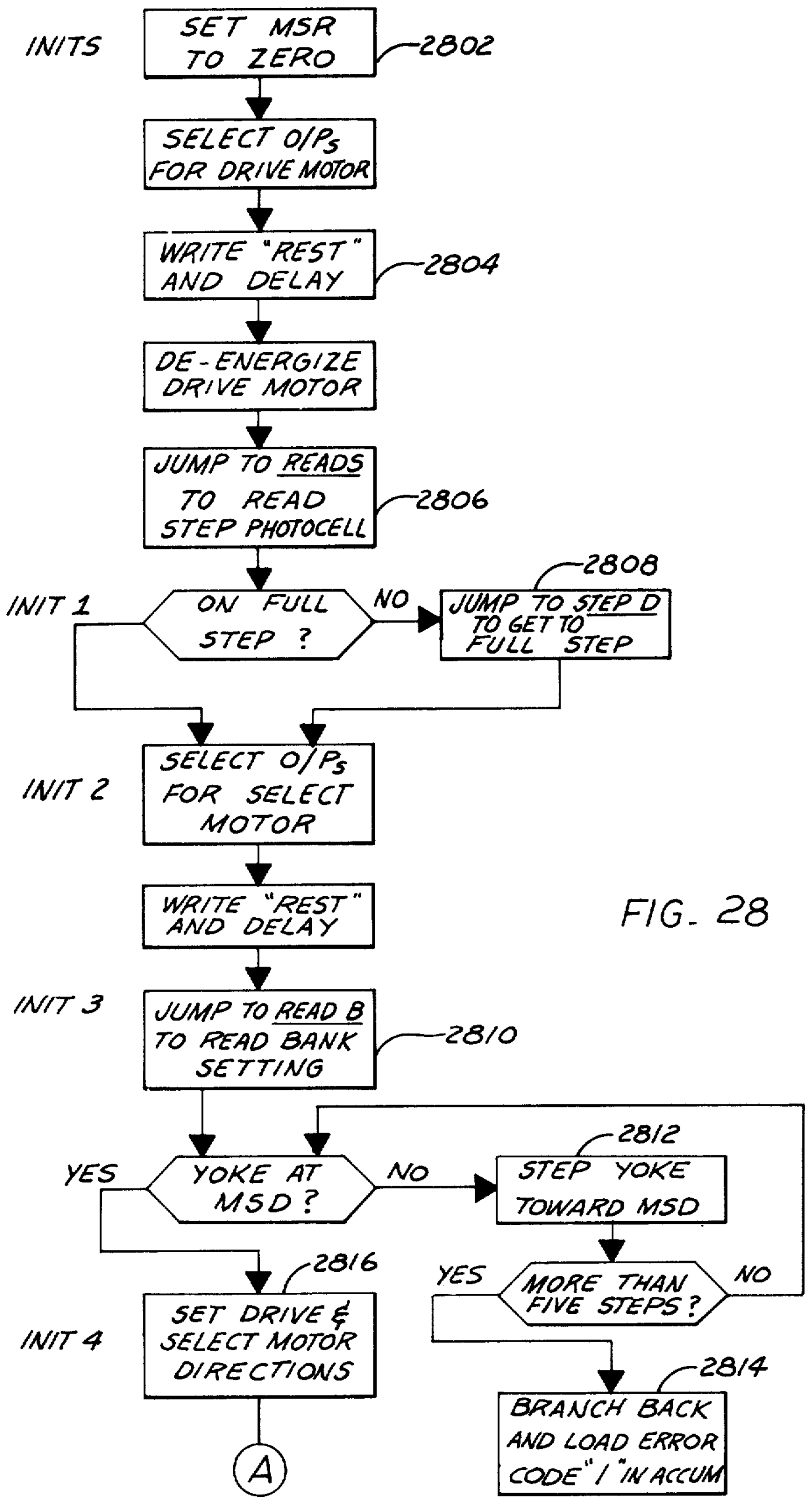
FIGS. 28–29, taken collectively, comprise a flow chart of an INITS subroutine which resets the postage printer to zero.
Figure 29:
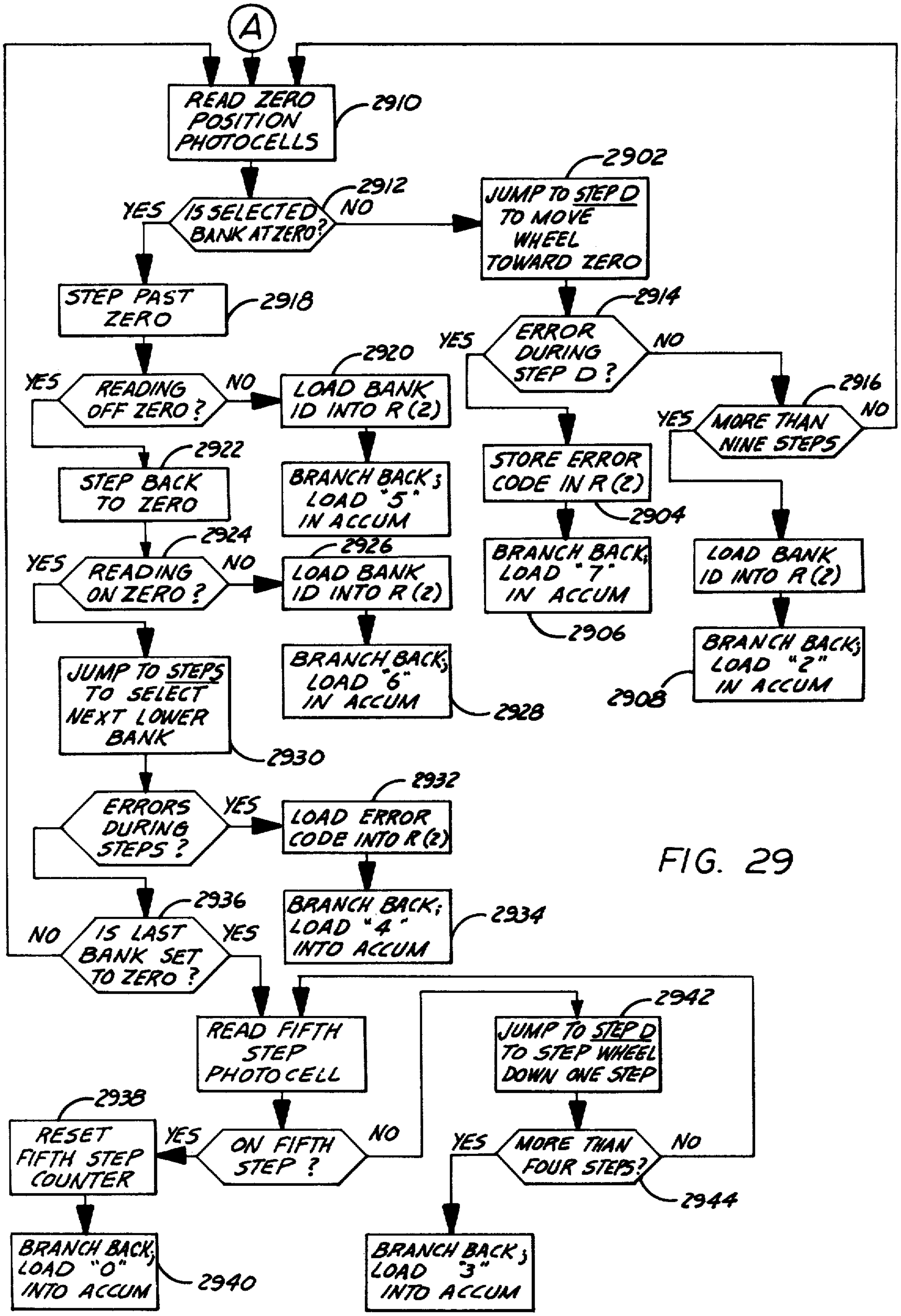

FIGS. 28 and 29, taken collectively, describe an initialization subroutine INITS which is used in setting the meter to zero as part of the initialization routine. The meter setting register or MSR in memory 42 is set to zero (block 2802). The output ports for controlling the digit select motor are selected. The rest position is written out (block 2804) and the delay loop is entered to give the motor time to reach that position. The digit select motor is then deenergized and a jump is made to READS subroutine (block 2806) to read the current setting of the photocell which senses whether monitoring wheel 166 is on a half or a full step. If the monitoring wheel is on the half step, a jump is made to the STEPD subroutine (block 2808) to drive the wheel to a full step. If the monitoring wheel is already on a full step, the output ports for the bank select motor are selected, the rest position for that motor is written out and a fixed delay occurs to permit motor to reach that setting.

A jump has been made to the READB subroutine (block 2810) to determine whether the printer yoke is at the most significant digit. If it isn't, the yoke is stepped towards the most significant digit (block 2812) position with a check being made after each step as to whether or not more than five steps have occurred. If less than five steps have occurred and the yoke has not yet arrived at the most significant digit position, this loop is reiterated. If more than five steps have occurred, an error condition exists since a maximum of five steps should have been required to move the yoke from one extreme to the other. Under these conditions, control is returned to the main program (block 2814) and an error code 1 is loaded into the accumulator. If the yoke reaches the most significant position without exceeding the maximum number of permissible steps, the digit select and bank select motor directions are set (block 2816), after which the zero digit position photocell for the selected bank is read. The first bank to be read is, of course, the most significant digit bank. If the selected bank is not at zero, a jump is made (block 2902) to the STEPD subroutine to drive the print wheel towards zero. If an error occurs during the execution of the STEPD subroutine, an error code is stored (block 2904) in a predetermined index register, control is returned to the main program and an error code 7 (block 2906) is loaded into the accumulator. If no error occurs during the execution of the STEPD subroutine but more than nine steps are required to zero the selected print wheel, the identification of the bank being reset to zero is loaded into the index register before control is returned (block 2908) to the main program with an error code 2 being loaded into the accumulator.

in the absence of errors, the loop including blocks 2910, 2912, 2902, 2914 and 2916 is repeated as the wheel is stepped digit by digit toward the zero position. Once the reading of the photocell indicates that the selected bank is at zero, the print wheel is stepped from zero (block 2918) and a reading made to determine whether the photocell output reflects this. If the photocell output does not change when the print wheel is stepped past zero, there is clearly a malfunction in the system. The identification of the bank being set is loaded into the selected index register (block 2920) before control is returned to the main program. Under these conditions, an error code 5 is loaded into the accumulator.

If the photocell output does change when the print wheel is stepped from zero, the print wheel is stepped back to zero (block 2922) and a second check is made (block 2924) as to whether the photocell again shows the wheel at its zero position. If the photocell does not correctly show the wheel at the zero position, the bank identification is loaded into the specified index register (block 2926). Control is returned to the main program (block 2928) and an error code 6 is loaded into the accumulator.

If the photocells are operating properly during this step-past, step-back error check, a jump (block 2930) is made to the STEPS subroutine to select the next lower bank. Any errors occurring during execution of the STEPS subroutine are identified and the proper error code is loaded into the specified index register (block 2932). Control is returned to the main program (block 2934) with an error code 4 being loaded into the accumulator. If no errors occurred during the execution of the STEPS subroutine, a check (block 2936) is made as to whether the last bank has been set to zero. If it hasn't, program operation continues at block 2910 which repeats the same bank setting steps and error checking steps for each of the banks.

When the last bank has been set to zero, the fifth step photocell adjacent the monitoring wheel 166 is read and a check is made as to whether there is a match between the contents of the fifth step counter and the location of the extra long slot on the monitoring wheel. If a match is detected, the fifth step counter is reset (block 2938), after which control branches back to the main program (block 2940). If the check does not indicate a match between the position of the monitoring wheel and the contents of the fifth step counter, a jump (block 2942) is made to a STEPD subroutine to step the monitoring wheel down one step. A check (block 2944) is made as to whether or not four such steps have occurred. If they haven't, control is returned to the block in which the fifth step photocell is read.

In summary, the INITS subroutine resets the print wheel associated with each bank from its last setting to a zero setting while simultaneously checking to make sure the photocell associated with that bank is providing proper zero position reading. The INITS subroutine also zeros the fifth step counter when the extra long slot on the monitoring wheel is lined up with the photocell which detects the slot.

Figure 30:
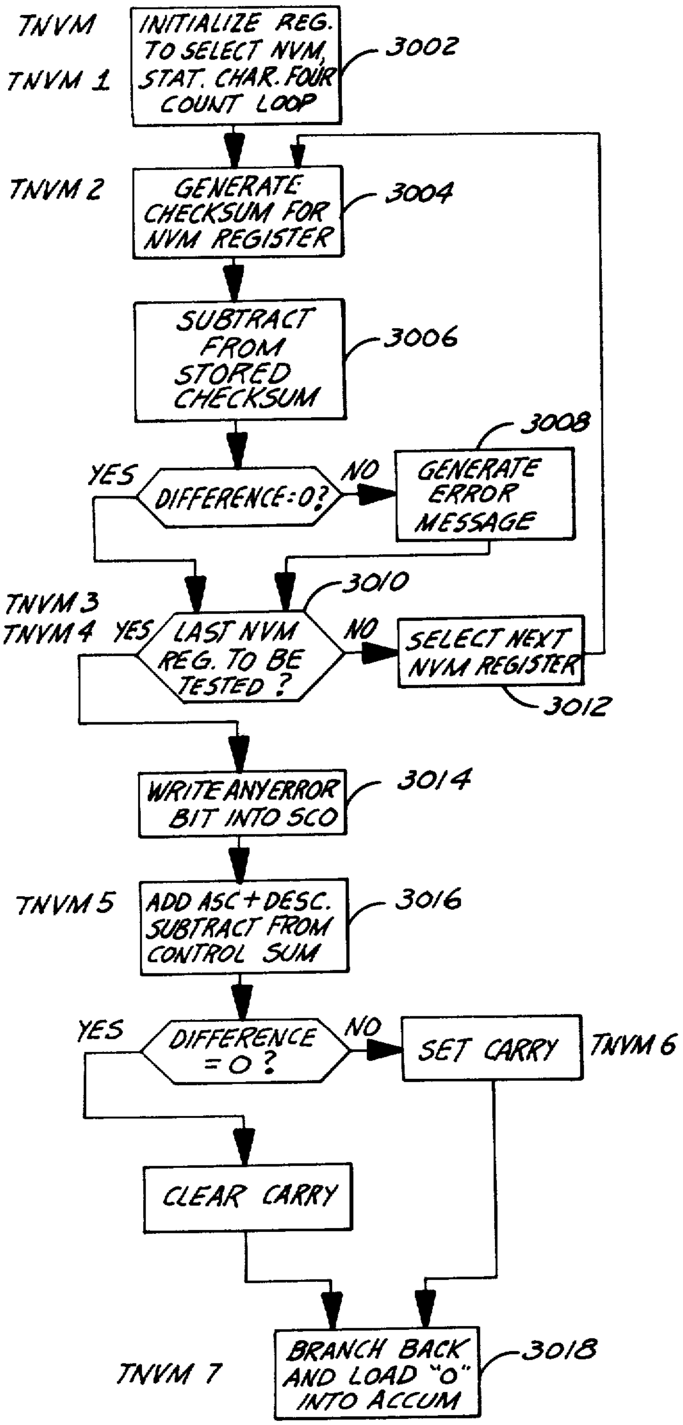
FIG. 30 is a flow chart of a TNVM subroutine which checks for the presence of error indicators stored in the nonvolatile memory.

FIG. 30 is a flow chart of a TNVM subroutine which checks for correspondence between checksums and data stored in the nonvolatile memory. The subroutine also checks whether the sum of the contents of the ascending and descending registers equal the control sum.

The first step (block 3002) of the subroutine is to initialize registers to select the first register in the non-volatile memory, to select a status character location into which an error code can be written and to set up a four count loop. Data stored in the selected register of the non-volatile memory, excluding stored checksum words, is summed to generate a checksum for the register contents in an operation 3004. The checksum already stored in the register is retrieved and the generated check sum subtacted therefrom (block 3006). If the difference between the stored checksum and the generated checksum are not equal to zero, indicating that errors have occurred either in writing data into or reading data from the nonvolatile memory, an error message is generated (block 3008) for that particular register. If the stored checksum does equal the generated checksum, a determination (block 3010) is made as to whether the last nonvolatile memory register has been tested. If the last register has yet to be tested, the next register is selected (block 3012) and control is looped back to block 3004, to repeat the checksum generation and comparison process. When the last nonvolatile register has been tested, any resulting error bits are written (block 3014) into status character 0 (OSCO) of register two in random access memory 38.

Referring again briefly to FIG. 19, a status character is a four bit memory location. A 1 in any bit of that word indicates a checksum error in the particular register associated with that bit.

The TNVM subroutine retrieves and adds the contents of the ascending register and descending register (block 3016) after which the sum is subtracted from the retrieved control sum. If a difference other than zero is noted, as it should be during proper operation, the accumulator carry bit is cleared. The last step in the subroutine (block 3018) is a branch back to the main program.

Figure 31:
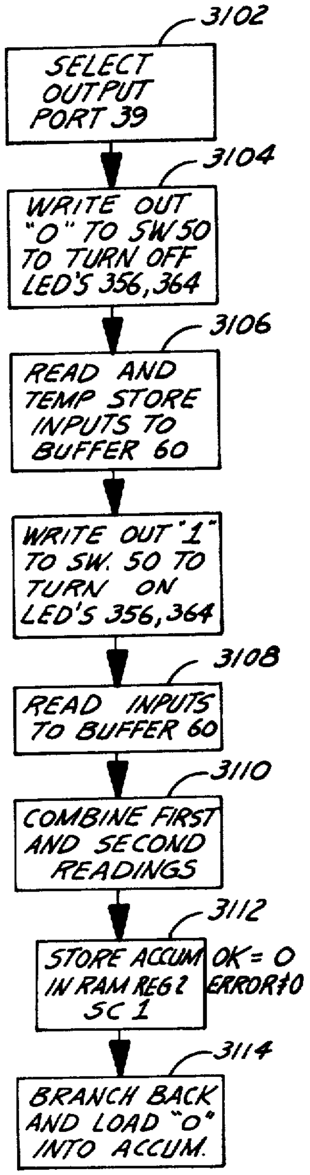
FIG. 31 is a flow chart of a TINT subroutine used to test the operation of interrupt photocells.

FIG. 31 is a flow chart of a TINT subroutine called to test the photocells in the event-indicating signal generator circuit 32. One photocell indicates whether the meter has been removed from its base. The other photocell indicates whether a print operation has begun. The first step in the subroutine (block 3102) is to select the ouput port which controls the test switch 50 in the signal generator circuit. A zero is written (block 3104) at this output port to turn off the light emitting diodes 356, 364. The inputs from the meter locked detector 54 and print detector 56, which include the referenced LED's, are read to input buffer 60 (block 3106) and temporarily stored. A binary 1 is then written at the selected output port to switch 50 to turn on the LED's. The detector inputs are again read (block 3108) and the two readings combined (block 3110). If the circuits are operating properly, the accumulator should equal zero. If an error has occurred, the accumulator contents will not be equal to zero. The accumulator are stored in status character 1 of register two of random access 38 (block 3112). Control is returned to the main program (block 3114).

Figure 32:
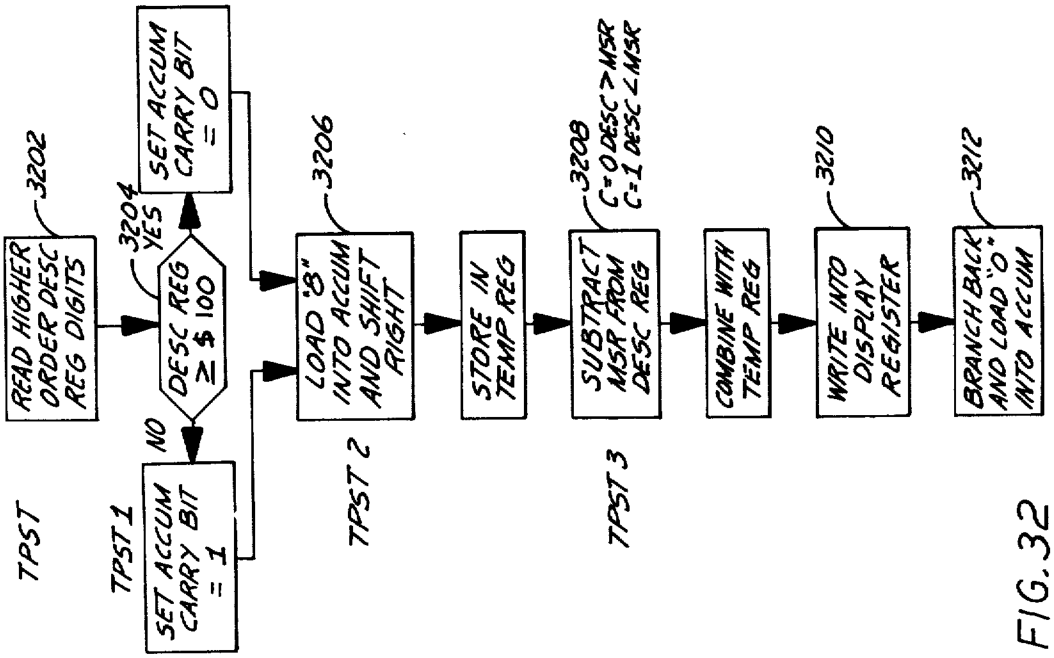
FIG. 32 is a flow chart of a TPST subroutine which compares the contents of a meter setting register with the contents of the descending register.

FIG. 32 is a flow chart of a TPST subroutine called to compare the contents of the descending register to the contents of the meter setting register and to an absolute amount of $100.00. The higher order digits of the descending register are read (block 3202) and a determination is made (block 3204) as to whether the contents of the descending register are greater than or equal to $100.00. Whenever the contents of the descending register fall below this arbitrarily selected $100.00 limit, an LED display lamp reminds the user that the postal meter will need to be recharged soon. The accumulator carry bit is set to 1 if the amount stored in the descending register is less than $100.00 but is reset to zero where the contents of the descending register exceed or are equal to $100.00. A hexadecimal representation (1000) of the number eight is loaded (block 3206) into the accumulator and shifted right. The accumulator contents are then stored in the temporary register.

The contents of the meter setting register are retrieved and subtracted (block 3208) from the contents of the descending register. If the descending register contents are greater than the meter setting register contents, the accumulator carry bit is reset to 0. Otherwise it is set to 1. The accumulator contents are then combined with the contents of the temporary register and the result is written (block 3210) into a display register. A zero is written into the accumulator (block 3212) upon return to the main program.

The end result of the TPST subroutine is a four bit word which is stored in random access memory location 1F which is the last register for the LED display bit. The leftmost bit of this word is a one if the contents of the descending register are less than the contents of the meter setting register. The next less significant bit is a one if the contents of the descending register are less than $100.00. The next bit is an unconditional "on" bit which gives the user an indication that the meter is on. The least significant bit of the four bit word should always be a zero.

Figure 33:
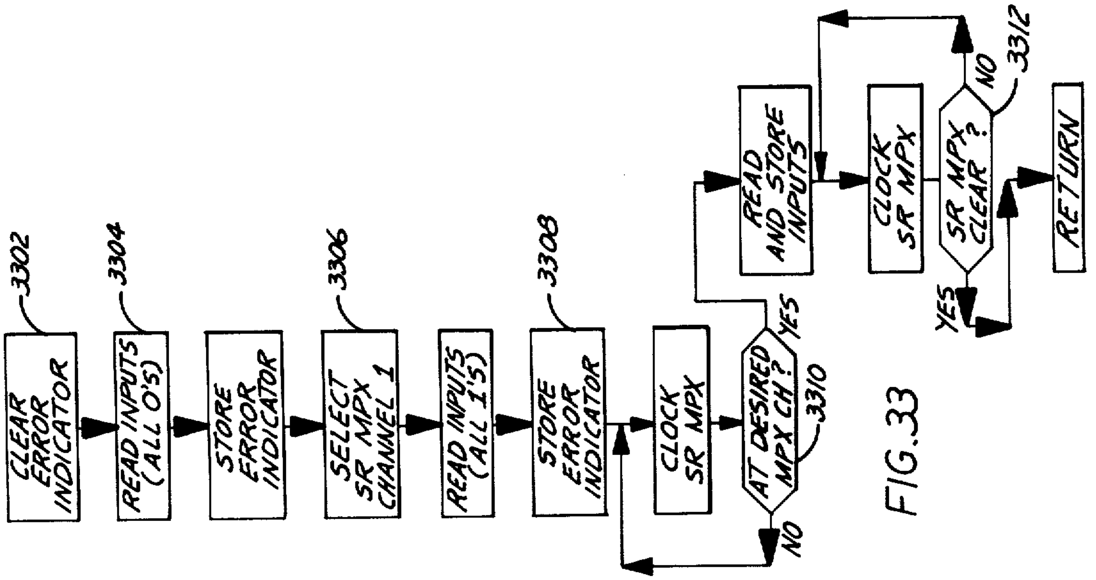
FIG. 33 is a flow chart of a READS subroutine for reading printer setting detectors and for checking for detector failure.

Referring to FIG. 33, the illustrated READS subroutine is used in controlling the printer setting detector array 30.

The subroutine includes preliminary steps (not shown) for selecting which of the three detector-containing columns of the printer setting detector array are to be selected. After the preliminary steps have been carried out, the error indicator for the array output is cleared (block 3302) and all inputs from the array are read (block 3304) before any data is shifted into the shift register 28. At this point, the detector array should produce all zeros. If it does not, an error condition is indicated and stored. Then, under the control of the electronic control unit, a binary 1 is shifted (block 3306) to the first stage of the shift register multiplexer. The signals on the outputs of the comparator amplifiers are again read. At this point, the amplifiers should have binary 1 outputs for the reasons stated in the description of FIG. 11. If not, all of the signals are binary 1's, an error indication is stored (block 3308) and the shift register 28 is clocked by the single clock pulse. A check is them made at decision block 3310 as to whether the binary 1 is at the preselected stage of the shift register. The clock pulses are repeatedly applied to the shift register until the binary 1 is shifted into the desired stage.

When the binary 1 has been shifted into the desired multiplexer stage, the inputs from the associated detectors are read and stored. After the read operation is complete, the shift register 28 is again clocked and a check made at decision block 3312 to see whether the binary 1 has cleared the last stage of the shift register. The shifting operation is repeated until the shift register is clear, after which the control is returned to the main meter program.

Figure 34:
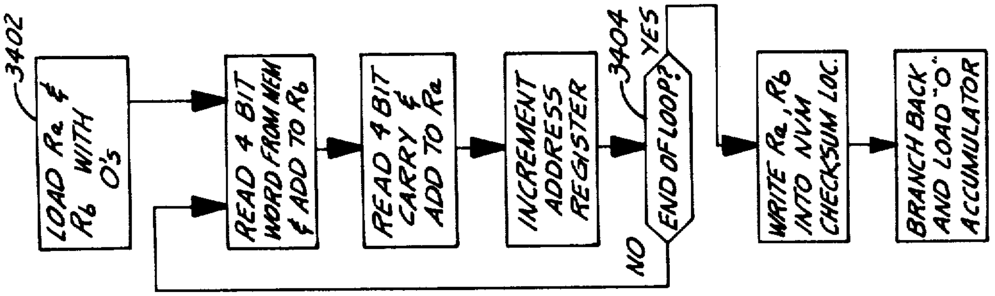
FIG. 34 is a flow chart of a CHKSM subroutine which generates error-detecting checksums for stored information.

FIG. 34 is a full chart of a CHKSM subroutine which is called to generate new checksums for selected registers in the nonvolatile memory when the contents of those registers have been changed. The starting address of the NVM register to be accessed is set in the calling routine. Once that register has been selected, a pair of temporary registers are initialized (block 3402) by loading them with zeros. A four bit word from the selected nonvolatile memory register is then read and added to the contents of one of these registers, arbitrarily designated as register $R_b$. Carry bits are accumulated in an adjacent register $R_a$. During the first cycle of the CHKSM subroutine, there is of course no carry bit. The address register which indicates the nonvolatile memory word being read is incremented and a determination (block 3404) is made as to whether the last word in the register has been read. The decision 3404 is made using a count loop of the type previously discussed. The count loop is not expressly illustrated in the CHKSM flow chart.

If the end of the selected NVM register has not been reached, the cycle is repeated with a new four bit word being read from memory and added to the previously accumulated words in register $R_b$. The carry (if any) which results from this step is added to the contents of register $R_a$. When the end of the loop is reached, the contents of registers $R_a$ and $R_b$ are written into the checksum locations for the selected NVM register. The high order or carry is written into word 0 of the register while the low order is written into word 1. Control is returned to the main program.

Figure 35:
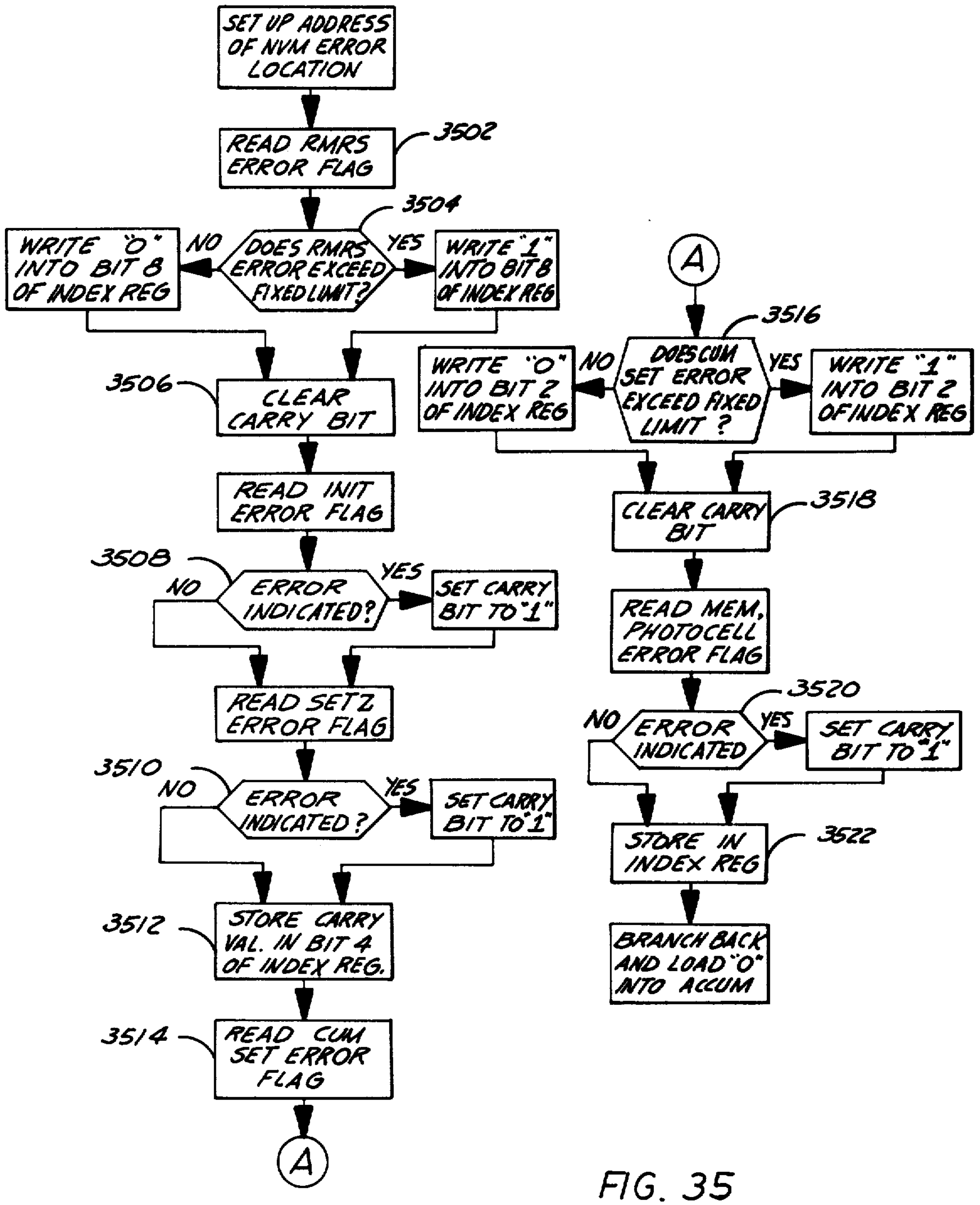
FIG. 35 is a flow chart of an ERRR subroutine which retrieves error indications stored in nonvolatile memory for use in deciding whether certain subroutines should be called.

FIG. 35 is a flow chart of an ERRR subroutine called to read error registers in the nonvolatile memory and to set up error indications in an index register of the central processor in a form which permits determination as to whether certain operations or subroutines should be performed or aborted. Error indications are stored in Register 2, words 2–6 of the nonvolatile memory. The first step in the ERRR is to set up the address of the first of these error registers; i.e., the error register containing error codes for the RMRS subroutines. Any error code stored at this location is read (block 3502) and a check is made (block 3504) as to whether the RMRS error exceeds a fixed limit. As was mentioned earlier, the user is given a certain number of opportunities to carry out required steps at the beginning of the RMRS subroutine. If he does enter the correct combination within a certain number of attempts, a zero is written to the most significant bit or bit 8 of a specified index register. If the user fails to enter the correct combination within the allowed number of attempts, a 1 is written into the same location. The central processor is instructed (block 3506) to clear the accumulator carry bit as a precaution, since the bit might have been set during the performance of earlier subroutines.

The nonvolatile memory location containing the error flags associated with the initialization process is read and a determination (block 3508) is made as to whether any initialization errors are indicated. If such errors are indicated, the accumulator carry bit is set to 1. If no errors are indicated, the carry bit remains at the zero level. The nonvolatile memory register containing error flags associated with the meter setting subroutine is read and another determination (block 3510) is made as to whether setting errors have been recorded. If so, the carry bit of the accumulator is set to 1. The value of the carry bit is stored (block 3512) in the second most significant bit of the specified index register.

A binary 1 loaded into this location in the specified index register will indicate that an initialization error and/or a setting error has occurred but will not specify exactly which kind of error has occurred. A binary 0 loaded into this location in the specified index register indicates that no errors have been recorded during the execution of either the initialization or meter setting subroutines.

The nonvolatile memory register which stores error codes related to the cumulative number of sequentially occurring setting errors is read (block 3514) and a determination is made (block 3516) as to whether the cumulative number exceeds a predetermined limit. If it has, a binary 1 is written into the second least significant bit of the specified index register. Otherwise, a binary O is written into that location in the register. The accumulator carry bit is cleared (block 3518) assuming it was set during the reading of the initialization error flags and setting error flags. The nonvolatile memory register which stores error flags relating to memory or photocell errors is read and a determination made (block 3520) as the whether any errors are indicated. If errors are indicated, the accumulator carry bit is set to one. The carry bit value, whether a 1 or a 0 is stored (block 3522) in the least significant bit position of the index register. Meter control branches back to the main program at this point.

The error-indicting bits which are loaded into the specified index register remain there after the ERRR subroutine is exited. The contents of this register are accessed during the execution of other subroutines.

Figure 36:
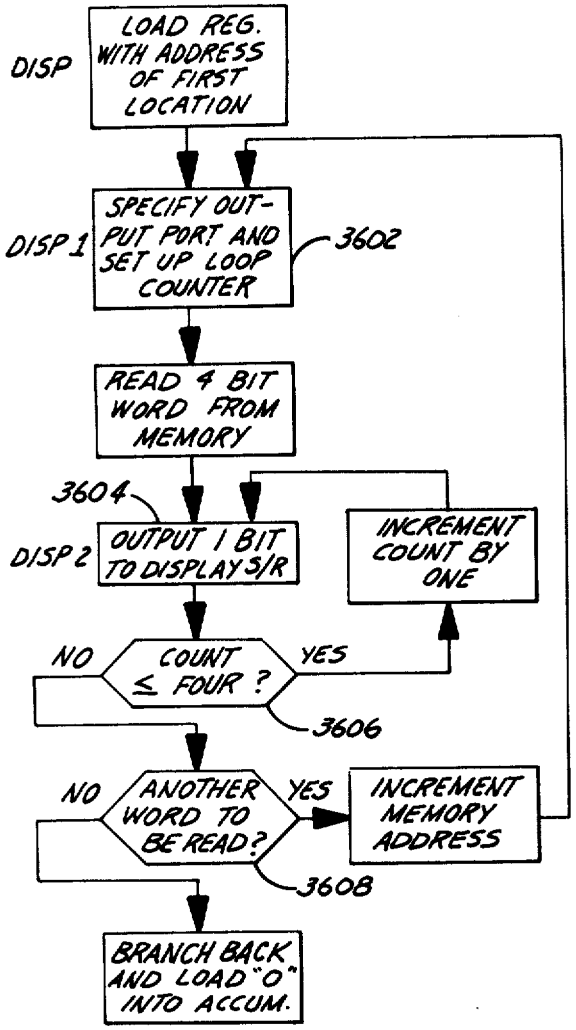
FIG. 36 is a flow chart of a DISP subroutine which outputs condition-indicating data from memory to the LED display.

FIG 36 is a flow chart of a DISP subroutine used to retrieve LED display indicator bits from random access memory 38 and to write those indicators to the outputs of the shift register multiplexer 11, which drives the LED display 13. A specified index register is loaded with the address of the first word (word 1D) of the display area in random access memory 38. The output port connected to the shift register multiplexer 11 is specified (block 3602) and a four count loop counter is set up.

The first four bit word is read from memory into the accumulator. One bit of this word is written out (block 3604) to shift register multiplexer 11, after which a check (block 3606) is made as to whether the count in the loop counter is less than or equal to four. If it is, the count is incremented by one and another bit from the same word is written out to the shift register multiplexer. When the loop count exceeds four, the program branches to block 3608 which determines whether another word in the display area registers and random access memory remains to be read. If another word is to be read, the memory address is incremented before program control returns to block 3602 to repeat the read/write cycle for the newly addressed word. When all three words in the display area of the random access memory have been read out, control is returned to the main program.

Figure 37:
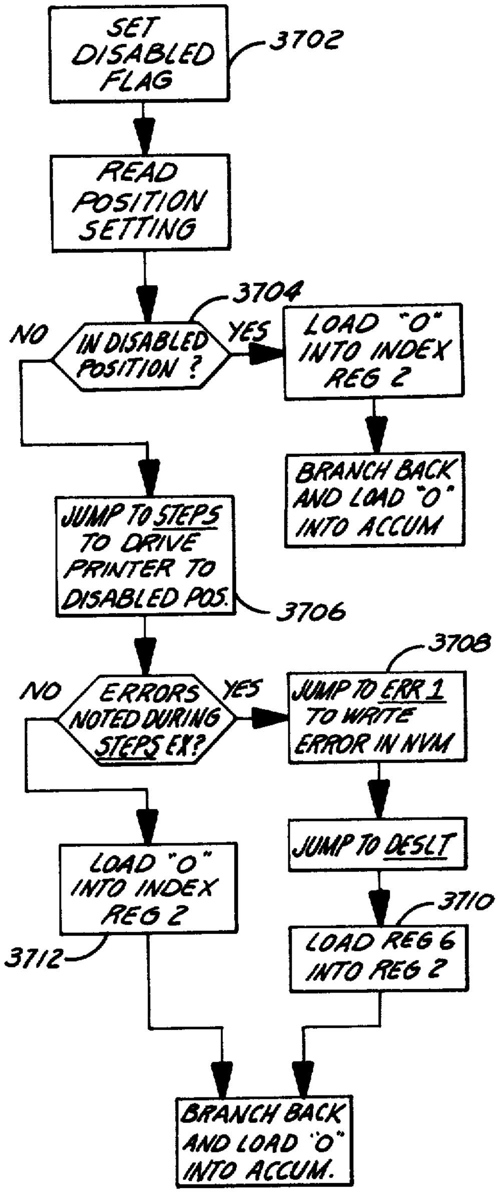
FIG. 37 is a flow chart of a DSBLE subroutine which is used to drive the printer to a disabled position.

FIG. 37 is a flow chart of a DSBLE subroutine which is used to disable the printer; i.e., to drive the yoke to a position in which all of the print wheels are mechanically locked up by the troughs on the yoke surface. When control of the meter jumps to the DSBLE subroutine, a disable flag is initially written (block 3702) into SC1 or register 1 in random access memory 38.

The last bank setting of the printer is read from SC3 of the same register and a determination is made (block 3704) whether the printer was already sitting in the disabled position when the DSBLE subroutine was called. If the printer was already disabled, a 0 is loaded into a specified index register and control returns to the main program. But, if the printer is not disabled, a jump is made (block 3706) to the STEPS subroutine to drive the printer to the disabled position. Any errors which are noted during the execution of the STEPS subroutine are written (block 3708) into nonvolatile memory before a jump is made to a DESLT subroutine.

The DESLT subroutine is called only when setting problems or photocell reading problems occur. This subroutine is described in more detail with reference to a later figure. If the DESLT subroutine is called, the contents of the error flag index register are loaded into the index register specified earlier in the DSBLE subroutine (block 3710) before control is returned to the main program.

If, however, the STEPS subroutine is called and executed without errors, only a 0 is loaded (block 3712) into the specified index register before control is returned to the main program.

Figure 38:
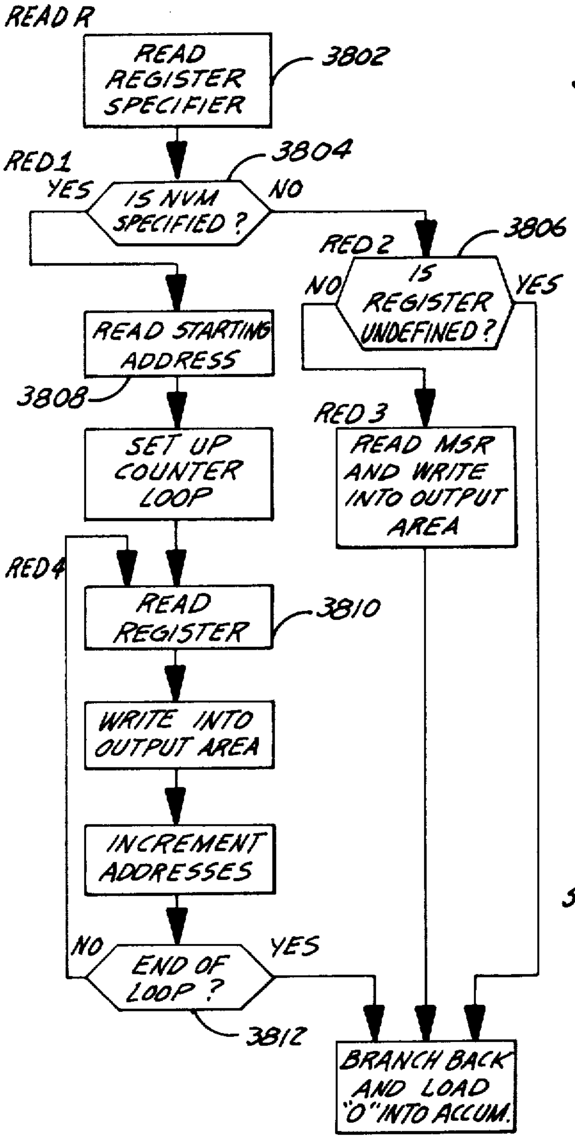
FIG. 38 is a flow chart of a READR subroutine for reading selected memory registers.

FIG. 38 is a flow chart of a READR subroutine which gives a user unrestricted access to certain registers in the nonvolatile and volatile memories. The register to be read is specified in the data message block in register 0 of memory 38. The first data word (word 03) in this register is read (block 3802) to specify the memory location to be accessed by the user. A check is made (block 3804) to determine whether the user has specified a location within the nonvolatile memory. If a memory location other than the nonvolatile memory is specified, a further check (block 3806) is made as to whether the specified register is undefined; i.e., whether it is a register other than the meter setting register. If the block 3806 indicates the meter setting register is specified, tht register is read and the contents written into an output area from which they can be sent to the control unit. After the register is read and written out, control is returned to the main program. But if the check 3806 determines that the register sought to be accessed is undefined, control is returned immediately to the main program.

If the earlier check 3804 shows that a register within nonvolatile memory has been specified, the first location in the specified area is read (block 3808) before a counter loop is set up. The specified register is read (block 3810) and written into a specified output area. The addresses for the registers to be read and for the output area into which the data is to be written are incremented and a check 3812 is made as to whether the end of the specified register has been reached. If it hasn't, program control is returned to block 3810. If it has, control is returned to the main program.

Figure 39:
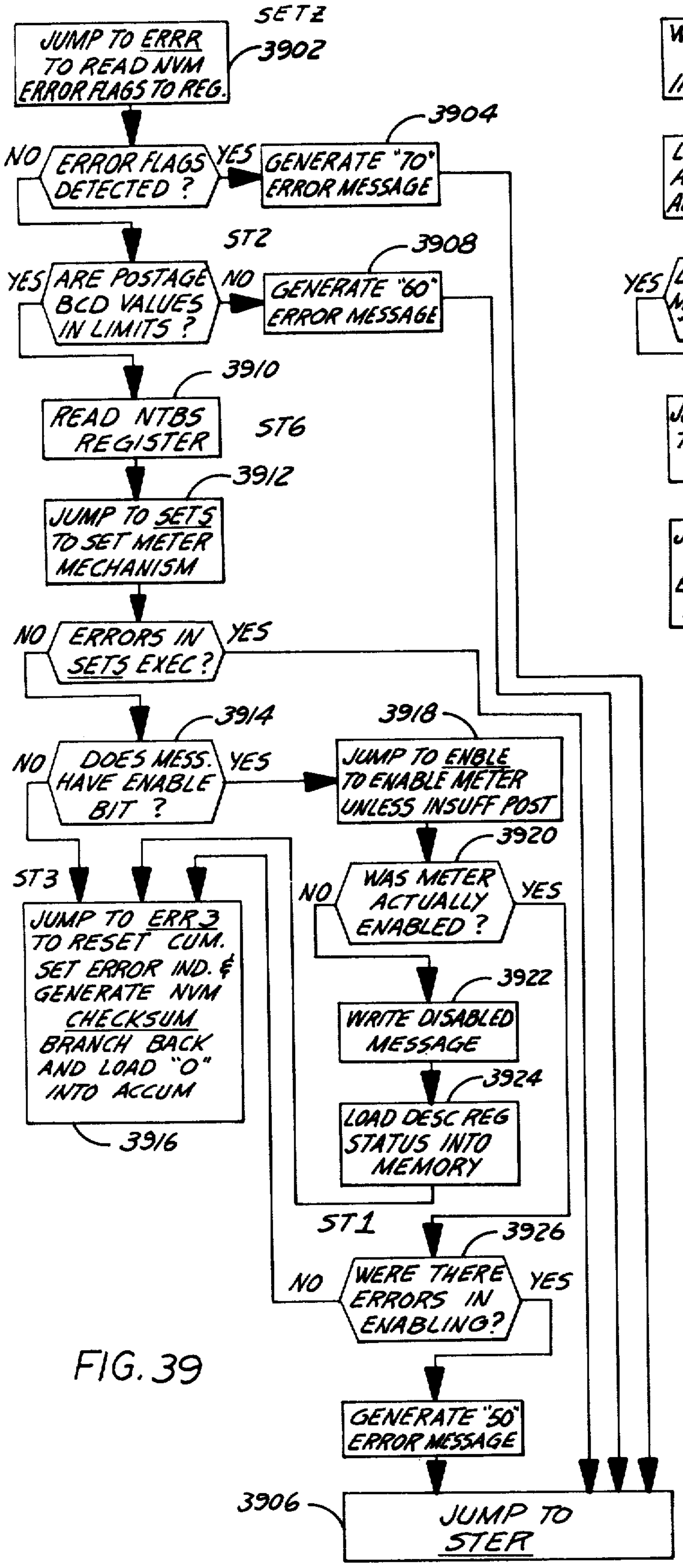
FIG. 39 is a flow chart of a SETZ subroutine which performs preliminary and final operations during setting of the postage printer.

FIG. 39 is a flow chart of a SETZ subroutine which is used to set the printer to a specified postage amont. The first operation in the subroutine (block 3902) is a jump to the ERRR subroutine described previously to permit any error flags stored in nonvolatile memory to be retrieved and loaded into a specified index register. If any flags are detected after the return from the ERRR subroutine, a "70" error message is generated (block 3904) and a direct jump is made (block 3906) to an error writing STER subroutine. But if no error flags are detected, a check is made as to whether the BCD representations of the postage to be set are within limts; i.e. 0–9. If a postage value is found to fall outside the limits, a "60" error message is generated (block 3908) and a direct jump made to the STER subrutine. If the postage values are within limits, the NTBS register is read (block 3910). The SETS subroutine, described in more detail later, is called in operation 3912 to set the printer mechanism to the postage values specified in the NTBS register. If any errors are noted during the execution of the SETS subroutine, a direct jump is made to the STER subroutine. If no errors are noted, a decision (block 3914) is made as to whether the message has an enable bit. If the message lacks an enable bit, a jump is made to an ERR3 subroutine (block 3916) to reset the cumulative set error indicator and to generate a new NVM checksum. After that, control is returned to the main program.

If, however, the message has the enable bit, a jump is made (block 3918) to an ENBLE subroutine to enable the matter, assuming there is sufficient postage remaining in the descending register to actually print the specified postage. After execution of the ENBL subroutine, a decision 3920 is made as to whether the meter was acutally enabled. It it wasn't, a disabled flag is written (block 3922) into random access memory. The status of the descending register (whether less than $100.00 and/or less than the meter setting register) is loaded into memory (block 3924) before a jump is made to block 3916.

If the decision block 3920 shows the meter was actually enabled as requested, a check 3926 is made as to whether any errors occurred in the enabling process. If they did, a "50" error message is generated before control is jumped to the STER subroutine. If there were no errors during the enabling, control branches to the block 3916 which ultimately returns control to the main program.

Figure 40:
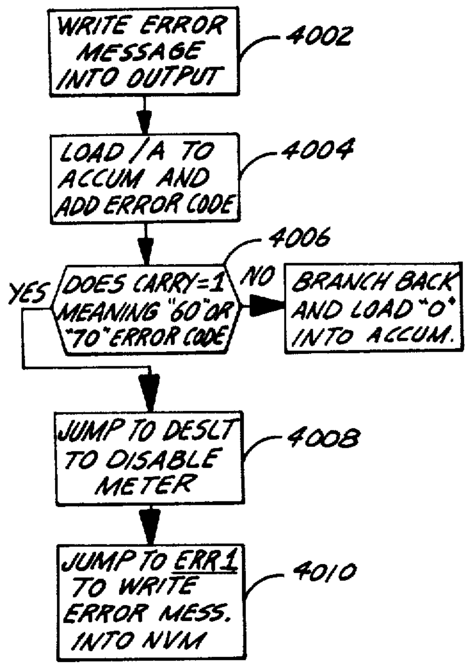
FIG. 40 is a flow chart of a STER subroutine which handles error messages and calls a disabling routine.

FIG. 40 is a flow chart of the STER subroutine which can be called at several points during the execution of the meter setting or SETZ subroutine. When the STER subroutine is called, a specific error meassage has already been loaded into the accumulator. The first operation in the STER subroutine (block 4002) is to write this error message into a specified word of the data message register of memory 38. A hexadecimal A is loaded into the accumulator (block 4004) and the generated error code is added to the accumulator contents. If a decision 4006 shows that the carry bit has been set to 1, this means either that error flags were originally read from the nonvolatile memory at the start of the SETZ subroutine or that the postage values are not within BCD limits. In the event of either type of error, a jump (block 4008) is made to the DSLT subroutine to disable the meter. Thereafter, control is jumped (block 4010) to ERR1 to cause an error message to be written in the nonvolatile memory.

If decision block 4006 shows that no error or that an error code other than a "60" or "70" error code was generated during the execution of the SETZ subroutine, control is returned immediately to the main program.

Figure 41:
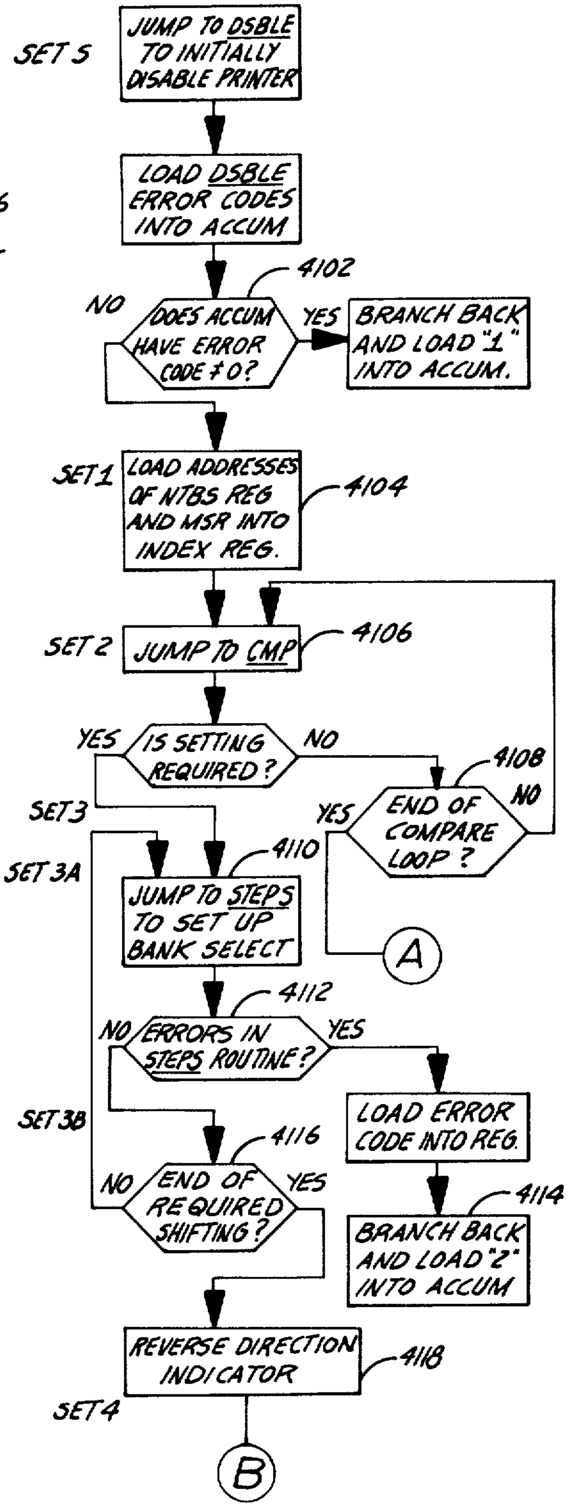
FIGS. 41–42, taken collectively, comprise a flow chart of a SETS routine used to set the printer to a desired postage.
Figure 42:
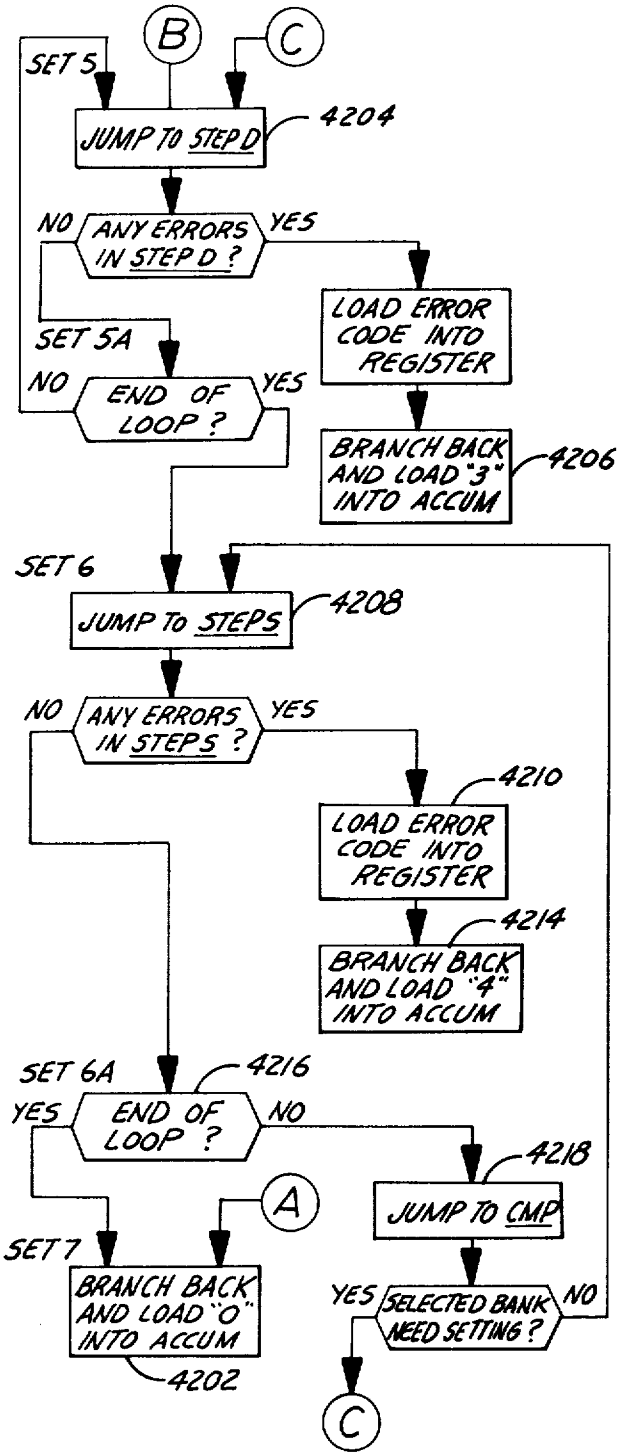

FIGS. 41 and 42, taken collectively are a flow chart of the SETS subroutine which is called during execution of the SETZ subroutine to actually set the printer to the postage values specified in the NTBS register.

The first operation in the SETS subroutine is a jump to the DSBLE subroutine described previously to initially disable the printer. Any error code associated with the execution of the DSBLE subroutine is loaded into the accumulator and a decision 4102 is made as to whether the accumulator contents are equal to zero. A non-zero accumulator indicates that an error has occurred during the execution of the DSBLE subroutine. Under such conditions, control is returned to the main program with a 1 being loaded into the accumulator. If no errors occur during execution of the DSBLE subroutine, the addresses of the NTBS register and MSR register are loaded (block 4104) into a specified index register and jump block 4106 is made to a CMP subroutine, to be described in more detail later. Basically, the CMP subroutine compares the contents of the two registers and provide the data which indicates how far and in which direction each of the print wheels of the printer must be moved. If the CMP subroutine shows that no setting is required at a particular bank, a determination is made (block 4108) as to whether all banks have been checked. The digit-by-digit comparisons of the contents of the NTBS register and Meter Setting Register continue through the loop including blocks 4106 and 4108 as long as no setting is required, at least until the end of the loop is reached. If the end of the loop is reached without any setting being required, control is returned to the main program (block 4202) with a 0 being loaded into the accumulator.

If the comparison of the NTBS and MSR registers for particular banks show that setting is required, control jumps to the STEPS subroutine (block 4110) to drive the main gear into engagement with the spur gear for the particular bank. The STEPS subroutine is described in more detail with reference to a later figure. After execution of the STEPS subroutine, a decision 4112 is made as to whether any errors have occurred. If errors have occurred, an error code is loaded into a specified index register, control is returned to the main program (block 4114) and a 2 is loaded into the accumulator. If no errors occur during the execution of the STEP subroutine, another decision 4116 is made as to whether the printer yoke has been driven to the last bank to be set. If it hasn't, the loop beginning with block 4110 and ending with block 4116 is repeated until the printer reaches the last bank to be set.

At that point, the motor direction indicator for the banks select motor is reversed (block 4118) and control jumps to the STEPD subroutine (block 4204) to actually set the print wheels to the desired digit. This subroutine is described in more detail later. Errors, if any, occurring during execution of the STEP subroutine are loaded into a specified index register before control returns (block 4206) to the main program. When control is returned to the main program under these conditions, a 3 is loaded into the accumulator.

Each execution of the STEPD subroutine causes the print wheel to be moved from one digit to the adjacent digit. Therefore, the STEP subroutine must be repeated as many times as is necessary to alter the print wheel position from the original position to the position specified in the NTBS register. When the STEPD subroutine has been repeated the necessary number of times, program control branches to the STEPS subroutine (block 4208) which drives the printer yoke to the next less significant digit position. Errors, if any, occurring during the execution of the STEPS subroutine are loaded (block 4210) into a specified index register. Program control returns to the main program (block 4212) with a 4 being loaded into the accumulator.

If no errors occur during the execution of the STEPS subroutine, a decision 4216 is made as to whether all banks of the printer have been set. If not all banks of the printer have been set, program control jumps (block 4218) to the CMP subroutine to determine whether the currently selected bank needs setting. If it does, the subroutine is repeated beginning with block 4204. If the currently selected bank does not need setting, control is returned to block 4208 to select the next lower bank. When the decision block 4216 shows that the last bank has been set or at least has been checked to determine whether setting is required, program control is returned to the main program with a zero being loaded into the accumulator.

When the SETS subroutine is exited, the contents of the specified index register identify any error which has occurred.

Figure 43:
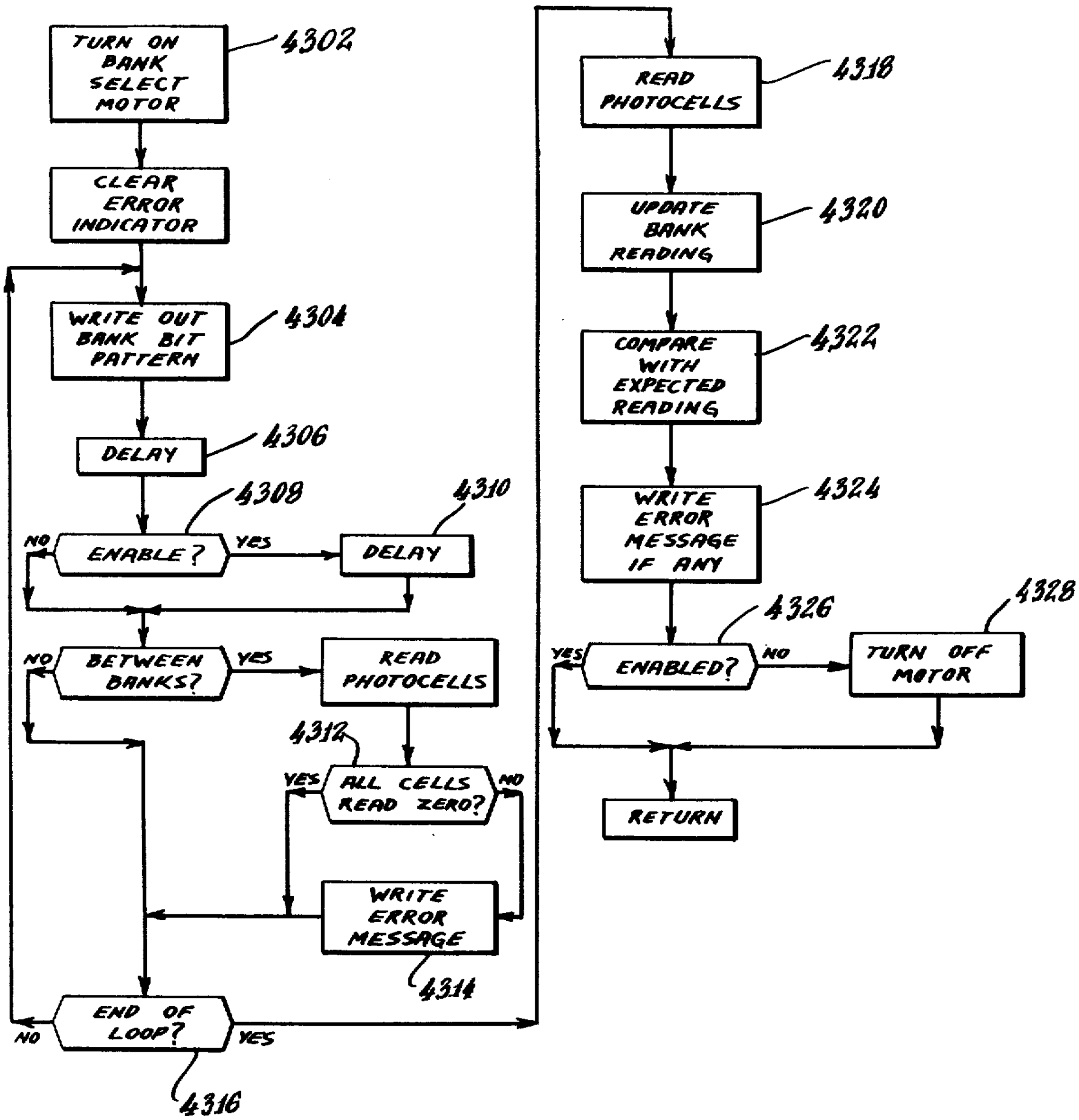
FIG. 43 is a flow chart of a STEPS subroutine used to control the bank select motor of the printer.

FIG. 43 is a flow chart of the STEPS subroutine for controlling the bank select motor in the printer. The first step 4302 in this subroutine is energization of the bank select motor, which drives the yoke and main gear between the enabled position, the disabled position and the various banks of print wheels. Error indicators are cleared and the bank bit pattern for an adjacent bank to which the yoke is to be driven is written out in a step 4304. To give the motor time to respond, a delay loop 4306 is incorporated into the routine. A check 4308 is then made to determine whether the yoke is being driven into the enabling position against the force of a spring or other resilient member which normally tends to bias the yoke out of that position. If the bank select motor is acting against the force of the spring, an extra delay 4310 is built into the program.

The first of two error checks is then made. In a preferred embodiment of the invention, the yoke position encoder consisting of the parallel plates 206 and 208 and associated optical detectors described with reference to FIG. 6–8 should read all binary zeros at any intermediate position of the yoke. If a check 4312 indicates otherwise, an error message is written into an error register in operation 4814. If the readings are zeros, the program goes directly to an end of loop decision 4316. The loop, which begins with block 4304 and ends with block 4316, is repeated for as many motor steps as are necessary to drive the yoke from one bank position to the next. When the necessary number of motor stepping operations have been completed, the yoke position detectors are again read in an operation 4318 to obtain an updated bank reading 4320 which is compared with the anticipated reading for the selected bank in an operation 4322. Any mismatch between the anticipated bank reading and the detected bank reading causes an error message to be written in an operation 4324. At this point, a check 4326 is made as to whether the motor has driven the yoke into the enabled position in which it must be maintained against the force of a biasing spring. If the yoke has been driven into the enabled position, the motor remains energized. If the yoke has been driven to any other position, the bank select motor is turned off in step 4328. Control is then returned to the main program.

The STEPS routine is executed each time the yoke is driven from one bank position to an adjacent bank position.

Figure 44:
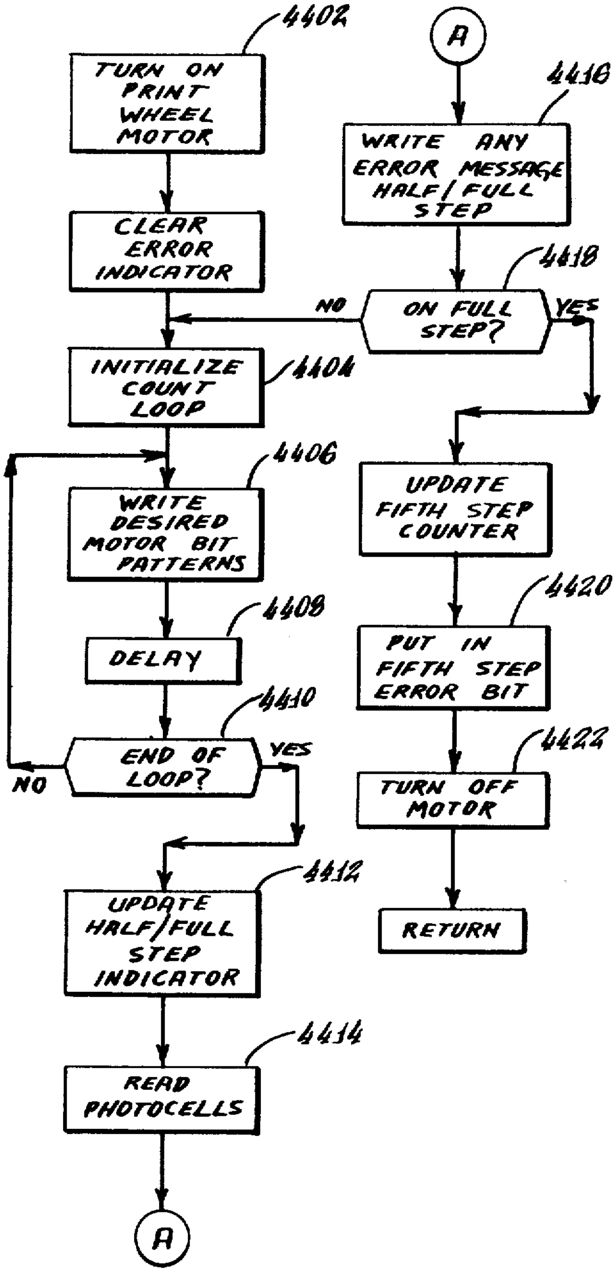
FIG. 44 is a flow chart of a STEPD subroutine used to control the digit select motor of the printer.

The routine which controls the print wheel setting motors is the STEPD routine referred in several places above and described now in detail with reference to FIG. 44. The print wheel or digit select motor 84 is energized in the initial step 4402 and the error indicators are cleared. A count loop (block 4404) is initialized. This count loop provides an indication of the number of different motor coil energization patterns required in order to drive the print wheel through a half step or halfway to the adjacent digit position. After the count loop is intialized, the signals required to energize the motor coils employing each pattern in sequence are generated in an operation 4406. A programmatic delay 4408 permits the motor time to respond.

After the motor coil pattern has been changed, a check 4410 is made as to whether the necessary number of counts have occurred in the count loop. If less than the anticipated number have occurred, the bit pattern for the next coil energization pattern in the sequence is written in an iterated operation 4406 and the motor driven through another angular increment. The process involving operations 4406, 4408 and 4410 is repeated until the end of the loop count is sensed. An indicator is updated in an operation 4412 to indicate that the print wheel has advanced from a full step or digit position through a half step or midway position. The optical detectors associated with the print wheel setting gears are read (block 4414) and an error check is made to determine whether a gear slot or a gear tooth can be seen. In the half step or midway position, a gear tooth should always be interposed between the light source and the phototransistor of an optical detector. Therefore, the presence of a gear slot in what is believed to be a half step position will cause a half/full step error message to be written (block 4416) into random access memory. A check 4418 is made as to whether the motor is on a full step. If not, the program returns to block 4404 in which the count loop needed to move the motor through a half step is again initialized. If necessary, the motor is driven to another half step by means of the operations 4404 through 4418.

Figure 6:
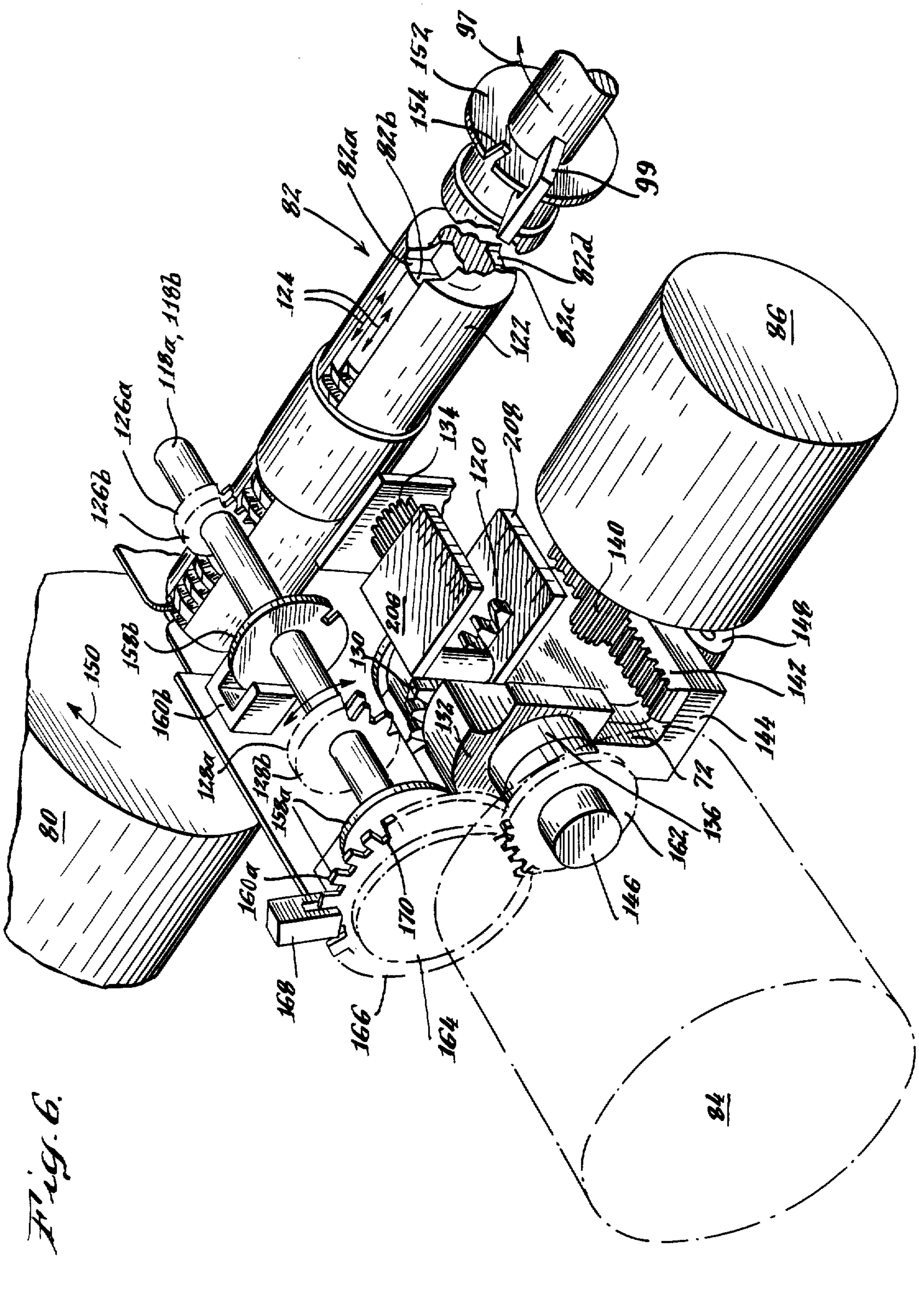
FIG. 6 is a perspective view of a portion of one embodiment of a postage printer for the meter system.
Figure 7:
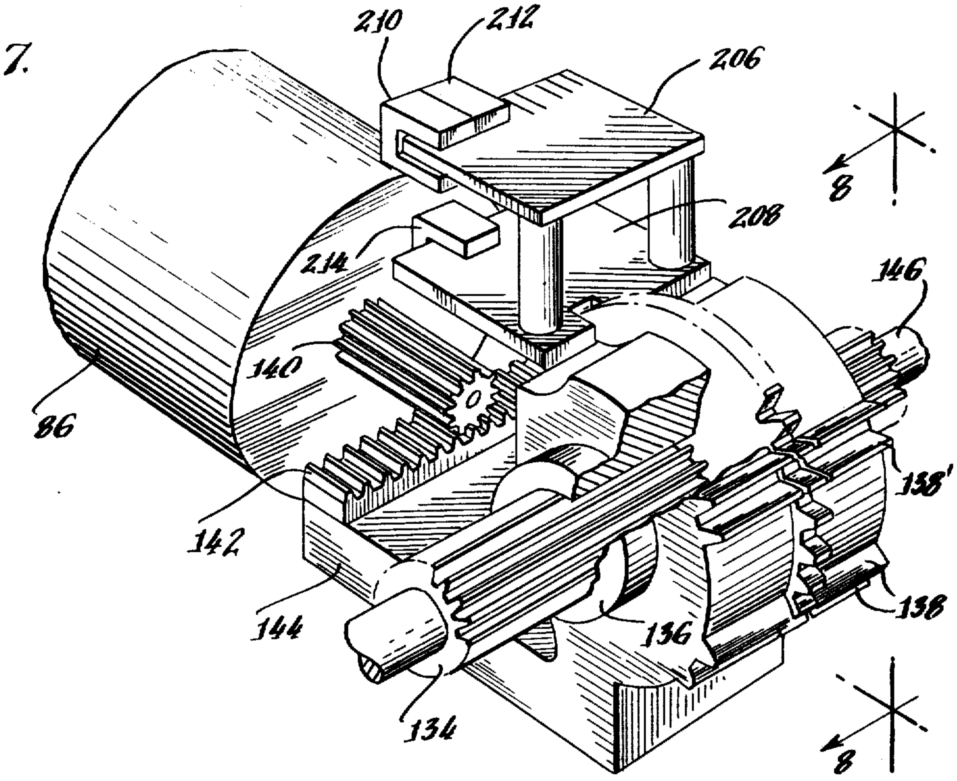
FIG. 7 is a perspective view of selected parts of the mechanism of FIG. 6.
Figure 8:
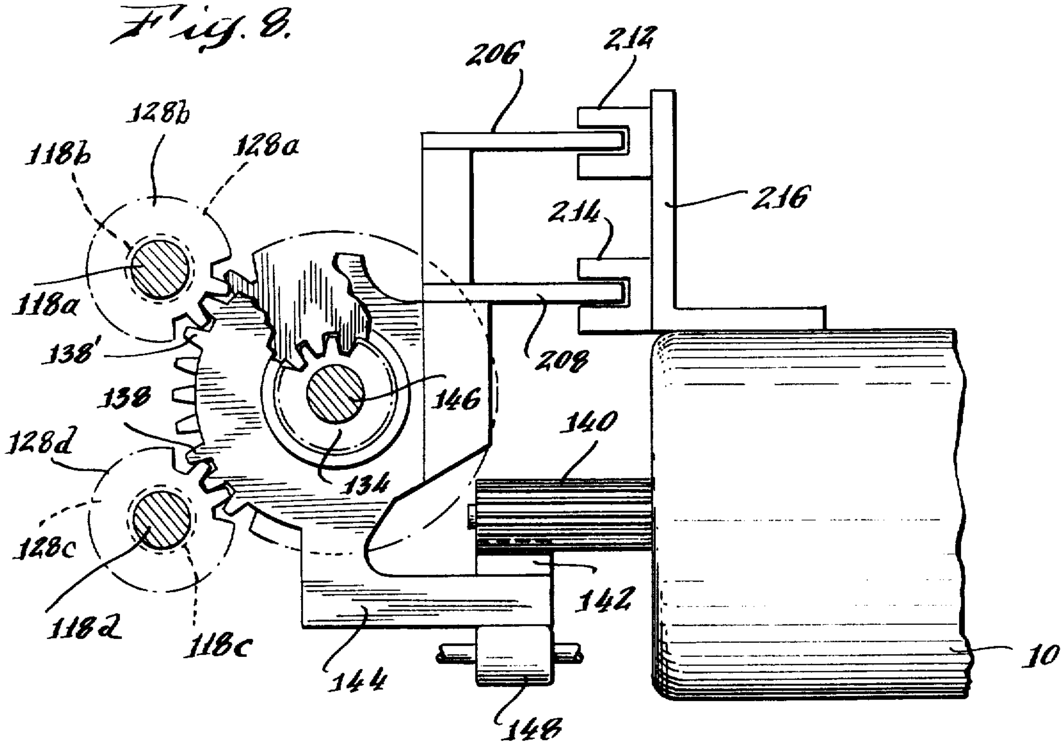
FIG. 8 is an elevation view taken along lines 8—8 of FIG. 7.

If check 4418 reveals that the motor has been driven to a full step position, the fifth step counter referred to in the description of FIGS. 6–8 is updated by one digit. A check is then made as to whether the extra deep slot on the monitoring wheel 166 is detected when the count in the fifth step counter is other than a multiple of 5. If the extra long slot is aligned with the optical detector 168 while the fifth step counter is other than a multiple of 5, an error condition exists. Conversely, if the extra long slot is not aligned with the optical detector when the fifth step counter does contain a multiple of 5, an error condition also exists. Under either of these conditions, a "fifth step error" bit is written into an error indicator in the operation 4420. The print wheel motor is turned off in an operation 4422 and control is returned to the main program. The main program responds to the error indications generated when the STEPD routine has been called.

Figure 45:
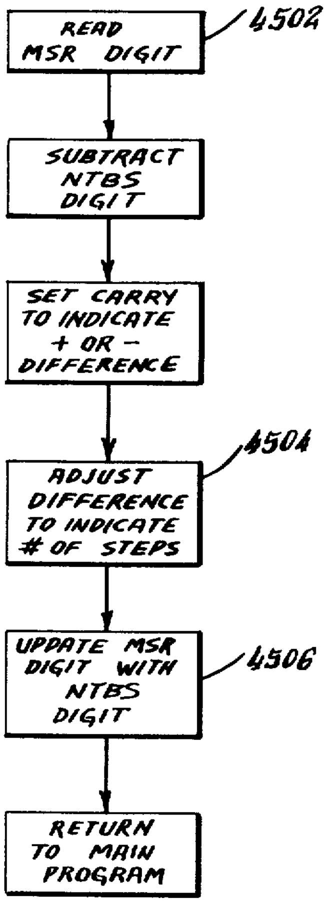
FIG. 45 is a CMP subroutine called during setting of the printer to a desired postage value.

The CMP subroutine, which is used to determine the number of steps through which a print wheel must be driven from its previous setting to a new setting, is now described in more detail with reference to FIG. 45. The first step (block 4502) is to read the MSR or Meter Setting Register digit which is the current setting of the print wheel. The NTBS of Next To Be Set digit is subtracted and the accumulator carry is set or cleared to indicate a positive or negative difference. The difference must then be adjusted (block 4504) to indicate the number of actual motor energization changes.

The energization pattern for the coils of the stepping motor which drives the print wheels must be changed more than once in order to span one digit difference. For example, to provide a one digit change in the position of the print wheel might require 16 changes in the motor energization pattern. If the number of pattern changes per digit is 16, and the difference between the previous wheel setting and the desired setting is two digits, the adjustment referred to in block would be $16\times2$ or 32 sequential pattern changes appendum C may be consulted for more details.

After the number of required pattern changes is calculated, the meter setting register must be updated (block 4506) to reflect the new setting of the print wheel before control is returned to the main program.

Figure 46:
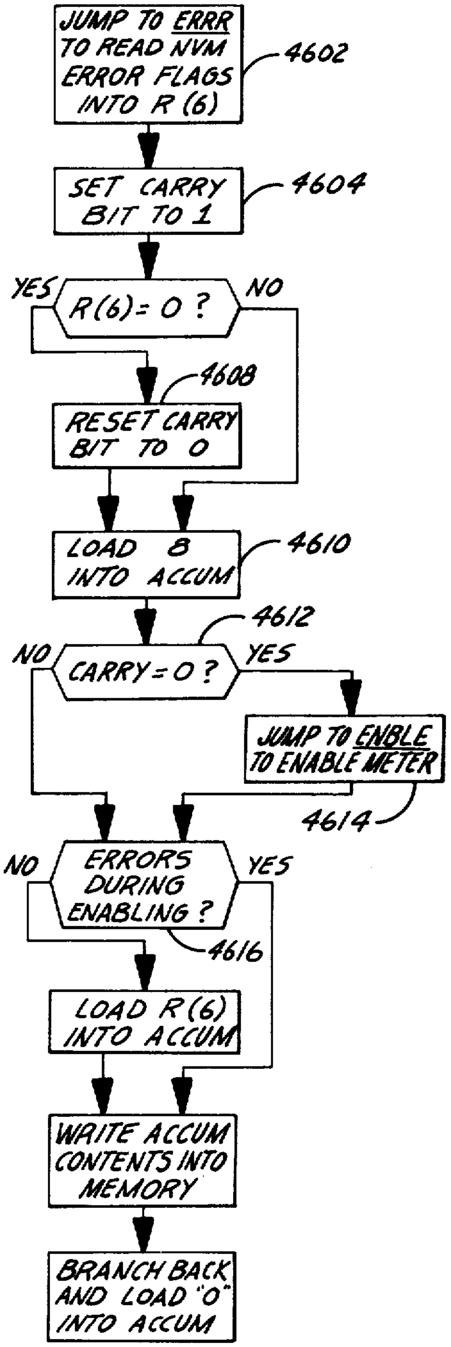
FIG. 46 is a flow chart of an ENABL subroutine which controls enabling of the printer.

FIG. 46 is a flow chart for an ENABL subroutine which provides an entry into and an exit from the subroutine which drives the printer yoke to the enabled position. The first operation of the ENABL subroutine (block 4602) is a jump to the ERRR subroutine which retrieves any error flags stored in nonvolatile memory and writes those flags into index register 6. The accumulator carry bit is set to 1 in operation 4604 before the contents of register R6 are read. If R6 equals zero, indicating there are no error flags stored in nonvolatile memory, the accumulated carry bit is reset or cleared to zero in operation 4608. If R6 is not equal to zero, indicating that error flags do exist, operation 4608 is bypassed. In either event, the next operation in the sequence (block 4610) is to load in 8 into the accumulator, followed by a check 4612 as to whether the carry bit equals zero. If it does equal zero, indicating no error flags, a jump is made (block 4614) to an ENBLE subroutine actually employed to drive the printer to its enabled position.

Whether or not check 4612 shows that the carry equals zero, a further check 4616 is made as to whether any errors have arisen either during the execution of the ENBLE subroutine or otherwise. If no errors have occurred, the contents of the error code-containing index register R6 are loaded into the accumulator. If errors have occurred, the accumulator will already be set to 8 because of operation 4610. The accumulator contents are written into an error message location in the data message block of register zero in random access memory 38. Control is returned to the main program after the write operation.

Figure 47:
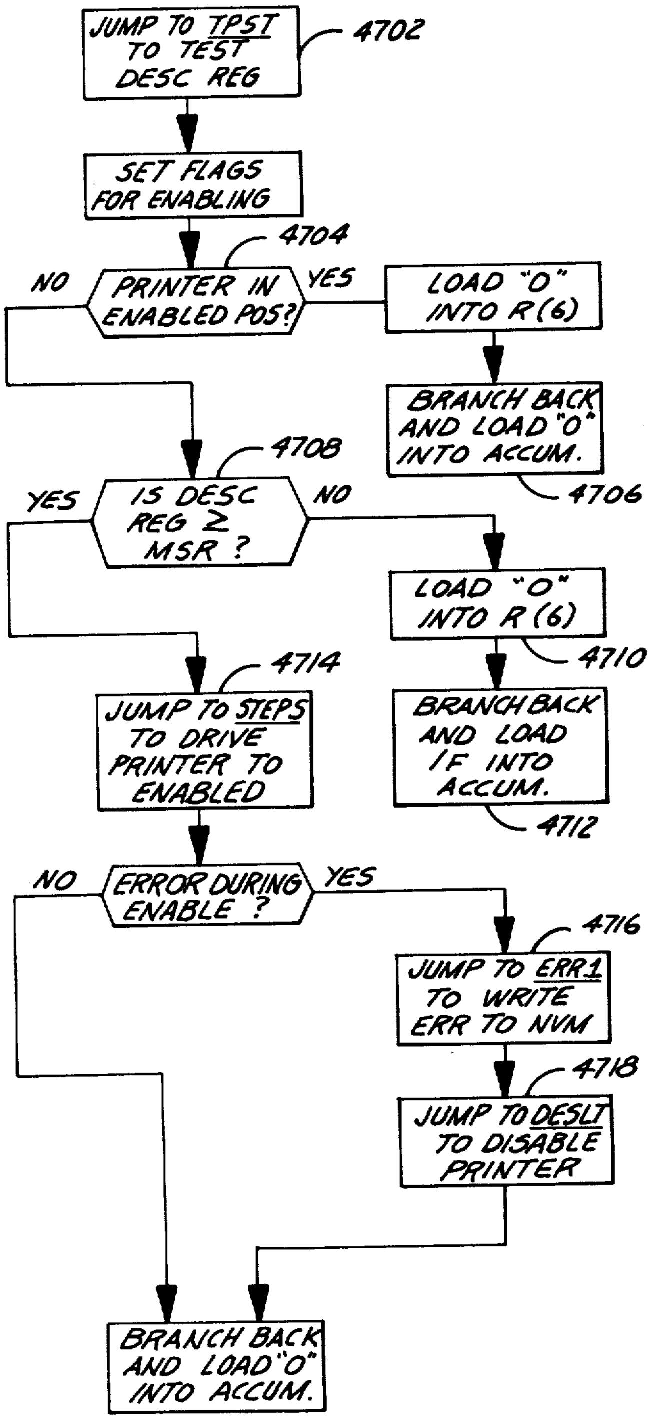
FIG. 47 is a flow chart of an ENBLE subroutine for driving the printer to an enabled position when there is sufficient postage.

FIG. 47 is a flow chart of the ENBLE subroutine called by the previously described ENABL subroutine to actually drive the printer into its enabled position. The TPST subroutine is called (block 4702) to determine whether the descending register is less than $100 or less than the meter setting register. Step down and enabled flags are then written into SC0 and SC1 respectively of register one in random access memory 38. The third status character in that register is read to determine whether the printer is sitting in the enabled position. If it is, index register 6 is loaded with a zero and control is returned (block 4706) to the main program. If the printer is not sitting in the enabled position at the time of check 4704, another decision 4708 is made as to whether the contents of the descending register are greater than or equal to the meter setting register. If the meter setting register shows the greater amount, indicating that there is insufficient postage to print the requested amount, a zero is loaded into index register 6 in operation 4710. Then, control is returned to the main program with a hexadecimal F being loaded (block 4712) into the accumulator.

If decision block 4708 indicates that the descending register contains sufficient postage, the STEPS subroutine is called (block 4714) to drive the printer into its enabled position. If any errors occur during the execution of the STEPS subroutine, the ERR1 subroutine is called (block 4716) to write error codes into nonvolatile memory. A DESLT subroutine, to be described in more detail later, is called (block 4718) to disable the printer. Control is then returned to the main program. If no errors are detected during the enabling step, control is returned immediately.

Figure 48:
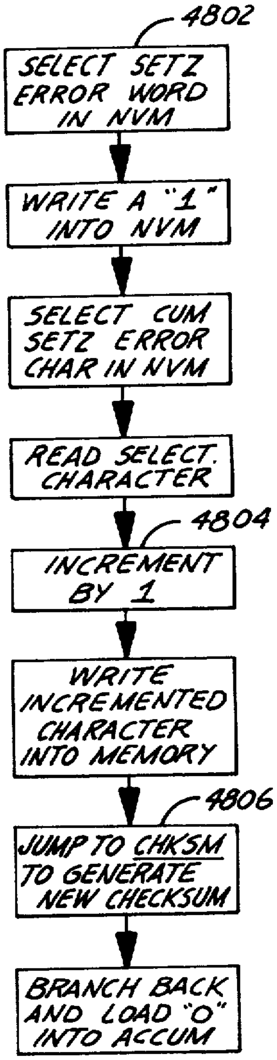
FIG. 48 is a flow chart of an ERR1 subroutine for incrementing cumulative error indicators associated with the setting of the printer.

The ERR1 subroutine flowcharted in FIG. 48 is used to write error messages into nonvolatile memory. The SETZ error word NVM location 24 for the memory assignment shown in FIG. 14) is first selected in an operation 4802. A 1 is written into that location. The cumulative SETZ error word, or NVM location 25, is selected and read into central processor. The value is incremented by 1 in operation 4804 and the result written back into nonvolatile memory. A jump 4806 is made to the CHKSM subroutine to generate a new check sum for nonvolatile memory register No. 2. Control is then returned to the main program.

Figure 49:
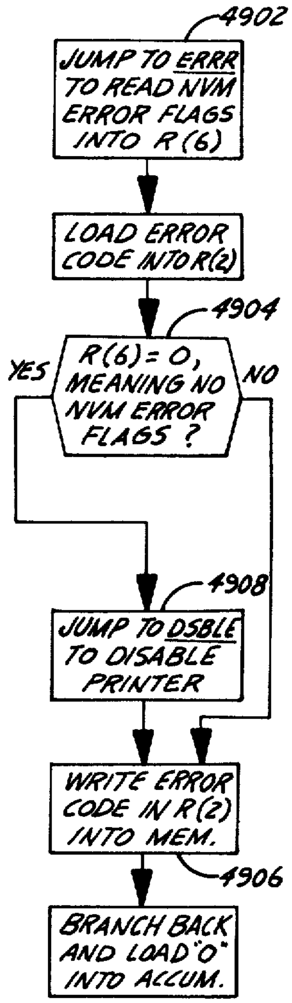
FIG. 49 is a flow chart of a DISAB routine for calling a printer disabling subroutine and for generating error indicators.

A DISAB subroutine, which is the calling routine for the DSBLE subroutine, is shown in flow chart form in FIG. 49. Nonvolatile memory error flags are first read into index register 6 by jumping to the ERRR subroutine in operation 4902. A predetermined error code or value is loaded into a specified index register, after which a check 4904 is made as to whether index register 6 is equal to 0, meaning there are no error flags stored in nonvolatile memory, the predetermined error code stored in index register 2 is written (block 4906) into the data message block of random access memory 38. But if the contents of index register 6 are not equal to 0, indicating that error flags were stored in the nonvolatile memory, a jump is first made (block 4908) to the DSBLE subroutine to disable the printer. After the predetermined error code has been loaded into memory, control is returned to the main program.

Figure 50:
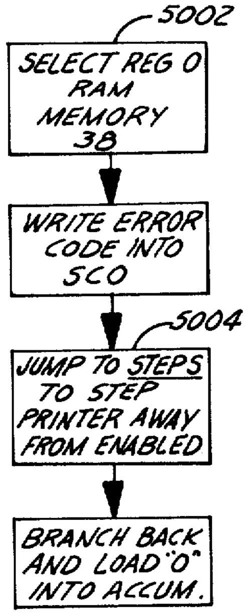
FIG. 50 is a flow chart of a DESLT subroutine called to disable the meter when problems occur during reading or setting.

A special subroutine DESLT is called to disable the meter when problems occur during setting or reading of photocells. This subroutine is flowcharted in FIG. 50. When the DSLT subroutine is called, register 0 of random access memory 38 is selected (block 5002) and a predetermined error code (hexadecimal/F) is written into SCO of that register. A jump is then made to the STEPS subroutine (block 5004) to step the printer away from the enabled position and control is returned to the main program.

Figure 51:
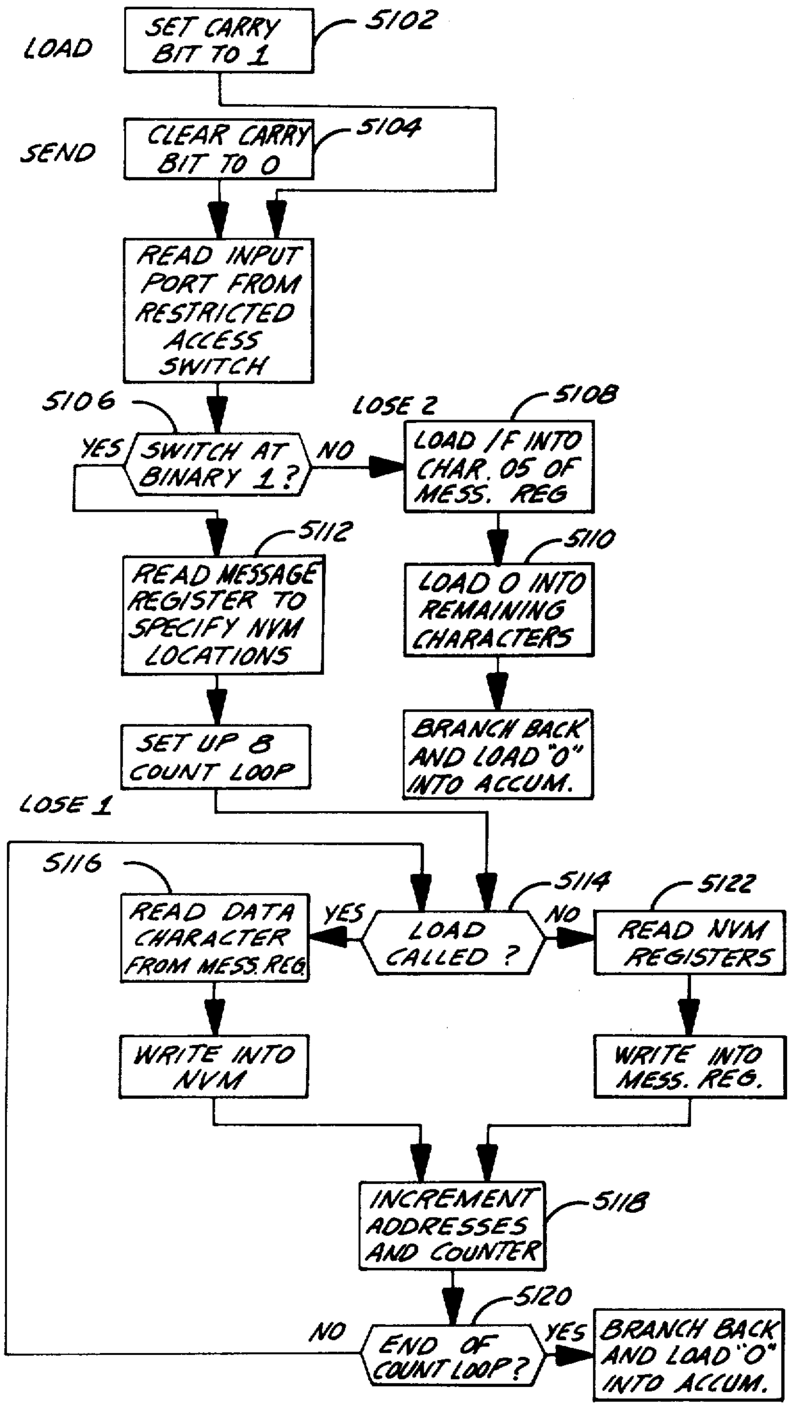
FIG. 51 is a flow chart of a LOAD/SEND subroutine which provides restricted access to the nonvolatile memory.

Since meter security requires that the user be kept unaware of the RMRS seed number stored in nonvolatile memory, it is necessary to provide restricted access to that register. The switch 75 at one input to input buffer 76 can be connected by the manufacturer or an authorized serviceman to a minus 15 volt source. When the switch is set this way, the nonvolatile memory registers can be read out or written into using a LOAD/-SEND subroutine described in flow chart form in FIG. 51.

If the LOAD (or write) subroutine is called, the accumulator carry bit is set (block 5102) to 1. If the SEND (or read) subroutine is called, the accumulator carry bit is cleared (block 5104) to 0. The input port connected to switch 75 is read and a decision (block 5106) is made whether the switch is at binary 1; i.e., connected to the minus 15 volt source. If the switch is not at binary 1 when either the LOAD or SEND subroutine is called, an error code/F is loaded (block 5108) into word 5 of register 0 and random access memory 38. In consequent operation 5110, zeros are loaded into the remaining words of the register, after which control is returned to the main program.

If decision block 5106 shows that switch 75 was set to a binary 1 level, the data message register in random access memory 38 is read (block 5112) to determine which NVM locations are to be accessed. An eight count loop is set up and a decision 5114 is made as to whether the LOAD subroutine or the SEND subroutine was called. If the LOAD subroutine was called, the data characters to be loaded into the specified nonvolatile memory location are read from the data message register in operation 5116 and then written into the specified NVM location. The addresses between which data is being transferred and the loop count are incremented in operation 5118 and a check 5120 is made as to whether the end of the count loop has been reached. If it hasn't, program control returns to block 5114.

When block 5114 indicates that the SEND subroutine, rather than the LOAD subroutine was called, the specified nonvolatile memory registers are read in operation 5122 and then written into the data message register of random access memory 38. The addresses and loop counter are incremented in operation 5118 whether the LOAD subroutine or the SEND subroutine was called.

When decision block 5120 shows that the end of the count loop has been reached, control branches back to the main program.

The system described above was developed specifically to control a mechanical postage printer since such a printer already has received the necessary Governmental approvals to permit commercial use. A considerable amount of hardware and software is required to service this mechanical printer. For example, the printer setting elements 26 and the printer setting detector array 30 are needed in the hardware primarily to service the mechanical printer. Similarly, subroutines such as INITS, DSBLE, SETZ, SETS, STEPS, STEPD, and others are dedicated almost exclusively to servicing the mechanical aspects of the printer operation. It is certainly considered to be within the scope of the present invention to use the hardware and software to control nonmechanical printers such as ink jet printers, dot-matrix printers and other such printers.

Although the RMRS subroutine has been referred to in a number of places throughout the specification and drawings, the details of the subroutine and supporting subroutines have not been included herewith as these are auxiliary to the present invention. Moreover, the security of postal meters manufactured by the assignee of the present invention would be unnecessarily jeopardized by providing detailed flow charts and descriptions of the RMRS subroutine.

In general terms, a RMRS subroutine permits a user to re-fund the meter himself while his account at a funding center is debited by the proper amount. U.S. Pat. No. 3,792,446-McFiggans et al described one such system. In accordance with that patent, a user establishes communications with a funding center computer and identifies himself and the meter to be funded. After the funding center verifies the identity of the user, a stored seed number is operated on in accordance with a predetermined algorithm to generate a pseudo-random number. The pseudo-random number is furnished to the user, preferably via a voice answer-back unit.

When the user receives the generated pseudo-random number, he enters it into the meter, which has already operated on a stored seed number in accordance with the same algorithm employed by the funding center computer to generate what should be the same pseudo-random number. If the meter-generated number matches the number entered by the user, indicating the user has properly accessed the funding center computer, the descending register and control sum register of the meter are incremented by a fixed amount. The user's account at the funding center computer will have already been debited by the fixed amount.

The seed numbers which are stored in the meter and in the funding center computer are altered in the same manner during each funding operation to provide new, pseudo-random seed numbers for the next funding operation.

Figure 52:
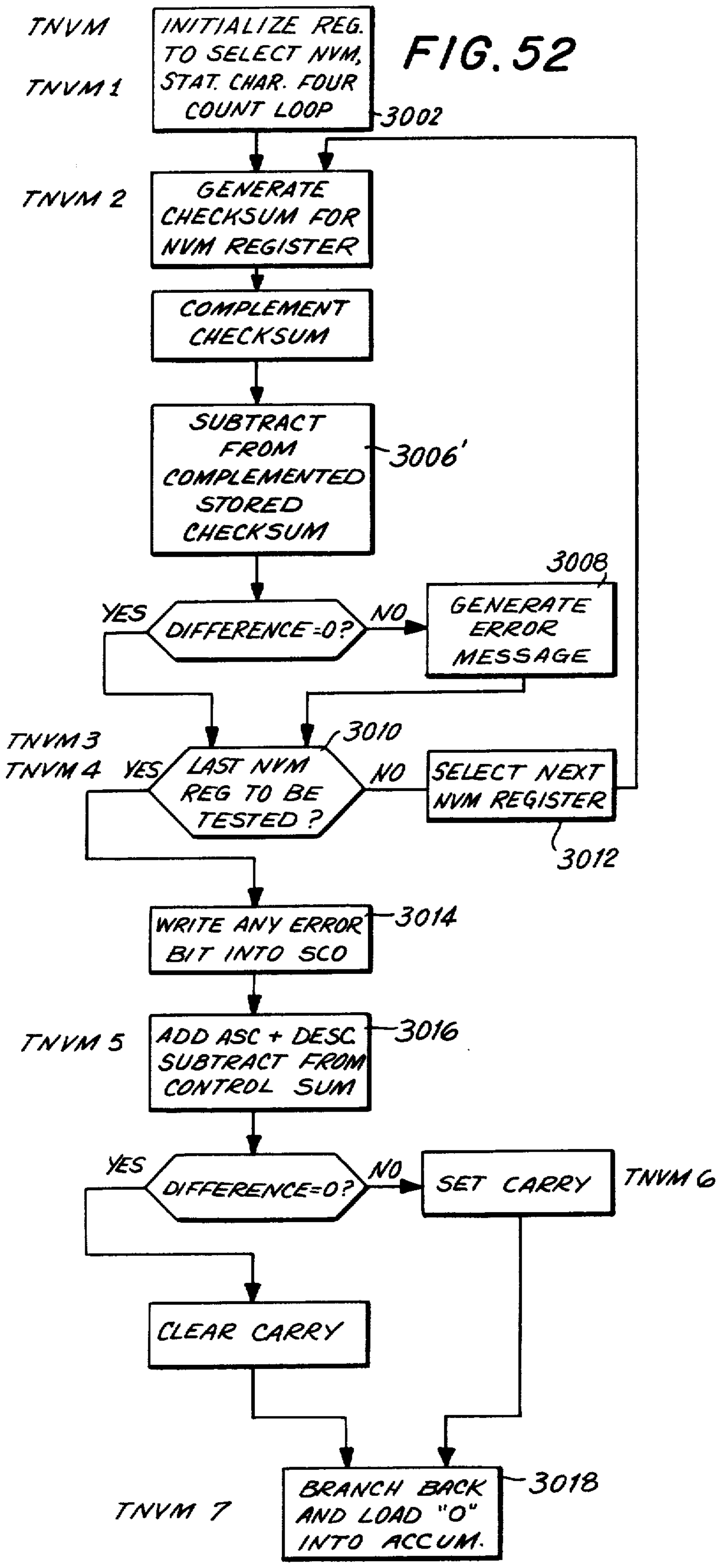
FIG. 52 is a flow chart showing a modification of the TNVM subroutine of FIG. 30.

In the TNVM subroutine of FIG. 30, a direct comparison was made between the stored checksum and data stored in the non-volatile memory. In the event that all data have been lost during a shut-down period, then this checking operation would proceed normally. In order to avoid this, in accordance with a modification of the invention, the complement of the checksum may be stored in rows zero and one of the NVM register. This modification is illustrated in the subroutine of FIG. 52, wherein the generator checksum derived from the register contents is complemented and subtracted from the complemented stored checksum in rows zero and one of the register. If the data in the register has been lost during the shut-down period, this comparison of the complements of the checksum will reveal the error.

The routine in accordance with FIG. 52 therefore overcomes an additional source of possible error in the system.

In order to implement the routine of FIG. 52, it is, of course, necessary to complement the stored checksum. This may be effected by the routine illustrated in FIG. 53, which shows the necessary modification of the routine of FIG. 34. Thus, before writing $R_a$ and $R_b$ in the NVM checksum location, these values must be complemented. While FIGS. 52 and 53 illustrate this modification as being software modification, it is, of course, apparent that they may also constitute a part of the hardware of the system in accordance with the invention.

Figure 53:
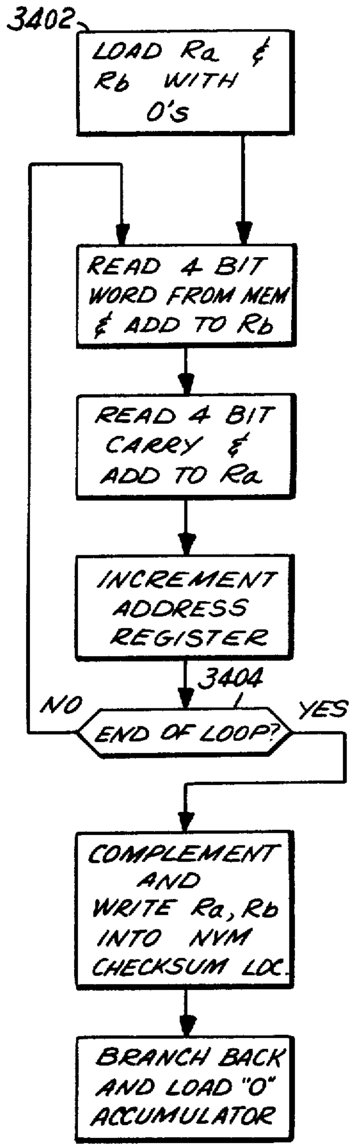
FIG. 53 is a flow chart showing a modification of the CHKSM subroutine of FIG. 34.

The modification of the routine illustrated in FIGS. 52 and 53 may also be indicated in the attached program printout by the insertion of CMA instructions between program steps 1512 and 1513; 151A and 151B; 15E2 and 15E3; and 15E7 and 15E8.

This modification, in accordance with the invention, assures that logic ones and zeros are in each register, so that in the event of total loss of stored data wherein all locations would appear as either zeros or ones, the complemented checksum routine will ensure recognition of the error.

While there has been described what is considered to be a preferred embodiment of the present invention, variations and modifications therein will occur to those skilled in the art once they become acquainted with the basic concepts of the invention. Therefore, it is intended that the appended claims shall be construed to include the disclosed embodiment and all such variations and modifications as fall within the true spirit and scope of the invention.

APPENDIUM A

The representation of some of the instructions has been slightly altered from those representations Intel uses in their Programming Manual (copyright 1974). Double instructions are printed on two lines, rather than one. The second line contains data or an address associated with the double word instruction. Data, numbers, and addresses are generally given in hexadecimal notation. The various columns and the formats for comments are identified below.

HEXADECIMAL REPRESENTATION OF INSTRUCTION ADDRESS

HEXADECIMAL CODE FOR MACHINE INSTRUCTION

STATEMENT NUMBER

LABEL

INSTRUCTION IN MNEMONIC FORM

COMMENTS

```
10DA 0   8020   00237   TESTO  DC   FIM+0     LOOK FOR PRINT SIGNAL
10DB 0   0020   00238          DC   /20
10DC 0   8021   00239          DC   SRC+0
10DD 0   80EA   00240          DC   RDR
10DE 0   80F6   00241          DC   RAR
10DF 0   80F6   00242          DC   RAR
10E0 0   801A   00243          DC   JCN+CZ    CONTINUE IF PRINT
10E1 0   10EA   00244          DC   POST
10E2 0   80F5   00245          DC   RAL
10E3 0   80F5   00246          DC   RAL
10E4 0   8014   00247          DC   JCN+AZ    TEST FOR SHUTDOWN
10E5 0   10E8   00248          DC   *+2
10E6 0   8040   00249          DC   JUN
10E7 0   1400   00250          DC   TRAP
10E8 0   8040   00251          DC   JUN       RETURN IF NO PRINT
10E9 0   1159   00252          DC   STRT1
                00253   *UPDATE ASCENDING REGISTER, DESCENDING REGISTER.
                        *PIECE COUNTER AND ADJUST CHECKSUMS
```

COMMENTS

```
// JOB     0001 0002                0002 0001                1

LOG DRIVE    CART SPEC    CART AVAIL    PHY DRIVE
  0000         0001          0001          0000
  0001         0002          0002          0001

V2 M09    ACTUAL 16K    CONFIG 16K

*EQUAT(PAPTX,PAPTY)

// ASM
*MACLIB INTAS
*XREF
                  00001            ABS
                  00002            CLEAR
0000              00003    PRTA0   EQU     /00
0010              00004    PRTA1   EQU     /10
0040              00005    PORTB   EQU     /40
0080              00006    READC   EQU     /80
0010              00007    PORTC   EQU     /10
0097              00008    MSR     EQU     /97
009F              00009    NTBS    EQU     /9F
000F              00010    KUPD    EQU     /F
000F              00011    KUPS    EQU     /F
0001              00012    KDWND   EQU     /1
0001              00013    KDWNS   EQU     /1
0700              00014    ADDN    EQU     /700
070E              00015    RMRS0   EQU     /70E
07C8              00016    MULT    EQU     /7C8
1000 0   8000     00017            DC      NOP
1001 0   8000     00018            DC      NOP
1002 0   8000     00019            DC      NOP
1003 0   8000     00020            DC      NOP
1004 0   8000     00021            DC      DIN
1005 0   8020     00022    INITZ   DC      FIM+0
1006 0   0000     00023            DC      /00
1007 0   8021     00024            DC      SRC+0     SELECT PORT 0
1008 0   8000     00025            DC      LDM+0
```

```
1009 0   80E1            DC     WMP       TURN OFF MOTORS
100A 0   80C8            DC     LDM+8
100B 0   8080            DC     XCH+0
100C 0   8021            DC     SRC+0     COMMUNICATION, S/R PORT
100D 0   80E1            DC     WMP       INITIALIZE RAM PORT 2
100E 0   80D4            DC     LDM+4
100F 0   8060            DC     XCH+0
1010 0   8021            DC     SRC+0
1011 0   80D4            DC     LDM+4     MOTOR SELECT, INTERRUPT PORT
1012 0   80E1            DC     WMP       INITIALIZE RAM PORT 1
                  *SET UP MESSAGE
1013 0   802E            DC     FIM+/E    SET UP ERROR CODE
1014 0   0002            DC     /02       (OUTPUT PORT)
1015 0   802F            DC     SRC+/E
1016 0   80D6            DC     LDM+6
1017 0   80E0            DC     WRM
                  *RESETS METER MECHANISM TO ZERO
1018 0   8050     INITF  DC     JMS       INITIALIZE SETTING
1019 0   1431            DC     INITS     MECHANISM
101A 0   802E            DC     FIM+/E    WRITE ERROR INDICATOR
101B 0   0003            DC     /03       IN OUTPUT
101C 0   802F            DC     SRC+/E    RAM (/03)
101D 0   80E0            DC     WRM
101E 0   80FA            DC     STC
101F 0   801C            DC     JCN+AN
1020 0   1022            DC     *+1
1021 0   80F1            DC     CLC
                  *CLEAR CARRY IF NO ERROR
1022 0   806F            DC     INC+/F
1023 0   802F            DC     SRC+/E    RAM (/04)
1024 0   8082            DC     XCH+2
1025 0   80E0            DC     WRM       WRITE IN SECOND PART OF
1026 0   8020            DC     FIM+0     ERROR MESSAGE
1027 0   0023            DC     /23
1028 0   8021            DC     SRC+0     SPECIFY INIT ERROR IN NVM
1029 0   8012            DC     JCN+CN    JUMP IF ERROR
102A 0   1037            DC     *+12
102B 0   800E            DC     RPM
102C 0   800E            DC     RPM
102D 0   80F4            DC     CMA
102E 0   8014            DC     JCN+AZ    JUMP IF TIMEOUT
102F 0   1033            DC     *+3
1030 0   80D0            DC     LDM+0     CLEAR INIT ERROR
1031 0   80E3            DC     WPM
1032 0   80E3            DC     WPM
1033 0   8061            DC     INC+1
1034 0   8021            DC     SRC+0     CLEAR SETZ ERROR
1035 0   8040            DC     JUN       (24 NVM)
1036 0   103A            DC     *+3
1037 0   800E            DC     RPM       UPDATE ERROR
1038 0   800E            DC     RPM
1039 0   80F5            DC     RAL
103A 0   8050            DC     JMS
103B 0   15F9            DC     ERR3
103C 0   8050            DC     JMS       TEST NVM
103D 0   14FE            DC     TNVM
103E 0   80EC            DC     RD0
103F 0   806F            DC     INC+/F
1040 0   802F            DC     SRC+/E    RAM (/05)
1041 0   80E0            DC     WRM       WRITE IN CHECKSUM ERROR
1042 0   806F            DC     INC+/F
1043 0   802F            DC     SRC+/E    RAM (/06)
1044 0   80D0            DC     LDM+0
1045 0   80F5            DC     RAL
1046 0   80E0            DC     WRM       ASC+DESC=CONT ERROR
1047 0   8050            DC     JMS
1048 0   1695            DC     TINT      TEST INTERRUPT
1049 0   800D            DC     DIN
104A 0   80ED            DC     RD1
104B 0   806F            DC     INC+/F
104C 0   802F            DC     SRC+/E
104D 0   80E0            DC     WRM       INTERRUPT ERROR
                  *GENERATES CHECKSUM FOR MESSAGE UNITS
104E 0   8022     CHECK  DC     FIM+2     ZERO SUMMING REGISTER
104F 0   0000            DC     /00
1050 0   8020            DC     FIM+0     FIRST DATA ADDRESS
```

```
1051 0  0002   00102          DC      /02
1052 0  8021   00103   CHCK   DC      SRC+0
1053 0  80E9   00104          DC      RDM
1054 0  80F1   00105          DC      CLC
1055 0  8083   00106          DC      ADD+3       SUM DIGITS
1056 0  80FB   00107          DC      DAA
1057 0  80B3   00108          DC      XCH+3
1058 0  80D0   00109          DC      LDM+0
1059 0  8082   00110          DC      ADD+2       PROPAGATE CARRY
105A 0  80FB   00111          DC      DAA
105B 0  80B2   00112          DC      XCH+2
105C 0  8071   00113          DC      ISZ+1
105D 0  1052   00114          DC      CHCK
105E 0  8021   00115          DC      SRC+0
105F 0  80A2   00116          DC      LD+2
1060 0  80E0   00117          DC      WRM         WRITE CHECKSUM INTO
1061 0  8061   00118          DC      INC+1       REGISTER
1062 0  8021   00119          DC      SRC+0
1063 0  80A3   00120          DC      LD+3
1064 0  80E0   00121          DC      WRM
               00122   * TRANSMIT MESSAGE
1065 0  8020   00123   TRAN   DC      FIM+0       RAM LOCATION
1066 0  0000   00124          DC      /00
1067 0  8024   00125          DC      FIM+4       RAM OUTPUT PORT
1068 0  008C   00126          DC      /8C
1069 0  8028   00127          DC      FIM+8       INPUT PORT
106A 0  0000   00128          DC      /00
106B 0  8025   00129          DC      SRC+4
106C 0  80D8   00130          DC      LDM+8
106D 0  80E1   00131          DC      WMP         WRITE OUT START BIT
106E 0  8029   00132          DC      SRC+8
106F 0  80EA   00133   TRAN1  DC      RDR         LOOK FOR REPLY
1070 0  80F6   00134          DC      RAR
1071 0  801A   00135          DC      JCN+CZ
1072 0  106F   00136          DC      TRAN1
1073 0  8025   00137          DC      SRC+4
1074 0  80D0   00138          DC      LDM+0       WRITE OUT ZERO
1075 0  80E1   00139          DC      WMP
1076 0  80D9   00140          DC      LDM+9
1077 0  80B5   00141          DC      XCH+5
1078 0  8075   00142   TRAN2  DC      ISZ+5       DELAY FOR ZERO
1079 0  1078   00143          DC      TRAN2
107A 0  8026   00144   TRAN3  DC      FIM+6       COUNT OF FOUR
107B 0  000C   00145          DC      /0C
107C 0  8021   00146   TRAN4  DC      SRC+0       SELECT MEMORY LOCATION
107D 0  80E9   00147          DC      RDM
107E 0  80F6   00148   TRAN5  DC      RAR         PUT OUTPUT BIT IN CARRY
107F 0  80B8   00149          DC      XCH+8       TEMP STORE
1080 0  80D8   00150          DC      LDM+8
1081 0  8025   00151          DC      SRC+4
1082 0  80E1   00152          DC      WMP         WRITE OUT ONE
1083 0  801A   00153          DC      JCN+CZ      DETERMINE IF ONE OR ZERO
1084 0  1089   00154          DC      ZERO
1085 0  80DC   00155   ONE    DC      LDM+/C      DELAY FOR ONE
1086 0  80B3   00156          DC      XCH+3
1087 0  8073   00157   ONE1   DC      ISZ+3
1088 0  1087   00158          DC      ONE1
1089 0  8000   00159   ZERO   DC      NOP         DELAY FOR ZERO
108A 0  8000   00160          DC      NOP
108B 0  8000   00161          DC      NOP
108C 0  8000   00162          DC      NOP
108D 0  80D0   00163   NULL   DC      LDM+0       INTERCHARACTER GAP
108E 0  80E1   00164          DC      WMP
108F 0  80D7   00165          DC      LDM+7       DELAY FOR ZERO
1090 0  80B3   00166          DC      XCH+3
1091 0  8073   00167   NULL1  DC      ISZ+3
1092 0  1091   00168          DC      NULL1
1093 0  80B8   00169          DC      XCH+8
1094 0  8077   00170          DC      ISZ+7       END OF LOOP OF FOUR
1095 0  107E   00171          DC      TRAN5
1096 0  8071   00172          DC      ISZ+1       END OF REGISTER
1097 0  107A   00173          DC      TRAN3
               00174   *TEST FOR INTERNAL ERRORS
1098 0  8050   00175          DC      JMS         TEST POSTAGE, COMPARE MSR
1099 0  1646   00176          DC      TPST        WITH 100, DESC
               00177   *WRITES IN RAM LOCATION /1F
```

```
109A 0  8050   00178        DC     JMS      TEST NON VOLATILE MEMORY
109B 0  14FE   00179        DC     TNVM
109C 0  80EC   00180        DC     RD0
109D 0  8014   00181        DC     JCN+AZ
109E 0  10A0   00182        DC     *+1
109F 0  80D8   00183        DC     LDM+8
10A0 0  80F5   00184        DC     RAL
10A1 0  80F5   00185        DC     RAL
10A2 0  80BF   00186        DC     XCH+/F   ERROR INTO R(F)  00XX
10A3 0  8050   00187        DC     JMS      TEST READ PHOTOCELLS
10A4 0  1552   00188        DC     READS
10A5 0  80F1   00189        DC     CLC
10A6 0  80ED   00190        DC     RD1
10A7 0  8014   00191        DC     JCN+AZ
10A8 0  10AA   00192        DC     *+1
10A9 0  80FA   00193        DC     STC
10AA 0  80BF   00194        DC     XCH+/F
10AB 0  80F5   00195        DC     RAL
10AC 0  80BF   00196        DC     XCH+/F   ERROR INTO R(F)  0XXX
10AD 0  8050   00197        DC     JMS      TEST INTERRUPT PHOTOCELLS
10AE 0  1695   00198        DC     TINT
10AF 0  80ED   00199        DC     RD1
10B0 0  80F5   00200        DC     RAL
10B1 0  8012   00201        DC     JCN+CN
10B2 0  10B4   00202        DC     *+1
10B3 0  80F5   00203        DC     RAL
10B4 0  80BF   00204        DC     XCH+/F
10B5 0  80F5   00205        DC     RAL      ERROR INTO R(F)  XXXX
10B6 0  8020   00206        DC     FIM+0
10B7 0  001E   00207        DC     /1E
10B8 0  8021   00208        DC     SRC+0
10B9 0  80E0   00209        DC     WRM      WRITE ERROR INTO OUTPUT
               00210   *ADDITIONAL ERROR FLAGS STORED IN RAM /1E
10BA 0  8020   00211        DC     FIM+0
10BB 0  0026   00212        DC     /26
10BC 0  8021   00213        DC     SRC+0
10BD 0  80E3   00214        DC     WPM      WRITE ERROR INTO NVM
10BE 0  80E3   00215        DC     WPM
10BF 0  8020   00216        DC     FIM+0
10C0 0  0022   00217        DC     /22
10C1 0  8050   00218        DC     JMS      CHECKSUM FOR NVM
10C2 0  15D4   00219        DC     CHKSM
10C3 0  8050   00220        DC     JMS      ERROR FLAGS IN NVM INTO R(6)
10C4 0  16AE   00221        DC     ERRR
10C5 0  8020   00222        DC     FIM+0
10C6 0  0023   00223        DC     /23
10C7 0  8021   00224        DC     SRC+0
10C8 0  800E   00225        DC     RPM      READ INIT ERROR
10C9 0  800E   00226        DC     RPM
10CA 0  80F4   00227        DC     CMA
10CB 0  80FA   00228        DC     STC
10CC 0  8014   00229        DC     JCN+AZ
10CD 0  10CF   00230        DC     *+1
10CE 0  80F1   00231        DC     CLC
10CF 0  80F6   00232        DC     RAR
10D0 0  8086   00233        DC     XCH+6    COMBINE WITH RMRS TIMEOUT
10D1 0  80F5   00234        DC     RAL
10D2 0  80A6   00235        DC     LD+6
10D3 0  80F6   00236        DC     RAR
10D4 0  8020   00237        DC     FIM+0
10D5 0  001D   00238        DC     /1D
10D6 0  8021   00239        DC     SRC+0
10D7 0  80E0   00240        DC     WRM      WRITE INTO OUTPUT
               00241   *ADDITIONAL FLAGS WRITTEN IN RAM /1D
               00242   *WRITE FLAGS INTO LED INDICATORS
10D8 0  8050   00243        DC     JMS
10D9 0  11E1   00244        DC     DISP     DISPLAY LAMPS
               00245   *TESTO
10DA 0  8020   00246   TESTO DC    FIM+0    LOOK FOR PRINT SIGNAL
10DB 0  0020   00247        DC     /20
10DC 0  8021   00248        DC     SRC+0
10DD 0  80EA   00249        DC     RDR
10DE 0  80F1   00250        DC     CLC
10DF 0  80F6   00251        DC     RAR
10E0 0  80F6   00252        DC     RAR
10E1 0  801A   00253        DC     JCN+CZ   CONTINUE IF PRINT
```

```
10E2 0  10E9   00254        DC     POST
10E3 0  8014   00255        DC     JCN+AZ     TEST FOR SHUTDOWN
10E4 0  10E7   00256        DC     *+2
10E5 0  8040   00257  TRAP  DC     JUN
10E6 0  10E5   00258        DC     TRAP
10E7 0  8040   00259        DC     JUN        RETURN IF NO PRINT
10E8 0  1156   00260        DC     STRT1
               00261  *UPDATE ASCENDING REGISTER, DESCENDING REGISTER,
               00262  *PIECE COUNTER AND ADJUST CHECKSUMS
10E9 0  8020   00263  POST  DC     FIM+0      ASC
10EA 0  0008   00264        DC     /08
10EB 0  8022   00265        DC     FIM+2      MSR
10EC 0  0094   00266        DC     /94
10ED 0  80F1   00267        DC     CLC
10EE 0  8021   00268  POST1 DC     SRC+0      ASC+MSR
10EF 0  800E   00269        DC     RPM
10F0 0  800E   00270        DC     RPM
10F1 0  8023   00271        DC     SRC+2
10F2 0  80EB   00272        DC     ADM
10F3 0  80FB   00273        DC     DAA
10F4 0  8021   00274        DC     SRC+0
10F5 0  80E3   00275        DC     WPM
10F6 0  80E3   00276        DC     WPM
10F7 0  8063   00277        DC     INC+3
10F8 0  8071   00278        DC     ISZ+1
10F9 0  10EE   00279        DC     POST1
10FA 0  8020   00280        DC     FIM+0
10FB 0  0002   00281        DC     /02
10FC 0  8050   00282        DC     JMS        GENERATE MEMORY CHECKSUM
10FD 0  15D4   00283        DC     CHKSM
10FE 0  8020   00284        DC     FIM+0      INCREMENT PIECE COUNT
10FF 0  0012   00285        DC     /12
               00286  *ROM 1
1100 0  8022   00287        DC     FIM+2      COUNTER
1101 0  00A0   00288        DC     /A0
1102 0  80FA   00289        DC     STC
1103 0  8021   00290  POST4 DC     SRC+0
1104 0  800E   00291        DC     RPM
1105 0  800E   00292        DC     RPM
1106 0  8083   00293        DC     XCH+3
1107 0  80F7   00294        DC     TCC
1108 0  8083   00295        DC     ADD+3
1109 0  80FB   00296        DC     DAA
110A 0  80E3   00297        DC     WPM
110B 0  80E3   00298        DC     WPM
110C 0  8061   00299        DC     INC+1
110D 0  8072   00300        DC     ISZ+2
110E 0  1103   00301        DC     POST4
110F 0  8024   00302        DC     FIM+4      MSR
1110 0  0094   00303        DC     /94
1111 0  80FA   00304        DC     STC
1112 0  80F9   00305  POST5 DC     TCS        DESC-MSR
1113 0  8025   00306        DC     SRC+4
1114 0  80E8   00307        DC     SBM
1115 0  80F1   00308        DC     CLC
1116 0  8086   00309        DC     XCH+6
1117 0  8021   00310        DC     SRC+0
1118 0  800E   00311        DC     RPM
1119 0  800E   00312        DC     RPM
111A 0  8086   00313        DC     ADD+6
111B 0  80FB   00314        DC     DAA
111C 0  80E3   00315        DC     WPM
111D 0  80E3   00316        DC     WPM
111E 0  8065   00317        DC     INC+5
111F 0  8071   00318        DC     ISZ+1
1120 0  1112   00319        DC     POST5
1121 0  8020   00320        DC     FIM+0      GENERATE CHECKSUM
1122 0  0012   00321        DC     /12
1123 0  8050   00322        DC     JMS
1124 0  15D4   00323        DC     CHKSM
1125 0  8050   00324        DC     JMS        TEST POSTAGE IN DESC
1126 0  1646   00325        DC     TPST
1127 0  80E9   00326        DC     RDM
1128 0  8020   00327        DC     FIM+0
1129 0  0008   00328        DC     /08
112A 0  8021   00329        DC     SRC+0
```

```
1128 0   80E0   00330          DC    WRM      WRITE INTO MESSAGE AREA
112C 0   80F5   00331          DC    RAL
112D 0   8022   00332          DC    FIM+2
112E 0   0000   00333          DC    /00
112F 0   801A   00334          DC    JCN+CZ   DESC LESS THAN SETTING
1130 0   1134   00335          DC    TEST2
1131 0   8050   00336          DC    JMS      DISABLE IF INSUFFICIENT
1132 0   1414   00337          DC    DSBLE    POSTAGE
1133 0   80FA   00338          DC    STC
1134 0   8020   00339   TEST2  DC    FIM+0
1135 0   0007   00340          DC    /07
1136 0   8021   00341          DC    SRC+0
1137 0   80D0   00342          DC    LDM+0
1138 0   80F5   00343          DC    RAL
1139 0   80E0   00344          DC    WRM      WRITE IN DISABLED/ENABLED
113A 0   8020   00345          DC    FIM+0    BIT
113B 0   0002   00346          DC    /02
113C 0   8021   00347          DC    SRC+0
113D 0   8004   00348          DC    LDM+4
113E 0   80E0   00349          DC    WRM      WRITE IN PRINT OP CODE
113F 0   8061   00350          DC    INC+1
1140 0   80DC   00351          DC    LDM+/C   SET UP COUNTER
1141 0   80B2   00352          DC    XCH+2
1142 0   8024   00353          DC    FIM+4    ADDRESS OF POSTAGE AMOUNT
1143 0   0094   00354          DC    /94
1144 0   8025   00355   TEST3  DC    SRC+4
1145 0   80E9   00356          DC    RDM
1146 0   8021   00357          DC    SRC+0
1147 0   80E0   00358          DC    WRM      PLACE POSTAGE AMOUNT INTO
1148 0   8061   00359          DC    INC+1    OUTPUT REGISTER
1149 0   8065   00360          DC    INC+5
114A 0   8072   00361          DC    ISZ+2
114B 0   1144   00362          DC    TEST3
114C 0   8020   00363   TEST4  DC    FIM+0
114D 0   0020   00364          DC    /20
114E 0   8021   00365          DC    SRC+0
114F 0   80EA   00366          DC    RDR
1150 0   80F6   00367          DC    RAR
1151 0   80F6   00368          DC    RAR
1152 0   801A   00369          DC    JCN+CZ   WAIT FOR PRINT SIGNAL TO
1153 0   114C   00370          DC    TEST4    TERMINATE
1154 0   8040   00371          DC    JUN
1155 0   104E   00372          DC    CHECK
                00373   *LOOK FOR INPUT MESSAGE
1156 0   8022   00374   STRT1  DC    FIM+2
1157 0   0000   00375          DC    /00
1158 0   8023   00376          DC    SRC+2
1159 0   80EA   00377          DC    RDR
115A 0   80F6   00378          DC    RAR
115B 0   8012   00379          DC    JCN+CN
115C 0   115F   00380          DC    *+2
115D 0   8040   00381          DC    JUN
115E 0   10DA   00382          DC    TEST0
                00383   * RECEIVE MESSAGE
115F 0   8020   00384   RCVR   DC    FIM+0    SPECIFY RAM MEMORY
1160 0   0000   00385          DC    /00
1161 0   8022   00386          DC    FIM+2    SPECIFY ROM INPUT PORT
1162 0   0000   00387          DC    /00
1163 0   8023   00388          DC    SRC+2    SELECT ROM PORT
1164 0   80EA   00389   RCVR1  DC    RDR
1165 0   80F6   00390          DC    RAR
1166 0   801A   00391          DC    JCN+CZ
1167 0   1164   00392          DC    RCVR1    WAIT FOR START OF XMSSN
1168 0   8024   00393          DC    FIM+4    SPECIFY RAM OUTPUT PORT
1169 0   0080   00394          DC    /80
116A 0   8025   00395          DC    SRC+4
116B 0   8008   00396          DC    LDM+8
116C 0   80E1   00397          DC    WMP      WRITE OUT TAG BIT
116D 0   8023   00398          DC    SRC+2
116E 0   80EA   00399   RCVR2  DC    RDR
116F 0   80F6   00400          DC    RAR
1170 0   801A   00401          DC    JCN+CZ
1171 0   1177   00402          DC    RCVR3
1172 0   8075   00403          DC    ISZ+5
1173 0   116E   00404          DC    RCVR2
1174 0   8001   00405          DC    LDM+1
```

```
1175 0   8040   00406          DC   JUN
1176 0   119E   00407          DC   RCVR8
1177 0   8024   00408   RCVR3  DC   FIM+4
1178 0   000C   00409          DC   /0C       COUNT OF FOUR LOOP
1179 0   8023   00410          DC   SRC+2
117A 0   80D0   00411   RCVR4  DC   LDM+0
117B 0   80B3   00412          DC   XCH+3
117C 0   80EA   00413   RCVR7  DC   RDR
117D 0   80F6   00414          DC   RAR
117E 0   8012   00415          DC   JCN+CN
117F 0   1185   00416          DC   RCVR5
1180 0   8073   00417          DC   ISZ+3
1181 0   117C   00418          DC   RCVR7
1182 0   80D2   00419          DC   LDM+2
1183 0   8040   00420          DC   JUN
1184 0   119E   00421          DC   RCVR8
1185 0   80EA   00422   RCVR5  DC   RDR       COUNT LENGTH OF TIME NOT 0
1186 0   80F6   00423          DC   RAR
1187 0   801A   00424          DC   JCN+CZ
1188 0   118E   00425          DC   RCVR6
1189 0   8074   00426          DC   ISZ+4
118A 0   1185   00427          DC   RCVR5
118B 0   80D3   00428          DC   LDM+3
118C 0   8040   00429          DC   JUN
118D 0   119E   00430          DC   RCVR8
118E 0   80F1   00431   RCVR6  DC   CLC
118F 0   80DD   00432          DC   LDM+/D
1190 0   8084   00433          DC   ADD+4     DETERMINE IF MORE THAN 2
1191 0   80B6   00434          DC   XCH+6     C=1, MORE 2, C=0 LESS 2
1192 0   80F6   00435          DC   RAR       MSD RECEIVED FIRST
1193 0   80B6   00436          DC   XCH+6
1194 0   80D0   00437          DC   LDM+0
1195 0   80B4   00438          DC   XCH+4     RESET COUNTER
1196 0   8075   00439          DC   ISZ+5
1197 0   117A   00440          DC   RCVR4     GO BACK TO PICK UP NXT BIT
1198 0   8021   00441          DC   SRC+0
1199 0   80A6   00442          DC   LD+6      LOAD RECEIVED WORD
119A 0   80E0   00443          DC   WRM
119B 0   8071   00444          DC   ISZ+1
119C 0   1177   00445          DC   RCVR3     END OF SEQUENCE
119D 0   80D0   00446          DC   LDM+0
119E 0   80B2   00447   RCVR8  DC   XCH+2
119F 0   8024   00448          DC   FIM+4     SELECT RAM
11A0 0   0080   00449          DC   /80
11A1 0   8025   00450          DC   SRC+4
11A2 0   80D0   00451          DC   LDM+0
11A3 0   80E1   00452          DC   WMP       TERMINATE TAG
11A4 0   80A2   00453          DC   LD+2      LOAD ERROR MESSAGE
11A5 0   801C   00454          DC   JCN+AN    JUMP TO ERROR ROUTINE
11A6 0   11CF   00455          DC   ST5       MESSAGE ERROR
11A7 0   8022   00456          DC   FIM+2     GENERATE CHECKSUM FOR
11A8 0   0000   00457          DC   /00       RECEIVED MESSAGE
11A9 0   8020   00458          DC   FIM+0
11AA 0   0002   00459          DC   /02
11AB 0   8021   00460   STO    DC   SRC+0
11AC 0   80E9   00461          DC   RDM
11AD 0   80F1   00462          DC   CLC
11AE 0   8083   00463          DC   ADD+3
11AF 0   80FB   00464          DC   DAA
11B0 0   80B3   00465          DC   XCH+3
11B1 0   80D0   00466          DC   LDM+0
11B2 0   8082   00467          DC   ADD+2
11B3 0   80FB   00468          DC   DAA
11B4 0   80B2   00469          DC   XCH+2
11B5 0   8071   00470          DC   ISZ+1
11B6 0   11AB   00471          DC   STO
11B7 0   8021   00472          DC   SRC+0     COMPARE GENERATED CHECKSUM
11B8 0   80E9   00473          DC   RDM       WITH MESSAGE CHECKSUM
11B9 0   80F1   00474          DC   CLC
11BA 0   8092   00475          DC   SUB+2
11BB 0   801C   00476          DC   JCN+AN
11BC 0   11CE   00477          DC   ERRO      CHECKSUM ERROR
11BD 0   8061   00478          DC   INC+1     CC340....
11BE 0   8021   00479          DC   SRC+0
11BF 0   80E9   00480          DC   RDM
11C0 0   80F1   00481          DC   CLC
```

```
11C1 0   8093      00482            DC       SUB+3
11C2 0   801C      00483            DC       JCN+AN
11C3 0   11CE      00484            DC       ERRO        CHECKSUM ERROR
11C4 0   8061      00485            DC       INC+1       CC340.....
11C5 0   8021      00486            DC       SRC+0
11C6 0   80E9      00487            DC       RDM.        READ OP CODE
11C7 0   8081      00488            DC       XCH+1       SET UP FIN INSTRUCTION
11C8 0   80DF      00489            DC       LDM+/F
11C9 0   8080      00490            DC       XCH+0
11CA 0   8050      00491            DC       JMS         JUMP TO ROUTINE
11CB 0   12DC      00492            DC       FCTN
11CC 0   8040      00493            DC       JUN         RETURN TO MAIN PROGRAM
11CD 0   104E      00494            DC       CHECK
                   00495      *MESSAGE ERROR GENERATION
11CE 0   80D4      00496      ERRO  DC       LDM+4       CHECKSUM ERROR
11CF 0   80B2      00497      ST5   DC       XCH+2
11D0 0   8020      00498            DC       FIM+0
11D1 0   0002      00499            DC       /02
11D2 0   8021      00500            DC       SRC+0
11D3 0   80D3      00501            DC       LDM+3
11D4 0   80E0      00502            DC       WRM         WRITE ERROR OP CODE
11D5 0   8061      00503            DC       INC+1
11D6 0   8021      00504            DC       SRC+0
11D7 0   80B2      00505            DC       XCH+2
11D8 0   80E0      00506      ERRX  DC       WRM         WRITE IN ERROR MESSAGE
11D9 0   8061      00507            DC       INC+1
11DA 0   80D0      00508            DC       LDM+0
11DB 0   8021      00509            DC       SRC+0
11DC 0   80E0      00510            DC       WRM         FILL UP REST OF FIELD WITH
11DD 0   8071      00511            DC       ISZ+1       ZEROS
11DE 0   11DB      00512            DC       *-4
11DF 0   8040      00513            DC       JUN         RETURN TO MAIN PROGRAM
11E0 0   104E      00514            DC       CHECK
                   00515      *SUBROUTINE DISP                           04 OCT 76
                   00516      *OUTPUTS 12 BITS SERIALLY TO OUTPUT DISPLAY REGISTER
                   00517      *FROM 3 WORDS IN RAM MEMORY
                   00518      *LOCATIONS 1D - 1F
11E1 0   8020      00519      DISP  DC       FIM+0       LOCATION OF DISPLAY OUTPUT
11E2 0   001D      00520            DC       /1D
11E3 0   8022      00521      DISP1 DC       FIM+2       OUTPUT PORT, LOOP
11E4 0   008C      00522            DC       /8C         SPECIFIER
11E5 0   8021      00523            DC       SRC+0       SELECT MEMORY
11E6 0   80E9      00524            DC       RDM
11E7 0   80B4      00525            DC       XCH+4
11E8 0   8023      00526            DC       SRC+2       SELECT OUTPUT PORT
11E9 0   80B4      00527      DISP2 DC       XCH+4       OUTPUT 4 BITS SERIALLY
11EA 0   80F6      00528            DC       RAR         INTO S/R
11EB 0   80B4      00529            DC       XCH+4
11EC 0   80D2      00530            DC       LDM+2
11ED 0   80F5      00531            DC       RAL
11EE 0   80E1      00532            DC       WMP
11EF 0   80D0      00533            DC       LDM+0
11F0 0   80E1      00534            DC       WMP
11F1 0   8073      00535            DC       ISZ+3
11F2 0   11E9      00536            DC       DISP2
11F3 0   8071      00537            DC       ISZ+1
11F4 0   11E3      00538            DC       DISP1       GET NEW 4 BIT WORD
11F5 0   80C0      00539            DC       BBL+0
                   00540      *SUBROUTINE DESLT                          01 APR 1977
                   00541      *DISABLES METER IN EVENT OF ERROR
11F6 0   8020      00542      DESLT DC       FIM+0
11F7 0   0010      00543            DC       PRTA1
11F8 0   8021      00544            DC       SRC+0
11F9 0   80DF      00545            DC       LDM+/F
11FA 0   80E4      00546            DC       WR0
11FB 0   8050      00547            DC       JMS
11FC 0   1300      00548            DC       STEPS
11FD 0   80C0      00549            DC       BBL+0
                   00550      *SUBROUTINE LOAD, SEND                      02 JUN 77
                   00551      *WRITES INTO SPECIFIED BLOCK OF NVM
                   00552      *READS SPECIFIED BLOCK OF NVM
11FE 0   80FA      00553      LOAD  DC       STC
11FF 0   8040      00554            DC       JUN
                   00555      * ROM2
1200 0   1202      00556            DC       *+1
1201 0   80F1      00557      SEND  DC       CLC
```

```
1202 0  8020         DC      FIM+0
1203 0  0003         DC      /03
1204 0  8021         DC      SRC+0
               *TEST ENABLING SWITCH
               *(ACCESSIBLE ONLY TO AUTHORIZED PERSONNEL)
1205 0  80EA         DC      RDR
1206 0  80F5         DC      RAL
1207 0  801A         DC      JCN+CZ
1208 0  1225         DC      LOSE2
1209 0  80F6         DC      RAR
120A 0  80E9         DC      RDM        READ NVM ADDRESS
120B 0  80B2         DC      XCH+2
120C 0  8061         DC      INC+1
120D 0  8021         DC      SRC+0
120E 0  80E9         DC      RDM
120F 0  80B3         DC      XCH+3      SET UP RP2
1210 0  80D8         DC      LDM+8
1211 0  80B4         DC      XCH+4
1212 0  8061   LOSE1 DC      INC+1
1213 0  801A         DC      JCN+CZ
1214 0  121C         DC      *+7
1215 0  8021         DC      SRC+0
1216 0  80E9         DC      RDM        READ DATA
1217 0  8023         DC      SRC+2
1218 0  80E3         DC      WPM
1219 0  80E3         DC      WPM        WRITE INTO NVM
121A 0  8040         DC      JUN
121B 0  1221         DC      *+5
121C 0  8023         DC      SRC+2
121D 0  800E         DC      RPM
121E 0  800E         DC      RPM        READ MEMORY
121F 0  8021         DC      SRC+0
1220 0  80E0         DC      WRM        WRITE OUT
1221 0  8063         DC      INC+3
1222 0  8074         DC      ISZ+4
1223 0  1212         DC      LOSE1
1224 0  80C0         DC      BBL+0
1225 0  80DF   LOSE2 DC      LDM+/F
1226 0  8020         DC      FIM+0
1227 0  0005         DC      /05
1228 0  8021         DC      SRC+0
1229 0  80E0         DC      WRM
122A 0  80D0         DC      LDM+0
122B 0  8071         DC      ISZ+1
122C 0  1228         DC      *-5
122D 0  80C0         DC      BBL+0
               *SUBROUTINE DISAB                         17 FEB 77
               *CALLING ROUTINE TO DISABLE METER
122E 0  8050   DISAB DC      JMS
122F 0  16AE         DC      ERRR
1230 0  80D8         DC      LDM+8
1231 0  80B2         DC      XCH+2
1232 0  80A6         DC      LD+6
1233 0  801C         DC      JCN+AN
1234 0  1237         DC      *+2
1235 0  8050         DC      JMS
1236 0  1414         DC      DSBLE      DISABLE
1237 0  8020         DC      FIM+0
1238 0  0003         DC      /03
1239 0  80B2         DC      XCH+2
123A 0  8021         DC      SRC+0
123B 0  80E0         DC      WRM
123C 0  80C0         DC      BBL+0
               *SUBROUTINE SETZ                          10 DEC 76
               *SETS TO SPECIFIC POSTAGE AMOUNT
123D 0  8050   SETZ  DC      JMS
123E 0  16AE         DC      ERRR
123F 0  80DF         DC      LDM+/F
1240 0  8006         DC      AN6
1241 0  8014         DC      JCN+AZ
1242 0  1248         DC      *+5
1243 0  80D0         DC      LDM+0
1244 0  80B2         DC      XCH+2
1245 0  80D7         DC      LDM+7
1246 0  8040         DC      JUN
1247 0  128B         DC      STER
```

```
1248 0  8020   00634          DC   FIM+0     CHECK FOR BCD
1249 0  0003   00635          DC   /03
124A 0  8022   00636          DC   FIM+2
124B 0  00C0   00637          DC   /C0
124C 0  8021   00638   ST2    DC   SRC+0
124D 0  80F1   00639          DC   CLC
124E 0  80E9   00640          DC   RDM
124F 0  80FB   00641          DC   DAA
1250 0  801A   00642          DC   JCN+CZ
1251 0  1257   00643          DC   *+5
1252 0  80D0   00644          DC   LDM+0
1253 0  80B2   00645          DC   XCH+2
1254 0  80D6   00646          DC   LDM+6
1255 0  8040   00647          DC   JUN
1256 0  128B   00648          DC   STER
1257 0  8061   00649          DC   INC+1
1258 0  8072   00650          DC   ISZ+2
1259 0  124C   00651          DC   ST2
125A 0  8020   00652          DC   FIM+0     DATA ADDRESS
125B 0  0003   00653          DC   /03
125C 0  8022   00654          DC   FIM+2     ADDRESS OF NTBS
125D 0  009C   00655          DC   /9C
125E 0  8021   00656   ST6    DC   SRC+0
125F 0  80E9   00657          DC   RDM
1260 0  8023   00658          DC   SRC+2
1261 0  80E0   00659          DC   WRM       TRANSFER DATA
1262 0  8061   00660          DC   INC+1
1263 0  8073   00661          DC   ISZ+3
1264 0  125E   00662          DC   ST6
1265 0  8050   00663          DC   JMS       SET TO POSTAGE AMOUNT
1266 0  1600   00664          DC   SETS      NO ERROR, ACC=0
1267 0  801C   00665          DC   JCN+AN
1268 0  128B   00666          DC   STER      JUMP IF SETTING ERROR
1269 0  8020   00667          DC   FIM+0
126A 0  0007   00668          DC   /07
126B 0  8021   00669          DC   SRC+0
126C 0  80E9   00670          DC   RDM       READ MESS BIT SPEC ENABLE
126D 0  801C   00671          DC   JCN+AN
126E 0  1285   00672          DC   ST3       JUMP IF NOT TO BE ENABLED
126F 0  8050   00673          DC   JMS
1270 0  166E   00674          DC   ENBLE
1271 0  8014   00675          DC   JCN+AZ
1272 0  127E   00676          DC   ST1
1273 0  8020   00677          DC   FIM+0     ASKED TO ENABLE, DIDN'T
1274 0  0007   00678          DC   /07
1275 0  8021   00679          DC   SRC+0
1276 0  80D1   00680          DC   LDM+1
1277 0  80E0   00681          DC   WRM       DISABLED
1278 0  8061   00682          DC   INC+1
1279 0  8021   00683          DC   SRC+0
127A 0  80A7   00684          DC   LD+7
127B 0  80E0   00685          DC   WRM       DESC REGISTER STATUS
127C 0  8040   00686          DC   JUN
127D 0  1285   00687          DC   ST3
127E 0  80A6   00688   ST1    DC   LD+6
127F 0  8014   00689          DC   JCN+AZ    JUMP IF NO ERROR
1280 0  1285   00690          DC   ST3
1281 0  80B2   00691          DC   XCH+2
1282 0  80D5   00692          DC   LDM+5
1283 0  8040   00693          DC   JUN
1284 0  128B   00694          DC   STER
1285 0  8020   00695   ST3    DC   FIM+0
1286 0  0025   00696          DC   /25
1287 0  8021   00697          DC   SRC+0
1288 0  80D0   00698          DC   LDM+0
1289 0  8040   00699          DC   JUN
128A 0  15F9   00700          DC   ERR3
128B 0  8020   00701   STER   DC   FIM+0
128C 0  0009   00702          DC   /09
128D 0  8021   00703          DC   SRC+0
128E 0  80E0   00704          DC   WRM       WRITE ERROR MESSAGE
128F 0  8061   00705          DC   INC+1
1290 0  8021   00706          DC   SRC+0
1291 0  80B2   00707          DC   XCH+2
1292 0  80E0   00708          DC   WRM       OUTPUT ERROR
1293 0  80F1   00709          DC   CLC
```

```
1294 0  80DA          DC      LDM+/A
1295 0  8082          DC      ADD+2
1296 0  801A          DC      JCN+CZ
1297 0  1299          DC      *+1
1298 0  80C0          DC      BBL+0
1299 0  8050          DC      JMS
129A 0  11F6          DC      DESLT
129B 0  8040          DC      JUN
129C 0  15EB          DC      ERR1
               *SUBROUTINE READR                                  06 DEC 76
               *READ REGISTERS
129D 0  8022   READR  DC      FIM+2
129E 0  0003          DC      /03
129F 0  8023          DC      SRC+2    SELECT REGISTER SPECIFIER
12A0 0  80F1          DC      CLC      (0-5)
12A1 0  80DB          DC      LDM+/B
12A2 0  80EB          DC      ADM
12A3 0  801A          DC      JCN+CZ   JUMP IF NVM REGISTER
12A4 0  12B7          DC      RED1
12A5 0  801C          DC      JCN+AN   JUMP IF UNDEFINED
12A6 0  12CD          DC      RED2     (PERFORMS NO OPERATION)
12A7 0  8020          DC      FIM+0    MSR
12A8 0  0094          DC      /94
12A9 0  8022          DC      FIM+2
12AA 0  00CC          DC      /CC
12AB 0  8024          DC      FIM+4
12AC 0  0004          DC      /04
12AD 0  8021   RED3   DC      SRC+0
12AE 0  80E9          DC      RDM      READ MSR
12AF 0  8025          DC      SRC+4
12B0 0  80E0          DC      WRM      WRITE INTO OUTPUT AREA
12B1 0  8061          DC      INC+1
12B2 0  8065          DC      INC+5
12B3 0  8072          DC      ISZ+2
12B4 0  12AD          DC      RED3
12B5 0  8040          DC      JUN
12B6 0  12CD          DC      RED2
12B7 0  80E9   RED1   DC      RDM      NONVOLATILE REGISTERS
12B8 0  80B1          DC      XCH+1
12B9 0  80DE          DC      LDM+/E
12BA 0  80B0          DC      XCH+0    SET UP LOOK-UP TABLE
12BB 0  8032          DC      FIN+2    STARTING ADDRESS
12BC 0  80A1          DC      LD+1
12BD 0  80F5          DC      RAL
12BE 0  80FA          DC      STC
12BF 0  80F6          DC      RAR
12C0 0  80B1          DC      XCH+1
12C1 0  8034          DC      FIN+4    COUNTER LOOP
12C2 0  8026          DC      FIM+6    LOCATION IN OUTPUT AREA FOR
12C3 0  0004          DC      /04      DUMP
12C4 0  8023   RED4   DC      SRC+2
12C5 0  800E          DC      RPM
12C6 0  800E          DC      RPM      READ REGISTER
12C7 0  8027          DC      SRC+6
12C8 0  80E0          DC      WRM      WRITE INTO OUTPUT AREA
12C9 0  8063          DC      INC+3
12CA 0  8067          DC      INC+7
12CB 0  8074          DC      ISZ+4
12CC 0  12C4          DC      RED4
12CD 0  80C0   RED2   DC      BBL+0
               *TRANSFER VECTORS
12CE 0  8040   ZEROM  DC      JUN
12CF 0  1005          DC      INITZ
12D0 0  8040   ENA    DC      JUN
12D1 0  1400          DC      ENABL
12D2 0  8040   DIS    DC      JUN
12D3 0  122E          DC      DISAB
12D4 0  8040   SETZO  DC      JUN
12D5 0  123D          DC      SETZ
12D6 0  8040   READA  DC      JUN
12D7 0  129D          DC      READR
12D8 0  8040   RMRSA  DC      JUN
12D9 0  070E          DC      RMRSO
12DA 0  8040   READD  DC      JUN
12DB 0  1201          DC      SEND
12DC 0  8032   FCTN   DC      FIN+2
```

```
12DD 0  8033    00786         DC      JIN+2
                00787    *TABLE OF ADDRESSES FOR READING REGISTERS
12DE            00788         ORG     /12E0      STARTING ADDRESS
12E0 0  0008    00789         DC      /08        ASCENDING REGISTER
12E1 0  0018    00790         DC      /18        DESCENDING REGISTER
12E2 0  0028    00791         DC      /28        CONTROL SUM
12E3 0  0012    00792         DC      /12        PIECE COUNT
12E4 0  0022    00793         DC      /22        MACHINE STATUS, ERRORS
                00794    *TRANSFER VECTOR
12E5 0  8040    00795    LOADA DC     JUN
12E6 0  11FE    00796         DC      LOAD
                00797    *TABLE OF COUNTS FOR READING REGISTERS
12E7            00798         ORG     /12E8      COUNT
12E8 0  0080    00799         DC      /80        ASCENDING REGISTER
12E9 0  0080    00800         DC      /80        DESCENDING REGISTER
12EA 0  0080    00801         DC      /80        CONTROL SUM
12EB 0  00A0    00802         DC      /A0        PIECE COUNT
12EC 0  00A0    00803         DC      /A0        MACHINE STATUS, ERRORS
12ED 0  80D5    00804    ERRM  DC     LDM+5
12EE 0  8040    00805         DC      JUN
12EF 0  11CF    00806         DC      ST5
                00807    *TABLE OP CODES                          10 DEC 76
12F0            00808         ORG     /12F0
12F0 0  12D4    00809         DC      SETZO      SET METER
12F1 0  12D6    00810         DC      READA      READ REGISTERS
12F2 0  12D8    00811         DC      RMRSA      PUT POSTAGE IN METER
12F3 0  12ED    00812         DC      ERRM
12F4 0  12ED    00813         DC      ERRM
12F5 0  12ED    00814         DC      ERRM
12F6 0  12CE    00815         DC      ZEROM      SET METER TO ZERO
12F7 0  12E5    00816         DC      LOADA      LOAD MEMORY
12F8 0  12DA    00817         DC      READD      READ MEMORY
12F9 0  12D0    00818         DC      ENA        ENABLE
12FA 0  12D2    00819         DC      DIS        DISABLE
12FB 0  12ED    00820         DC      ERRM
12FC 0  12ED    00821         DC      ERRM
12FD 0  12ED    00822         DC      ERRM
12FE 0  12ED    00823         DC      ERRM
12FF 0  12ED    00824         DC      ERRM
1300            00825         ORG     /1300
                00826    *SUBROUTINE STEPS                        23 JAN 76
                00827    *8 LOCATIONS FOR LOOK-UP TABLE AT /XXE0
                00828    *10 LOCATIONS FOR LOOK-UP TABLE AT /XXF6
                00829    *CALLS READB, DLAYS
                00830    *EQUATES PRTA1, PORTB
                00831    *STATUS CHARACTERS SC0, ..., SC3 ADDRESSED BY PRTA1
                00832    *STEPS SEQUENCE  BANK3 TO 'ENABLED' AS READ BY
                00833    *PHOTOCELL ENCODER   5 6 3 4 7 2
                00834    *SC0  STEP DIRECTION
                00835    *     F, STEP UP
                00836    *     1, STEP DOWN
                00837    *SC1  ENABLE FLAG
                00838    *     0, NOT ENABLED
                00839    *     NOT 0, ENABLE
                00840    *SC2  ERROR
                00841    *     BIT 0, NOT 1 STEP IN SPECIFIED DIRECTION
                00842    *     BIT 1, NOT ALL ZEROS BETWEEN POSITIONS
                00843    *SC3  POSITION MOTOR IN AFTER LAST STEPS AS READ
                00844    *     BY ENCODER
1300 0  8020    00845    STEPS DC     FIM+0
1301 0  0040    00846         DC      PORTB
1302 0  8021    00847         DC      SRC+0      SELECT MOTOR PORT
1303 0  80D5    00848         DC      LDM+5
1304 0  80E1    00849         DC      WMP        ENABLE SELECT MOTOR
1305 0  8022    00850         DC      FIM+2
1306 0  0010    00851         DC      PRTA1
1307 0  8023    00852         DC      SRC+2
1308 0  80D8    00853         DC      LDM+8
1309 0  80E1    00854         DC      WMP        LOCK UP MOTOR
130A 0  8020    00855         DC      FIM+0      PRELOAD CONSTANTS
130B 0  00F6    00856         DC      /F6
130C 0  80D0    00857         DC      LDM+0
130D 0  80E6    00858         DC      WR2        CLEAR ERROR INDICATOR
130E 0  8034    00859    STP1  DC     FIN+4
130F 0  80EC    00860         DC      RD0        READ MOTOR DIRECTION
1310 0  80F5    00861         DC      RAL
```

```
1311 0  80A4    00862          DC    LD+4       SELECT DATA FOR
1312 0  8012    00863          DC    JCN+CN     MOTOR DIRECTION
1313 0  1315    00864          DC    STP2
1314 0  80A5    00865          DC    LD+5       LOAD MOTOR DATA
1315 0  80E1    00866   STP2   DC    WMP        WRITE OUT STEP TO MOTOR
1316 0  80B3    00867          DC    XCH+3      TEMP STORE
1317 0  8050    00868          DC    JMS
1318 0  13E8    00869          DC    DLAYS
1319 0  8023    00870          DC    SRC+2
131A 0  80ED    00871          DC    RD1        CHECK FOR ENABLE
131B 0  8014    00872          DC    JCN+AZ     JUMP IF NOT ENABLE
131C 0  1323    00873          DC    STP3
131D 0  8050    00874          DC    JMS        ADDITIONAL DELAY IF ENABLE
131E 0  13E8    00875          DC    DLAYS
131F 0  8050    00876          DC    JMS
1320 0  13E8    00877          DC    DLAYS
1321 0  8000    00878          DC    NOP
1322 0  8000    00879          DC    NOP
1323 0  80F1    00880   STP3   DC    CLC        CHECK FOR 0010
1324 0  80DE    00881          DC    LDM+/E
1325 0  8083    00882          DC    ADD+3
1326 0  801C    00883          DC    JCN+AN
1327 0  1336    00884          DC    STP5
1328 0  80F0    00885          DC    CLB
1329 0  8050    00886          DC    JMS        READ BANK PHOTOCELLS
132A 0  1554    00887          DC    READB
132B 0  80EC    00888          DC    RD0        CHECK FOR 000
132C 0  80FA    00889          DC    STC
132D 0  801C    00890          DC    JCN+AN
132E 0  1330    00891          DC    STP4
132F 0  80F1    00892          DC    CLC
1330 0  8022    00893   STP4   DC    FIM+2
1331 0  0010    00894          DC    PRTA1
1332 0  8023    00895          DC    SRC+2      SELECT STATUS CHARACTER
1333 0  80EE    00896          DC    RD2
1334 0  80F5    00897          DC    RAL        PUT FIRST ERROR BIT IN
1335 0  80E6    00898          DC    WR2        STATUS WORD
1336 0  8071    00899   STP5   DC    ISZ+1      CHECK FOR END OF LOOP
1337 0  130E    00900          DC    STP1
1338 0  80F0    00901          DC    CLB
1339 0  8050    00902          DC    JMS
133A 0  1554    00903          DC    READB      READ BANK PHOTOCELLS
133B 0  8022    00904          DC    FIM+2
133C 0  0010    00905          DC    PRTA1
133D 0  80EC    00906          DC    RD0        READ DATA FROM READB
133E 0  80B3    00907          DC    XCH+3      STORE NEW BANK READINGS
133F 0  8023    00908          DC    SRC+2
1340 0  80EF    00909          DC    RD3        PREVIOUS BANK READING
1341 0  80B3    00910          DC    XCH+3
1342 0  80E7    00911          DC    WR3        NEW BANK READING STORED
1343 0  8014    00912          DC    JCN+AZ     IF ZERO, ERROR
1344 0  1355    00913          DC    STP7-1
1345 0  80B1    00914          DC    XCH+1
1346 0  80DE    00915          DC    LDM+/E     GENERATE ADDRESS FOR
1347 0  80B0    00916          DC    XCH+0      LOOK-UP TABLE
1348 0  8034    00917          DC    FIN+4
1349 0  80EC    00918          DC    RD0        SELECT DIRECTION
134A 0  80F5    00919          DC    RAL
134B 0  80A4    00920          DC    LD+4
134C 0  801A    00921          DC    JCN+CZ
134D 0  1350    00922          DC    STP6
134E 0  80F1    00923          DC    CLC
134F 0  80A5    00924          DC    LD+5
1350 0  8014    00925   STP6   DC    JCN+AZ
1351 0  1355    00926          DC    STP7-1
1352 0  8093    00927          DC    SUB+3
1353 0  8014    00928          DC    JCN+AZ
1354 0  1356    00929          DC    STP7
1355 0  80DF    00930          DC    LDM+/F
1356 0  80F5    00931   STP7   DC    RAL
1357 0  80EE    00932          DC    RD2
1358 0  80F5    00933          DC    RAL
1359 0  80E6    00934          DC    WR2        WRITE IN ERROR MESSAGE
135A 0  80ED    00935          DC    RD1        READ ENABLE
135B 0  801C    00936          DC    JCN+AN     IF ENABLED, JUMP TO END
135C 0  1363    00937          DC    STP9       IF NOT ENABLED, REMOVE
```

```
135D 0  80E1   00938  STP8  DC    WMP     MOTOR DRIVE
135E 0  8020   00939        DC    FIM+0
135F 0  0040   00940        DC    PORTB
1360 0  8021   00941        DC    SRC+0
1361 0  80C4   00942        DC    LDM+4
1362 0  80E1   00943        DC    WMP
1363 0  8023   00944  STP9  DC    SRC+2   SELECT STATUS CHARACTERS
1364 0  80C0   00945        DC    BBL+0
               00946  *SUBROUTINE STEPD
               00947  *10 LOCATIONS FOR LOOK-UP TABLE             22 JAN 76
               00948  *CALLS DLAYD, READS
               00949  *EQUATES PRTAO,PORTB
               00950  *STATUS CHARACTERS ADDRESSED BY PRTAO
               00951  *SCO  STEP DIRECTION
               00952  *     F, STEP UP
               00953  *     1, STEP DOWN
               00954  *SC1  STEP INDICATOR
               00955  *     0000 FULL STEP
               00956  *     1111 HALF STEP
               00957  *SC2  ERROR
               00958  *     BIT0  FIFTH STEP ERROR
               00959  *     BIT1  FULL STEP ERROR
               00960  *     BIT2  HALF STEP ERROR
               00961  *SC3  FIFTH STEP COUNTER
               00962  *     0000 INDICATES FIFTH STEP
1365 0  8020   00963  STEPD DC    FIM+0
1366 0  0040   00964        DC    PORTB
1367 0  8021   00965        DC    SRC+0   SELECT MOTOR PORT
1368 0  80D6   00966        DC    LDM+6
1369 0  80E1   00967        DC    WMP     ENABLE DRIVE MOTOR
136A 0  8022   00968        DC    FIM+2   SPEC MOTOR PORT +
136B 0  0000   00969        DC    PRTAO   STATUS CHARACTERS
136C 0  8023   00970        DC    SRC+2   DRIVE MOTOR PORT
136D 0  80D8   00971        DC    LDM+8
136E 0  80E1   00972        DC    WMP     LOCK UP MOTOR
136F 0  80D0   00973        DC    LDM+0
1370 0  80C6   00974        DC    WR2     CLEAR ERROR REGISTER
1371 0  8020   00975  STEPO DC    FIM+0   PRELOAD CONSTANTS
1372 0  00F6   00976        DC    /F6
1373 0  8034   00977  STEP1 DC    FIN+4   FETCH MOTOR DATA
1374 0  80EC   00978        DC    RDO     READ MOTOR DIRECTION
1375 0  80F5   00979        DC    RAL
1376 0  80A5   00980        DC    LD+5    LOAD MOTOR DATA
1377 0  801A   00981        DC    JCN+CZ
1378 0  137A   00982        DC    STEP2
1379 0  80A4   00983        DC    LD+4
137A 0  80E1   00984  STEP2 DC    WMP     WRITE OUT
137B 0  8050   00985        DC    JMS
137C 0  13EF   00986        DC    DLAYD   DELAY
137D 0  8071   00987        DC    ISZ+1
137E 0  1373   00988        DC    STEP1
137F 0  80ED   00989        DC    RD1     FULL STEP, HALF STEP
1380 0  80F4   00990        DC    CMA     INDICATORS
1381 0  80E5   00991        DC    WR1
1382 0  80F0   00992        DC    CLB
1383 0  8050   00993        DC    JMS
1384 0  1552   00994        DC    READS   READ EVERY STEP PHOTOCELL
1385 0  80EC   00995        DC    RDO
1386 0  80F6   00996        DC    RAR     ISOLATE EVERY STEP BIT
1387 0  80F3   00997        DC    CMC
1388 0  8022   00998        DC    FIM+2
1389 0  0000   00999        DC    PRTAO
138A 0  8023   01000        DC    SRC+2
138B 0  80ED   01001        DC    RD1     READ EVERY STEP INDICATOR
138C 0  8014   01002        DC    JCN+AZ  TEST FOR VALID COMBINATION
138D 0  1390   01003        DC    STEP3   1 0000    0 1111
138E 0  80F4   01004        DC    CMA     IN CASE OF ERROR
138F 0  80F3   01005        DC    CMC     PUT BIT IN RD2
1390 0  80EE   01006  STEP3 DC    RD2
1391 0  80F5   01007        DC    RAL
1392 0  80E6   01008        DC    WR2     STORE ERROR BIT
1393 0  80ED   01009        DC    RD1     READ STEP/HALF STEP
1394 0  801C   01010        DC    JCN+AN  INDICATOR. JUMP IF ON HALF
1395 0  1371   01011        DC    STEPO   STEP
1396 0  8024   01012        DC    FIM+4
1397 0  0080   01013        DC    READC
```

```
1398 0  8025   01014         DC     SRC+4
1399 0  80EC   01015         DC     RD0      READ FIFTH STEP PHOTOCELL
139A 0  80B5   01016         DC     XCH+5    STORE FIFTH STEP
139B 0  8023   01017         DC     SRC+2    SELECT FIFTH STEP COUNTER
139C 0  80EC   01018         DC     RD0      READ DIRECTION INDICATOR
139D 0  80F5   01019         DC     RAL      PUT DIRECTION BIT IN CARRY
139E 0  80EF   01020         DC     RD3      READ FIFTH STEP COUNTER
139F 0  801A   01021         DC     JCN+CZ
13A0 0  13A7   01022         DC     STEP5
13A1 0  8014   01023         DC     JCN+AZ
13A2 0  13A4   01024         DC     STEP4
13A3 0  80F1   01025         DC     CLC
13A4 0  80F5   01026   STEP4 DC     RAL
13A5 0  8040   01027         DC     JUN
13A6 0  13AB   01028         DC     STEP6+1
13A7 0  801C   01029   STEP5 DC     JCN+AN
13A8 0  13AA   01030         DC     STEP6
13A9 0  80FA   01031         DC     STC
13AA 0  80F6   01032   STEP6 DC     RAR
13AB 0  80E7   01033         DC     WR3      UPDATE FIFTH STEP COUNTER
13AC 0  80B5   01034         DC     XCH+5    TEMP STORE, RECALL FIFTH
13AD 0  80F6   01035         DC     RAR      STEP PHOTOCELL READING
13AE 0  80F6   01036         DC     RAR      PUT FIFTH STEP BIT IN CARRY
13AF 0  80A5   01037         DC     LD+5
13B0 0  801C   01038         DC     JCN+AN   TEST FOR VALID COMBINATION
13B1 0  13B3   01039         DC     STEP7    1 000    0 NOT 0
13B2 0  80F3   01040         DC     CMC      IN CASE OF ERROR, WRITE
13B3 0  80EE   01041   STEP7 DC     RD2      PUT BIT IN RD2
13B4 0  80F5   01042         DC     RAL
13B5 0  80E6   01043         DC     WR2
13B6 0  80D0   01044         DC     LDM+0
13B7 0  80E1   01045         DC     WMP
13B8 0  8020   01046         DC     FIM+0
13B9 0  0040   01047         DC     PORTB
13BA 0  8021   01048         DC     SRC+0
13BB 0  80D4   01049         DC     LDM+4
13BC 0  80E1   01050         DC     WMP      DESELECT MOTOR
13BD 0  8023   01051         DC     SRC+2    SELECT STATUS CHARACTERS
13BE 0  80C0   01052         DC     BBL+0
               01053   *SUBROUTINE CMP                      10 MAR 76
               01054   *COMPARES SELECTED DIGIT IN MSR AND NTBS AND
               01055   *GENERATES LOOP COUNT AND SETTING DIRECTION FOR
               01056   *STEPD AND DECREMENTS ADDRESS OF REGISTERS
13BF 0  80F1   01057   CMP   DC     CLC
13C0 0  802F   01058         DC     SRC+/E   SELECT MSR
13C1 0  80E9   01059         DC     RDM
13C2 0  802D   01060         DC     SRC+/C   SELECT NTBS
13C3 0  80E8   01061         DC     SBM
13C4 0  80F3   01062         DC     CMC
13C5 0  8012   01063         DC     JCN+CN
13C6 0  13C9   01064         DC     CMP1
13C7 0  80F4   01065         DC     CMA
13C8 0  80F2   01066         DC     IAC
13C9 0  80B9   01067   CMP1  DC     XCH+9    STORE DATA
13CA 0  802D   01068         DC     SRC+/C
13CB 0  80E9   01069         DC     RDM
13CC 0  802F   01070         DC     SRC+/E
13CD 0  80E0   01071         DC     WRM      UPDATE MSR
13CE 0  80D1   01072         DC     LDM+1
13CF 0  801A   01073         DC     JCN+CZ
13D0 0  13D2   01074         DC     CMP2
13D1 0  80DF   01075         DC     LDM+/F
13D2 0  80B8   01076   CMP2  DC     XCH+8    STORE DIRECTION INDICATOR
13D3 0  80F1   01077         DC     CLC
13D4 0  80DF   01078         DC     LDM+/F
13D5 0  808F   01079         DC     ADD+/F
13D6 0  80BF   01080         DC     XCH+/F
13D7 0  80F1   01081         DC     CLC
13D8 0  80DF   01082         DC     LDM+/F
13D9 0  808D   01083         DC     ADD+/D
13DA 0  80BD   01084         DC     XCH+/D   DECREMENT ADDRESS
13DB 0  80C0   01085         DC     BBL+0
13DC           01086         ORG    /13E0
13E0 0  0000   01087         DC     /00
13E1 0  0000   01088         DC     /00
13E2 0  0070   01089         DC     /70
```

```
13E3 0   0064    01090          DC       /64
13E4 0   0037    01091          DC       /37
13E5 0   0006    01092          DC       /06
13E6 0   0053    01093          DC       /53
13E7 0   0042    01094          DC       /42
                 01095    * SUBROUTINE DLAYS                              03 DEC 75
                 01096    *7 LOCATIONS
                 01097    *DELAY OF 3 MS
13E8 0   8024    01098    DLAYS DC       FIM+4
13E9 0   0008    01099          DC       /08
13EA 0   8074    01100    DLYS  DC       ISZ+4
13EB 0   13EA    01101          DC       DLYS
13EC 0   8075    01102          DC       ISZ+5
13ED 0   13EA    01103          DC       DLYS
13EE 0   8000    01104          DC       NOP
                 01105    * SUBROUTINE DLAYD                              02 DEC 75
                 01106    *7 LOCATIONS
                 01107    *DELAY OF 1.5 MS
13EF 0   8024    01108    DLAYD DC       FIM+4
13F0 0   00CC    01109          DC       /CC
13F1 0   8074    01110    DLYD  DC       ISZ+4
13F2 0   13F1    01111          DC       DLYD
13F3 0   8075    01112          DC       ISZ+5
13F4 0   13F1    01113          DC       DLYD
13F5 0   80C0    01114          DC       BBL+0
                 01115    *TABLE TO CHECK STEPS SEQUENCE
                 01116    *8 LOCATIONS
                 01117    *TABLE TO GENERATE MOTOR STEPPING SEQUENCE
                 01118    *10 LOCATIONS
13F6             01119          ORG      /13F6
13F6 0   00C9    01120          DC       /C9
13F7 0   0041    01121          DC       /41
13F8 0   0063    01122          DC       /63
13F9 0   0022    01123          DC       /22
13FA 0   0036    01124          DC       /36
13FB 0   0014    01125          DC       /14
13FC 0   009C    01126          DC       /9C
13FD 0   0088    01127          DC       /88
13FE 0   0088    01128          DC       /88
13FF 0   0088    01129          DC       /88
1400             01130          ORG      /1400
                 01131    *SUBROUTINE ENABL                               17 FEB 77
                 01132    *CALLING ROUTINE TO ENABLE METER
1400 0   8050    01133    ENABL DC       JMS
1401 0   16AE    01134          DC       ERRR
1402 0   80A6    01135          DC       LD+6
1403 0   80FA    01136          DC       STC
1404 0   801C    01137          DC       JCN+AN
1405 0   1407    01138          DC       *+1
1406 0   80F1    01139          DC       CLC
1407 0   80D8    01140          DC       LDM+8
1408 0   8012    01141          DC       JCN+CN
1409 0   140C    01142          DC       *+2
140A 0   8050    01143          DC       JMS
140B 0   166E    01144          DC       ENBLE     ENABLE
140C 0   8020    01145          DC       FIM+0
140D 0   0003    01146          DC       /03
140E 0   8021    01147          DC       SRC+0     ERROR MESSAGE LOCATION
140F 0   801C    01148          DC       JCN+AN    ACC = /F IF NOT ENABLED
1410 0   1412    01149          DC       *+1       BECAUSE INSUFFICIENT POSTA
1411 0   80A6    01150          DC       LD+6
1412 0   80E0    01151          DC       WRM       STEPS ERROR
1413 0   80C0    01152          DC       BBL+0
                 01153    *SUBROUTINE DSBLE                               31 JAN 77
                 01154    *DISABLES METER IF NOT ALREADY DISABLED
1414 0   8020    01155    DSBLE DC       FIM+0
1415 0   0010    01156          DC       PRTA1
1416 0   8021    01157          DC       SRC+0
1417 0   80DF    01158          DC       LDM+/F
1418 0   80E4    01159          DC       WR0       STEP UP FLAG
1419 0   80D0    01160          DC       LDM+0
141A 0   80E5    01161          DC       WR1       SET DISABLED FLAG
141B 0   80EF    01162          DC       RD3       READ POSITION SETTING
141C 0   80B2    01163          DC       XCH+2
141D 0   80D8    01164          DC       LDM+8
141E 0   80FA    01165          DC       STC
```

```
141F 0  8082   01166          DC      ADD+2
1420 0  801C   01167          DC      JCN+AN    JUMP IF NOT DISABLED
1421 0  1424   01168          DC      *+2
1422 0  80B2   01169          DC      XCH+2
1423 0  80C0   01170          DC      BBL+0
1424 0  8050   01171          DC      JMS
1425 0  1300   01172          DC      STEPS
1426 0  80EE   01173          DC      RD2
1427 0  8014   01174          DC      JCN+AZ
1428 0  142F   01175          DC      *+6
1429 0  80B6   01176          DC      XCH+6
142A 0  8050   01177          DC      JMS
142B 0  15EB   01178          DC      ERR1
142C 0  8050   01179          DC      JMS
142D 0  11F6   01180          DC      DESLT
142E 0  80B6   01181          DC      XCH+6
142F 0  80B2   01182          DC      XCH+2
1430 0  80C0   01183          DC      BBL+0
               01184    *SUBROUTINE INITS                      03 FEB 76
1431 0  80D0   01185    INITS DC      LDM+0
1432 0  8020   01186          DC      FIM+0     SET REGISTER TO ZERO
1433 0  0090   01187          DC      MSR-/7
1434 0  8021   01188          DC      SRC+0
1435 0  80E0   01189          DC      WRM
1436 0  8071   01190          DC      ISZ+1
1437 0  1434   01191          DC      *-4
1438 0  8020   01192          DC      FIM+0
1439 0  0040   01193          DC      PORTB     ENABLE PORT
143A 0  8022   01194          DC      FIM+2
143B 0  0000   01195          DC      PRTA0
143C 0  8021   01196          DC      SRC+0
143D 0  80D5   01197          DC      LDM+5
143E 0  80E1   01198          DC      WMP       ENABLE DRIVE MOTOR
143F 0  8023   01199          DC      SRC+2
1440 0  80D8   01200          DC      LDM+8     WRITE OUT REST POSITION
1441 0  80E1   01201          DC      WMP
1442 0  8050   01202          DC      JMS
1443 0  13EF   01203          DC      DLAYD
1444 0  8050   01204          DC      JMS
1445 0  13EF   01205          DC      DLAYD     LINE UP DRIVE MOTOR
1446 0  80D0   01206          DC      LDM+0
1447 0  80E1   01207          DC      WMP
1448 0  8021   01208          DC      SRC+0
1449 0  80D4   01209          DC      LDM+4
144A 0  80E1   01210          DC      WMP       DE-SELECT MOTOR
144B 0  80F0   01211          DC      CLB
144C 0  8050   01212          DC      JMS
144D 0  1552   01213          DC      READS     READ EVERY STEP PHOTOCELL
144E 0  80EC   01214          DC      RD0
144F 0  80F6   01215          DC      RAR       PUT STEP READING IN CARRY
1450 0  8020   01216          DC      FIM+0
1451 0  0000   01217          DC      PRTA0
1452 0  8021   01218          DC      SRC+0
1453 0  80DF   01219          DC      LDM+/F    HALF STEP
1454 0  801A   01220          DC      JCN+CZ
1455 0  1457   01221          DC      INIT1
1456 0  80D0   01222          DC      LDM+0
1457 0  80E5   01223    INIT1 DC      WR1       SET UP STEP INDICATOR
1458 0  80DF   01224          DC      LDM+/F
1459 0  80E4   01225          DC      WR0       STEP UP
145A 0  8012   01226          DC      JCN+CN
145B 0  145E   01227          DC      INIT2
145C 0  8050   01228          DC      JMS
145D 0  1365   01229          DC      STEPD
145E 0  8020   01230    INIT2 DC      FIM+0
145F 0  0040   01231          DC      PORTB
1460 0  8022   01232          DC      FIM+2
1461 0  0010   01233          DC      PRTA1
1462 0  8021   01234          DC      SRC+0
1463 0  80D6   01235          DC      LDM+6     ENABLE SELECT MOTOR
1464 0  80E1   01236          DC      WMP
1465 0  8023   01237          DC      SRC+2
1466 0  80D8   01238          DC      LDM+8
1467 0  80E1   01239          DC      WMP       WRITE OUT REST POSITION
1468 0  80D0   01240          DC      LDM+0
1469 0  80E5   01241          DC      WR1
```

```
146A 0  8050   01242          DC   JMS
146B 0  13E8   01243          DC   DLAYS
146C 0  8050   01244          DC   JMS
146D 0  13E8   01245          DC   DLAYS
146E 0  80DA   01246          DC   LDM+/A
146F 0  80B7   01247          DC   XCH+7
1470 0  80DA   01248   INIT3  DC   LDM+/A   STORE DATA NEEDED TO CHECK
1471 0  80B1   01249          DC   XCH+1    FOR 0101
1472 0  80F0   01250          DC   CLB
1473 0  8050   01251          DC   JMS
1474 0  1554   01252          DC   READB    READ BANK SETTING
1475 0  80EC   01253          DC   RD0
1476 0  80F5   01254          DC   RAL
1477 0  80F1   01255          DC   CLC
1478 0  80F6   01256          DC   RAR      SET UNUSED BIT TO 0
1479 0  80FA   01257          DC   STC
147A 0  8081   01258          DC   ADD+1
147B 0  8014   01259          DC   JCN+AZ
147C 0  1489   01260          DC   INIT4    CHECK FOR POSITION IN 3
147D 0  8020   01261          DC   FIM+0
147E 0  0010   01262          DC   PRTA1
147F 0  8021   01263          DC   SRC+0    STEP AWAY
1480 0  80DF   01264          DC   LDM+/F
1481 0  80E4   01265          DC   WR0
1482 0  8050   01266          DC   JMS
1483 0  1300   01267          DC   STEPS
1484 0  8077   01268          DC   ISZ+7    ERROR IF IT TAKES TOO MANY
1485 0  1470   01269          DC   INIT3    STEPS TO GET TO END OF BANK
1486 0  80D0   01270          DC   LDM+0
1487 0  80B2   01271          DC   XCH+2
1488 0  80C1   01272          DC   BBL+1    ERROR MESSAGE
1489 0  8020   01273   INIT4  DC   FIM+0
148A 0  0010   01274          DC   PRTA1
148B 0  8021   01275          DC   SRC+0
148C 0  80D1   01276          DC   LDM+1
148D 0  80E4   01277          DC   WR0      SET SELECT MOTOR DIRECTION
148E 0  80D5   01278          DC   LDM+5
148F 0  80E7   01279          DC   WR3
1490 0  8020   01280          DC   FIM+0    BACK
1491 0  0000   01281          DC   PRTA0
1492 0  8021   01282          DC   SRC+0
1493 0  80D1   01283          DC   LDM+1
1494 0  80E4   01284          DC   WR0      SET DRIVE MOTOR DIRECTION
1495 0  8028   01285          DC   FIM+8    DOWN
1496 0  00CC   01286          DC   /CC      SET UP COUNTER
1497 0  80D6   01287          DC   LDM+6
1498 0  80B7   01288          DC   XCH+7
1499 0  80A9   01289   INIT5  DC   LD+9
149A 0  80B8   01290          DC   XCH+8
149B 0  80F0   01291          DC   CLB
149C 0  8050   01292          DC   JMS
149D 0  1553   01293          DC   READZ    READ ZERO PHOTOCELLS
149E 0  80EC   01294          DC   RD0
149F 0  80F6   01295   INIT6  DC   RAR
14A0 0  8078   01296          DC   ISZ+8
14A1 0  149F   01297          DC   INIT6    PUT DESIRED BIT IN CARRY
14A2 0  8012   01298          DC   JCN+CN
14A3 0  14B3   01299          DC   INIT7    GO TO WHEN SET TO ZERO
14A4 0  8050   01300          DC   JMS
14A5 0  1365   01301          DC   STEPD
14A6 0  80D6   01302          DC   LDM+6
14A7 0  80B6   01303          DC   XCH+6
14A8 0  80EE   01304          DC   RD2
14A9 0  8006   01305          DC   AN6
14AA 0  8014   01306          DC   JCN+AZ
14AB 0  14AE   01307          DC   INITE
14AC 0  8082   01308          DC   XCH+2    STORE ERROR DATA
14AD 0  80C7   01309          DC   BBL+7    ERROR MESSAGE
14AE 0  8077   01310   INITE  DC   ISZ+7    TOO MANY STEPC TO GET TO
14AF 0  1499   01311          DC   INIT5    ZERO
14B0 0  80A9   01312          DC   LD+9
14B1 0  8082   01313          DC   XCH+2    STORE ERROR DATA
14B2 0  80C2   01314          DC   BBL+2    ERROR MESSAGE
14B3 0  8020   01315   INIT7  DC   FIM+0
14B4 0  0000   01316          DC   PRTA0
14B5 0  8021   01317          DC   SRC+0
```

```
14B6 0  80DF    01318          DC    LDM+/F
14B7 0  80E4    01319          DC    WRO        SET STEPD DIRECTION
14B8 0  8050    01320          DC    JMS
14B9 0  1365    01321          DC    STEPD
14BA 0  80A9    01322          DC    LD+9
14BB 0  80B8    01323          DC    XCH+8
14BC 0  80F0    01324          DC    CLB
14BD 0  8050    01325          DC    JMS
14BE 0  1553    01326          DC    READZ
14BF 0  80EC    01327          DC    RDO
14C0 0  80F6    01328    INITA DC    RAR
14C1 0  8078    01329          DC    ISZ+8
14C2 0  14C0    01330          DC    INITA
14C3 0  801A    01331          DC    JCN+CZ     OFF ZERO POSITION
14C4 0  14C8    01332          DC    INITB
14C5 0  80A9    01333          DC    LD+9
14C6 0  80B2    01334          DC    XCH+2
14C7 0  80C5    01335          DC    BBL+5      IF NOT, ERROR
14C8 0  8020    01336    INITB DC    FIM+0
14C9 0  0000    01337          DC    PRTAO
14CA 0  8021    01338          DC    SRC+0
14CB 0  80D1    01339          DC    LDM+1
14CC 0  80E4    01340          DC    WRO        SET STEPD DOWN
14CD 0  8050    01341          DC    JMS
14CE 0  1365    01342          DC    STEPD
14CF 0  80A9    01343          DC    LD+9
14D0 0  80B8    01344          DC    XCH+8
14D1 0  80F0    01345          DC    CLB
14D2 0  8050    01346          DC    JMS
14D3 0  1553    01347          DC    READZ
14D4 0  80EC    01348          DC    RDO
14D5 0  80F6    01349    INITC DC    RAR
14D6 0  8078    01350          DC    ISZ+8
14D7 0  14D5    01351          DC    INITC
14D8 0  8012    01352          DC    JCN+CN     ON ZERO POSITION
14D9 0  14DD    01353          DC    INITD
14DA 0  80A9    01354          DC    LD+9
14DB 0  80B2    01355          DC    XCH+2
14DC 0  80C6    01356          DC    BBL+6      IF NOT, ERROR
14DD 0  8050    01357    INITD DC    JMS        SELECT NEXT LOWER BANK
14DE 0  1300    01358          DC    STEPS
14DF 0  80EE    01359          DC    RD2
14E0 0  8014    01360          DC    JCN+AZ
14E1 0  14E4    01361          DC    *+2
14E2 0  80B2    01362          DC    XCH+2
14E3 0  80C4    01363          DC    BBL+4      STEPS ERROR
14E4 0  8079    01364          DC    ISZ+9
14E5 0  1497    01365          DC    INIT5-2
14E6 0  80DA    01366          DC    LDM+/A
14E7 0  80B7    01367          DC    XCH+7
14E8 0  80F0    01368    INIT8 DC    CLB
14E9 0  8050    01369          DC    JMS
14EA 0  1552    01370          DC    READS
14EB 0  80EC    01371          DC    RDO
14EC 0  80F6    01372          DC    RAR        READ FIFTH STEP INDICATOR
14ED 0  80F6    01373          DC    RAR
14EE 0  8012    01374          DC    JCN+CN
14EF 0  14F7    01375          DC    INIT9
14F0 0  8050    01376          DC    JMS        STEP DOWN ONE
14F1 0  1365    01377          DC    STEPD
14F2 0  8077    01378          DC    ISZ+7
14F3 0  14E8    01379          DC    INIT8
14F4 0  80D0    01380          DC    LDM+0
14F5 0  80B2    01381          DC    XCH+2
14F6 0  80C3    01382          DC    BBL+3      ERROR, DOESN'T SEE FIFTH
14F7 0  8020    01383    INIT9 DC    FIM+0      STEP CELL
14F8 0  0000    01384          DC    PRTAO
14F9 0  8021    01385          DC    SRC+0
14FA 0  80D0    01386          DC    LDM+0
14FB 0  80E7    01387          DC    WR3        SET FIFTH STEP COUNTER
14FC 0  80B2    01388          DC    XCH+2
14FD 0  80C0    01389          DC    BBL+0
                01390    *SUBROUTINE TNVM                    05 OCT 76
                01391    *CHECKSUM ERROR IN SC 0, REGISTER 2
                01392    *ASC+DESC=CONTROL    ERROR  C=1, NO ERROR  C=0
14FE 0  8020    01393    TNVM  DC    FIM+0      MEMORY LOCATION
```

```
14FF 0  0001   01394          DC     /01
1500           01395          ORG    /1500
1500 0  8022   01396          DC     FIM+2    SPECIFIES STATUS CHARACTER
1501 0  002C   01397          DC     /2C      LOCATION,COUNT OF 4 LOOP
1502 0  8024   01398   TNVM1  DC     FIM+4    INITIALIZE COUNT REGISTER
1503 0  0000   01399          DC     /00
1504 0  8061   01400          DC     INC+1
1505 0  8021   01401   TNVM2  DC     SRC+0    GENERATE CHECKSUM
1506 0  800E   01402          DC     RPM
1507 0  800E   01403          DC     RPM
1508 0  80F1   01404          DC     CLC
1509 0  8085   01405          DC     ADD+5
150A 0  8085   01406          DC     XCH+5
150B 0  80D0   01407          DC     LDM+0
150C 0  8084   01408          DC     ADD+4
150D 0  8084   01409          DC     XCH+4
150E 0  8071   01410          DC     ISZ+1
150F 0  1505   01411          DC     TNVM2
1510 0  8021   01412          DC     SRC+0    TEST FIRST CHECK DIGIT
1511 0  800E   01413          DC     RPM
1512 0  800E   01414          DC     RPM
1513 0  80F1   01415          DC     CLC
1514 0  8094   01416          DC     SUB+4
1515 0  8061   01417          DC     INC+1
1516 0  801C   01418          DC     JCN+AN
1517 0  1522   01419          DC     TNVM3
1518 0  8021   01420          DC     SRC+0    TEST SECOND CHECK DIGIT
1519 0  800E   01421          DC     RPM
151A 0  800E   01422          DC     RPM
151B 0  80F1   01423          DC     CLC
151C 0  8095   01424          DC     SUB+5
151D 0  801C   01425          DC     JCN+AN
151E 0  1522   01426          DC     TNVM3
151F 0  80F0   01427          DC     CLB      GENERATE ERROR MESSAGE
1520 0  8040   01428          DC     JUN
1521 0  1524   01429          DC     TNVM4
1522 0  80FA   01430   TNVM3  DC     STC
1523 0  80D0   01431          DC     LDM+0
1524 0  8023   01432   TNVM4  DC     SRC+2
1525 0  80EC   01433          DC     RDO
1526 0  80F5   01434          DC     RAL
1527 0  80E4   01435          DC     WRO
1528 0  8060   01436          DC     INC+0
1529 0  8073   01437          DC     ISZ+3
152A 0  1502   01438          DC     TNVM1
152B 0  8020   01439          DC     FIM+0
152C 0  0000   01440          DC     /00
152D 0  8024   01441          DC     FIM+4    ASCENDING REGISTER
152E 0  0008   01442          DC     /08
152F 0  8026   01443          DC     FIM+6    DESCENDING REGISTER
1530 0  0018   01444          DC     /18
1531 0  8028   01445          DC     FIM+8    CONTROL SUM
1532 0  0028   01446          DC     /28
1533 0  8025   01447   TNVM5  DC     SRC+4
1534 0  800E   01448          DC     RPM
1535 0  800E   01449          DC     RPM
1536 0  8080   01450          DC     XCH+0
1537 0  8081   01451          DC     XCH+1    RECALL CARRY
1538 0  80F6   01452          DC     RAR
1539 0  8027   01453          DC     SRC+6
153A 0  800E   01454          DC     RPM
153B 0  800E   01455          DC     RPM
153C 0  8080   01456          DC     ADD+0    ADD ASC+DESC
153D 0  80FB   01457          DC     DAA      DECIMAL ADJUST
153E 0  8080   01458          DC     XCH+0
153F 0  80D0   01459          DC     LDM+0
1540 0  80F5   01460          DC     RAL
1541 0  8081   01461          DC     XCH+1    STORE CARRY
1542 0  8029   01462          DC     SRC+8
1543 0  800E   01463          DC     RPM
1544 0  800E   01464          DC     RPM
1545 0  8090   01465          DC     SUB+0
1546 0  801C   01466          DC     JCN+AN
1547 0  154F   01467          DC     TNVM6
1548 0  8065   01468          DC     INC+5
1549 0  8067   01469          DC     INC+7
```

```
154A 0  8079          DC     ISZ+9
154B 0  1533          DC     TNVM5
154C 0  80F1          DC     CLC
154D 0  8040          DC     JUN
154E 0  1550          DC     TNVM7
154F 0  80FA   TNVM6  DC     STC
1550 0  8023   TNVM7  DC     SRC+2
1551 0  80C0          DC     BBL+0
               *SUBROUTINE READ                              21 JAN 76
               *CALL CLB, JMS, READ(B) OR (Z) OR (S)
               *DATA STORED IN RD0, ERROR MESSAGE IN RD1
               *STATUS CHARACTERS ADDRESSED BY READC
               *SC0  DATA FROM SPECIFIED INPUT
               *SC1  ERROR MESSAGE
               *     BIT0 NOT ALL ONES
               *     BIT1 NOT ALL ZEROS
               *SC2  NOT USED
               *SC3  NOT USED
1552 0  80F2   READS  DC     IAC        STEP, EVERY AND FIFTH
1553 0  80F2   READZ  DC     IAC        ZERO INDICATORS
1554 0  8000   READB  DC     NOP        BANK SELECT
1555 0  80F4          DC     CMA
1556 0  8022          DC     FIM+2      ADDRESS OF PORT AND
1557 0  0080          DC     READC      STATUS CHARACTERS
1558 0  80B3          DC     XCH+3      STORE LOOP COUNTER
1559 0  8023          DC     SRC+2
155A 0  80F0          DC     CLB
155B 0  80E4          DC     WR0
155C 0  80E5          DC     WR1        CLEAR STATUS CHARACTERS
155D 0  8024          DC     FIM+4      MPX INPUT PORT
155E 0  0010          DC     PORTD
155F 0  80DC          DC     LDM+/C     SET UP COUNTER
1560 0  80B5          DC     XCH+5      TO CLEAR MPX
1561 0  8025          DC     SRC+4
1562 0  80EA          DC     RDR        TEST FOR 0000
1563 0  8023          DC     SRC+2
1564 0  8014          DC     JCN+AZ
1565 0  1567          DC     READ1
1566 0  80D1          DC     LDM+1
1567 0  80E5   READ1  DC     WR1
1568 0  80D3          DC     LDM+3
1569 0  80E1          DC     WMP
156A 0  80D0          DC     LDM+0
156B 0  80E1          DC     WMP        WRITE DATA AND CP
156C 0  8025          DC     SRC+4
156D 0  80EA          DC     RDR        TEST FOR 1111
156E 0  80F4          DC     CMA
156F 0  8023          DC     SRC+2
1570 0  80F1          DC     CLC
1571 0  8014          DC     JCN+AZ
1572 0  1574          DC     READ3      ERROR MESSAGE
1573 0  80FA          DC     STC
1574 0  80CD   READ3  DC     RD1
1575 0  80F5          DC     RAL
1576 0  80E5          DC     WR1
1577 0  80D2   READ5  DC     LDM+2
1578 0  80E1          DC     WMP
1579 0  80D0          DC     LDM+0
157A 0  80E1          DC     WMP        CP
157B 0  8065          DC     INC+5
157C 0  8073          DC     ISZ+3
157D 0  1577          DC     READ5      CLOCK TO DESIRED LOCATION
157E 0  8025          DC     SRC+4
157F 0  80EA          DC     RDR        READ INPUT
1580 0  8023          DC     SRC+2
1581 0  80E4          DC     WR0        STORE DATA
1582 0  80D2   READ4  DC     LDM+2
1583 0  80E1          DC     WMP
1584 0  80D0          DC     LDM+0
1585 0  80E1          DC     WMP
1586 0  8075          DC     ISZ+5      CLEAR S/R MPX
1587 0  1582          DC     READ4
1588 0  80C0          DC     BBL+0      BRANCH BACK
               *SUBROUTINE ADP00                             26 OCT 76
               *ADDS RMRS AMOUNT TO DESCENDING REGISTER AND
               *CONTROL SUM
```

```
1589 0  8020   01546  ADP00 DC   FIM+0    DESC=DESC+POST
158A 0  001A   01547        DC   /1A      DESC IN NVM
158B 0  80D0   01548        DC   LDM+0    CLEAR REGISTER
158C 0  8022   01549        DC   FIM+2
158D 0  0007   01550        DC   /07
158E 0  8023   01551        DC   SRC+2
158F 0  80E0   01552        DC   WRM
1590 0  8073   01553        DC   ISZ+3
1591 0  158E   01554        DC   *-4
1592 0  8022   01555        DC   FIM+2    ADDRESS OF DOLLAR AMOUNT IN
1593 0  0003   01556        DC   /03      MESSAGE BLOCK
1594 0  80F1   01557        DC   CLC
1595 0  8023   01558  ADP01 DC   SRC+2
1596 0  80E9   01559        DC   RDM
1597 0  80B6   01560        DC   XCH+6
1598 0  8021   01561        DC   SRC+0
1599 0  800E   01562        DC   RPM
159A 0  800E   01563        DC   RPM
159B 0  8086   01564        DC   ADD+6
159C 0  80FB   01565        DC   DAA
159D 0  80E3   01566        DC   WPM      PUT DESC+POST INTO DESC
159E 0  80E3   01567        DC   WPM
159F 0  8063   01568        DC   INC+3
15A0 0  8071   01569        DC   ISZ+1
15A1 0  1595   01570        DC   ADP01
15A2 0  801A   01571        DC   JCN+CZ   IF NO OVERFLOW, JUMP
15A3 0  15B9   01572        DC   ADP02
15A4 0  8020   01573        DC   FIM+0    IF OVERFLOW, PUT
15A5 0  001A   01574        DC   /1A      DESC-POST INTO DESC
15A6 0  8022   01575        DC   FIM+2
15A7 0  0003   01576        DC   /03
15A8 0  80FA   01577        DC   STC
15A9 0  80F9   01578  ADP06 DC   TCS
15AA 0  8023   01579        DC   SRC+2
15AB 0  80E8   01580        DC   SBM
15AC 0  80F1   01581        DC   CLC
15AD 0  80B6   01582        DC   XCH+6
15AE 0  8021   01583        DC   SRC+0
15AF 0  800E   01584        DC   RPM
15B0 0  800E   01585        DC   RPM
15B1 0  8086   01586        DC   ADD+6
15B2 0  80FB   01587        DC   DAA
15B3 0  80E3   01588        DC   WPM
15B4 0  80E3   01589        DC   WPM
15B5 0  8063   01590        DC   INC+3
15B6 0  8071   01591        DC   ISZ+1
15B7 0  15A9   01592        DC   ADP06
15B8 0  80CF   01593        DC   BBL+/F   BRANCH BACK WITH ERROR
15B9 0  8020   01594  ADP02 DC   FIM+0    GENERATE CHECKSUM
15BA 0  0012   01595        DC   /12
15BB 0  8050   01596        DC   JMS
15BC 0  15D4   01597        DC   CHKSM
15BD 0  8020   01598        DC   FIM+0    CONTR=CONTR+POST
15BE 0  002A   01599        DC   /2A      CONTROL SUM IN NVM
15BF 0  8022   01600        DC   FIM+2    DOLLAR AMOUNT IN MESSAGE
15C0 0  0003   01601        DC   /03      BLOCK
15C1 0  80F1   01602        DC   CLC
15C2 0  8023   01603  ADP04 DC   SRC+2
15C3 0  80E9   01604        DC   RDM
15C4 0  80B6   01605        DC   XCH+6
15C5 0  8021   01606        DC   SRC+0
15C6 0  800E   01607        DC   RPM
15C7 0  800E   01608        DC   RPM
15C8 0  8086   01609        DC   ADD+6
15C9 0  80FB   01610        DC   DAA
15CA 0  80E3   01611        DC   WPM
15CB 0  80E3   01612        DC   WPM
15CC 0  8063   01613        DC   INC+3
15CD 0  8071   01614        DC   ISZ+1
15CE 0  15C2   01615        DC   ADP04
15CF 0  8020   01616        DC   FIM+0    GENERATE CHECKSUM
15D0 0  0022   01617        DC   /22
15D1 0  8050   01618        DC   JMS
15D2 0  15C4   01619        DC   CHKSM
15D3 0  80C0   01620        DC   BBL+0
               01621  *SUBROUTINE CHKSM                07 JAN 77
```

```
                      *SPECIFY STARTING ADDRESS IN NVM WITH FIM+0
15D4 0  8022          CHKSM DC   FIM+2     ZERO COUNTER
15D5 0  0000                DC   /00
15D6 0  80F1                DC   CLC
15D7 0  8021                DC   SRC+0
15D8 0  800E                DC   RPM
15D9 0  800E                DC   RPM       READ REGISTER
15DA 0  8083                DC   ADD+3     ADD TO COUNTER
15DB 0  80B3                DC   XCH+3
15DC 0  80D0                DC   LDM+0
15DD 0  8082                DC   ADD+2     PROPAGATE CARRY
15DE 0  80B2                DC   XCH+2
15DF 0  8071                DC   ISZ+1
15E0 0  15D6                DC   CHKSM+2
15E1 0  8021                DC   SRC+0
15E2 0  80A2                DC   LD+2
15E3 0  80E3                DC   WPM
15E4 0  80E3                DC   WPM       WRITE CHECKSUM INTO MEMORY
15E5 0  8061                DC   INC+1
15E6 0  8021                DC   SRC+0
15E7 0  80A3                DC   LD+3
15E8 0  80E3                DC   WPM
15E9 0  80E3                DC   WPM
15EA 0  80C0                DC   BBL+0
                      *SUBROUTINE ERR1, ERR2                  01 APR 1977
                      *WRITES ERROR MESSAGES IN NVM
15EB 0  8020          ERR1  DC   FIM+0     SETZ ERROR  E2
15EC 0  0024                DC   /24
15ED 0  8021                DC   SRC+0
15EE 0  80D1                DC   LDM+1
15EF 0  80E3                DC   WPM
15F0 0  80E3                DC   WPM
15F1 0  8061                DC   INC+1
15F2 0  8021          ERR2  DC   SRC+0
15F3 0  800E                DC   RPM
15F4 0  800E                DC   RPM
15F5 0  80F2                DC   IAC
15F6 0  801C                DC   JCN+AN
15F7 0  15F9                DC   *+1
15F8 0  80DF                DC   LDM+/F
15F9 0  80E3          ERR3  DC   WPM
15FA 0  80E3                DC   WPM
15FB 0  8020                DC   FIM+0
15FC 0  0022                DC   /22
15FD 0  8050                DC   JMS
15FE 0  15D4                DC   CHKSM
15FF 0  80C0                DC   BBL+0
1600                        ORG  /1600
                      *SUBROUTINE SETS                        10 MAR 76
                      *CALLS STEPS, STEPD, ERROR, RTN, CMP
1600 0  8050          SETS  DC   JMS
1601 0  1414                DC   DSBLE
1602 0  80A2                DC   LD+2
1603 0  8014                DC   JCN+AZ
1604 0  1606                DC   SET1
1605 0  80C1                DC   BBL+1
1606 0  002E          SET1  DC   FIM+/E    METER SETTING REGISTER
1607 0  0097                DC   MSR
1608 0  802C                DC   FIM+/C
1609 0  009F                DC   NTBS      NUMBER TO BE SET
160A 0  802A                DC   FIM+/A
160B 0  00C0                DC   /C0       COUNT LOOP
160C 0  8050          SET2  DC   JMS       CHECK TO SEE IF FURTHEST
160D 0  138F                DC   CMP       BANK NEEDS SETTING
160E 0  80A9                DC   LD+9
160F 0  801C                DC   JCN+AN
1610 0  1615                DC   SET3      GET OUT OF LOOP IF SETTING
1611 0  807A                DC   ISZ+/A    NEEDED
1612 0  160C                DC   SET2
1613 0  8040                DC   JUN
1614 0  1645                DC   SET4
1615 0  80AA          SET3  DC   LD+/A
1616 0  80BB                DC   XCH+/B
1617 0  8050          SET3A DC   JMS
1618 0  1300                DC   STEPS
1619 0  80EE                DC   RD2
```

```
161A 0  8014   01698         DC     JCN+AZ
161B 0  161E   01699         DC     SET3B
161C 0  80B2   01700         DC     XCH+2     STORE ERROR MESSAGE
161D 0  80C2   01701         DC     BBL+2
161E 0  807A   01702  SET3B  DC     ISZ+/A    STEP OVER TO BANK THAT
161F 0  1617   01703         DC     SET3A     NEEDS TO BE SET
1620 0  8022   01704         DC     FIM+2
1621 0  0010   01705         DC     PRTA1
1622 0  8023   01706         DC     SRC+2
1623 0  80D1   01707         DC     LDM+1
1624 0  80E4   01708         DC     WRO       REVERSE DIRECTION INDICATO
1625 0  8022   01709  SET4   DC     FIM+2
1626 0  0000   01710         DC     PRTA0
1627 0  8023   01711         DC     SRC+2
1628 0  80A8   01712         DC     LD+8      LOAD DIRECTION INDICATOR
1629 0  80E4   01713         DC     WRO
162A 0  8050   01714  SET5   DC     JMS
162B 0  1365   01715         DC     STEPD
162C 0  80EE   01716         DC     RD2
162D 0  8014   01717         DC     JCN+AZ
162E 0  1631   01718         DC     SET5A
162F 0  80B2   01719         DC     XCH+2     STORE ERROR MESSAGE
1630 0  80C3   01720         DC     BBL+3
1631 0  8079   01721  SET5A  DC     ISZ+9
1632 0  162A   01722         DC     SET5      STEP APPROPRIATE NUMBER OF
1633 0  8050   01723  SET6   DC     JMS       STEPS
1634 0  1300   01724         DC     STEPS
1635 0  80EE   01725         DC     RD2
1636 0  8014   01726         DC     JCN+AZ
1637 0  163A   01727         DC     SET6A
1638 0  80B2   01728         DC     XCH+2     STORE ERROR MESSAGE
1639 0  80C4   01729         DC     BBL+4
163A 0  806B   01730  SET6A  DC     INC+/B
163B 0  80AB   01731         DC     LD+/B
163C 0  8014   01732         DC     JCN+AZ
163D 0  1645   01733         DC     SET7      GO OUT WHEN IN ZERO BANK
163E 0  8050   01734         DC     JMS
163F 0  13BF   01735         DC     CMP
1640 0  80A9   01736         DC     LD+9
1641 0  8014   01737         DC     JCN+AZ
1642 0  1633   01738         DC     SET6
1643 0  8040   01739         DC     JUN
1644 0  1625   01740         DC     SET4
1645 0  80C0   01741  SET7   DC     BBL+0
               01742  *SUBROUTINE TPST                        12 OCT 76
               01743  *COMPARES METER SETTING REGISTER MSR TO DESCENDING
               01744  *REGISTER
               01745  *DESC LESS THAN $100  4 BIT ON
               01746  *DESC LESS THAN MSR   8 BIT ON  RAM WORD 1F
1646 0  8020   01747  TPST   DC     FIM+0     LOOK AT HIGHER ORDER DIGIT
1647 0  001C   01748         DC     /1C
1648 0  80F1   01749         DC     CLC
1649 0  8021   01750  TPST1  DC     SRC+0
164A 0  800E   01751         DC     RPM
164B 0  800E   01752         DC     RPM
164C 0  801C   01753         DC     JCN+AN    IF NONZERO, C=0
164D 0  1651   01754         DC     TPST2
164E 0  8071   01755         DC     ISZ+1
164F 0  1649   01756         DC     TPST1
1650 0  80F3   01757         DC     CMC       IF ALL DIGITS ZERO, C=1
1651 0  80D8   01758  TPST2  DC     LDM+8
1652 0  80F6   01759         DC     RAR
1653 0  80B7   01760         DC     XCH+7     STORE CARRY
1654 0  8020   01761         DC     FIM+0
1655 0  0018   01762         DC     /18       ADDRESS OF DESCENDING REG
1656 0  8024   01763         DC     FIM+4
1657 0  0094   01764         DC     /94       ADDRESS OF MSR
1658 0  80FA   01765         DC     STC
1659 0  80F9   01766  TPST3  DC     TCS       DESC-MSR
165A 0  8025   01767         DC     SRC+4
165B 0  80E8   01768         DC     SBM
165C 0  80F1   01769         DC     CLC
165D 0  80B6   01770         DC     XCH+6
165E 0  8021   01771         DC     SRC+0
165F 0  800E   01772         DC     RPM
1660 0  800E   01773         DC     RPM
```

```
1661 0  8086       DC     ADD+6
1662 0  80FB       DC     DAA
1663 0  8065       DC     INC+5
1664 0  8071       DC     ISZ+1
1665 0  1659       DC     TPST3
1666 0  80F3       DC     CMC        C=0 GREATER THAN MSR
1667 0  80B7       DC     XCH+7      C=1  LESS THAN MSR
1668 0  80F6       DC     RAR
1669 0  8020       DC     FIM+0
166A 0  001F       DC     /1F
166B 0  8021       DC     SRC+0
166C 0  80E0       DC     WRM        WRITE INTO DISPLAY REGISTER
166D 0  80C0       DC     BBL+0
                *SUBROUTINE ENBLE                       31 JAN 77
                *ENABLES METER UNLESS INSUFFICIENT POSTAGE
166E 0  8050    ENBLE DC  JMS
166F 0  1646       DC     TPST       TEST DESC
1670 0  80E9       DC     RDM
1671 0  80B7       DC     XCH+7      DESC STATUS
1672 0  8020       DC     FIM+0
1673 0  0010       DC     PRTA1
1674 0  8021       DC     SRC+0
1675 0  80D1       DC     LDM+1
1676 0  80E4       DC     WR0        STEP DOWN FLAG
1677 0  80DF       DC     LDM+/F
1678 0  80E5       DC     WR1        SET ENABLED FLAG
1679 0  80EF       DC     RD3        READ PRESENT SETTING
167A 0  80B6       DC     XCH+6
167B 0  80DD       DC     LDM+/D
167C 0  80FA       DC     STC
167D 0  8086       DC     ADD+6
167E 0  801C       DC     JCN+AN     JUMP IF NOT ENABLED
167F 0  1682       DC     *+2
1680 0  80B6       DC     XCH+6
1681 0  80C0       DC     BBL+0      ALREADY ENABLED
1682 0  80A7       DC     LD+7
1683 0  80F5       DC     RAL
1684 0  80D0       DC     LDM+0
1685 0  80B6       DC     XCH+6
1686 0  8012       DC     JCN+CN
1687 0  1694       DC     *+12
1688 0  8050       DC     JMS
1689 0  1300       DC     STEPS
168A 0  80EE       DC     RD2
168B 0  80B6       DC     XCH+6
168C 0  80EE       DC     RD2
168D 0  8014       DC     JCN+AZ
168E 0  1693       DC     *+4
168F 0  8050       DC     JMS
1690 0  15EB       DC     ERR1
1691 0  8050       DC     JMS
1692 0  11F6       DC     DESLT
1693 0  80C0       DC     BBL+0
1694 0  80CF       DC     BBL+/F     INSUFFICIENT POSTAGE
                *SUBROUTINE TINT                        05 OCT 76
                *INTERRUPT TEST
                *ACC=0  OK       ACC=/F   ERROR
1695 0  8020    TINT  DC  FIM+0
1696 0  0040       DC     /40
1697 0  8021       DC     SRC+0      SELECT INT OUTPUT PORT
1698 0  80D0       DC     LDM+0
1699 0  80E1       DC     WMP        TURN OFF LEDS
169A 0  8026       DC     FIM+6
169B 0  0023       DC     /23
169C 0  8027       DC     SRC+6
169D 0  80EA       DC     RDR        READ INPUT FROM INT
169E 0  8007       DC     AN7        CLEAR HIGHER ORDER BITS
169F 0  80F4       DC     CMA
16A0 0  80B7       DC     XCH+7      TEMP STORE
16A1 0  8021       DC     SRC+0
16A2 0  8004       DC     LDM+4
16A3 0  80E1       DC     WMP        TURN ON LEDS
16A4 0  8027       DC     SRC+6
16A5 0  80EA       DC     RDR        READ INPUT INT
16A6 0  80FA       DC     STC
16A7 0  80F5       DC     RAL
```

```
16A8 0  80FA          DC    STC
16A9 0  80F5          DC    RAL
16AA 0  8007          DC    AN7
16AB 0  80F4          DC    CMA
16AC 0  80E5          DC    WR1
16AD 0  80C0          DC    BBL+0
             *SUBROUTINE ERRR                            01 APR 1977
             *READS ERROR FLAGS IN NVM AND SETS UP R6
16AE 0  8020 ERRR     DC    FIM+0
16AF 0  0022          DC    /22
16B0 0  8021          DC    SRC+0     (22)
16B1 0  800E          DC    RPM
16B2 0  800E          DC    RPM       READ RMRS FLAG
16B3 0  80F1          DC    CLC
16B4 0  8082          DC    XCH+2     TEMP STORE
16B5 0  80DB          DC    LDM+/B    SET LIMIT
16B6 0  8082          DC    ADD+2
16B7 0  80F5          DC    RAL
16B8 0  80B6          DC    XCH+6     STORE ERROR IN R6
16B9 0  8061          DC    INC+1
16BA 0  8021          DC    SRC+0     (23)
16BB 0  80F1          DC    CLC
16BC 0  800E          DC    RPM
16BD 0  800E          DC    RPM
16BE 0  8014          DC    JCN+AZ
16BF 0  16C1          DC    *+1
16C0 0  80FA          DC    STC       SET BIT IF INIT ERROR
16C1 0  8061          DC    INC+1
16C2 0  8021          DC    SRC+0     (24)
16C3 0  800E          DC    RPM
16C4 0  800E          DC    RPM
16C5 0  8014          DC    JCN+AZ
16C6 0  16C8          DC    *+1
16C7 0  80FA          DC    STC       SET BIT IF SET ERROR
16C8 0  80B6          DC    XCH+6
16C9 0  80F5          DC    RAL
16CA 0  80B6          DC    XCH+6     STORE ERROR IN R6
16CB 0  8061          DC    INC+1
16CC 0  8021          DC    SRC+0     (25)
16CD 0  800E          DC    RPM
16CE 0  800E          DC    RPM
16CF 0  8082          DC    XCH+2     TEMP STORE
16D0 0  80DB          DC    LDM+/B    SET CUMULATIVE ERROR LIMIT
16D1 0  80F1          DC    CLC
16D2 0  8082          DC    ADD+2
16D3 0  80B6          DC    XCH+6
16D4 0  80F5          DC    RAL
16D5 0  80B6          DC    XCH+6     STORE ERROR IN R6
16D6 0  8061          DC    INC+1
16D7 0  8021          DC    SRC+0     (26)
16D8 0  80F1          DC    CLC
16D9 0  800E          DC    RPM
16DA 0  800E          DC    RPM
16DB 0  8014          DC    JCN+AZ
16DC 0  16DE          DC    *+1
16DD 0  80FA          DC    STC       MEMORY ERROR
16DE 0  80B6          DC    XCH+6
16DF 0  80F5          DC    RAL
16E0 0  80B6          DC    XCH+6
16E1 0  80C0          DC    BBL+0
             *SUBROUTINE COMP                            26 OCT 76
             *CHECKS FOR CORRESPONDENCE OF RMRS COMBINATIONS
16E2 0  8020 COMP     DC    FIM+0     MESSAGE BLOCK
16E3 0  0007          DC    /07
16E4 0  8022          DC    FIM+2     INTERNALLY GENERATED COMB
16E5 0  0067          DC    /67
16E6 0  8021 COMPO    DC    SRC+0
16E7 0  80FA          DC    STC
16E8 0  80E9          DC    RDM
16E9 0  80F4          DC    CMA
16EA 0  8023          DC    SRC+2
16EB 0  80EB          DC    ADM
16EC 0  801C          DC    JCN+AN
16ED 0  16F2          DC    COMP1
16EE 0  8061          DC    INC+1
16EF 0  8073          DC    ISZ+3
```

```
16F0 0   16E6     01926              DC      COMPO
16F1 0   80C0     01927              DC      BBL+0       MATCH
16F2 0   80CF     01928       COMP1  DC      BBL+/F      NON MATCH
                  01929       *SUBROUTINE RMRS2                                17 FEB 77
                  01930       *RMRS  ADJUSTS TIMEOUT COUNTER
16F3 0   8020     01931       RMRS2  DC      FIM+0
16F4 0   0022     01932              DC      /22
16F5 0   8021     01933              DC      SRC+0
16F6 0   8014     01934              DC      JCN+AZ
16F7 0   16FB     01935              DC      *+3
16F8 0   800E     01936              DC      RPM
16F9 0   800E     01937              DC      RPM
16FA 0   80F2     01938              DC      IAC         INCREMENT TIMEOUT
16FB 0   80E3     01939              DC      WPM
16FC 0   80E3     01940              DC      WPM
16FD 0   8050     01941              DC      JMS         UPDATE CHECKSUM
16FE 0   15D4     01942              DC      CHKSM
16FF 0   80C0     01943              DC      BBL+0
                  01944              END -
03C0 0   1000     01945       START  NOP
                  01946              WDISK
03C8     03C0     01947              END     START
```

APPENDIUM B

Instruction Set

Most of the instructions employed are single word instructions which are expressed on a single line of the printout. Such instructions can include a mnemonic LABEL which serves as an instruction address, a mnemonic CODE which identifies the particular machine operation to be performed and an OPERAND which is used in conjunction with the CODE to define precisely the operation to be performed by the instruction.

The OPERAND can represent a single four bit index register, a pair of such registers, data, a twelve bit memory address or a condition code. Which of these is represented depends entirely upon the CODE with which the OPERAND appears.

Some instructions are double word instructions. These are the FIM, ISZ and JCN instructions. These instructions occupy two lines in the program printout with the CODE and part of the OPERAND appearing on the first line. The remainder of the OPERAND, either data or an address depending on the CODE, appears on the second line.

| LABEL | CODE | OPERAND | EXPLANATION |
|---|---|---|---|
| | ADD | reg. | Adds register contents to accumulator. Set carry bit if necessary. |
| | ADM | | Adds last specified data RAM character, plus carry bit, to accumulator. Carry bit is set if carry results but is otherwise reset. |
| | AN6 | | The contents of index register 6 are logically ANDed with the accumulator on a bit-by-bit basis; carry bit is not affected. |
| | AN7 | | The contents of index register 7 are logically ANDED with the accumulator on a bit-by-bit basis. Carry bit is not affected. |
| | BBL | data | Used following JMS to resume execution at last address saved. Four bits of data are loaded into the accumulator. |
| | CLB | | Clear accumulator and reset carry bit to 0. |
| | CLC | | Reset carry bit to zero. |
| | CMA | | Complement each bit of the accumulator. Carry bit is not affected. |
| | CMC | | Complement the accumulator carry bit. |
| | DAA | | Decimal adjust of accumulator. If accumulator contents >9 or if carry bit = 1, increment accumulator by 6. Set carry bit only if incrementing produces carry out of high order position. |
| | DAC | | Decrement accumulator by 1. Set carry bit if there is no borrow out of high order bit position; reset otherwise. |
| XXXX | EQU | expression | XXXX is assigned the value set in the expression. |

-continued

| LABEL | CODE | OPERAND | EXPLANATION |
|---|---|---|---|
| | FIM + data | reg. pair | The data is loaded into the specified pair of four bit registers. |
| | FIN + | reg. pair | The contents of register pair 0 form the lower 8 bits of an address in the page of memory in which this instruction is located. Data at the address is loaded into the register pair specified in this instruction. |
| | IAC | | Increment accumulator by 1. Set carry bit if there is a carry out of the high order bit; reset otherwise. |
| | INC | reg. | Increment specified register by 1. Carry bit not affected. |
| | ISZ+ address | reg. | Increment specified register by 1. If result $\neq$ 0, jump to specified address. If result =0, continue with next instruction in sequence. |
| | JCN+ address | cond. | If cond. is true, jump to address. If cond. is not true, go to next instruction in sequence. cond. may be:<br>CN - carry bit $\neq$ 0<br>CZ - carry bit = 0<br>AN - accumulator $\neq$ 0<br>AZ - accumulator = 0 |
| | JIN | reg. pair | The contents of the specified register pair are transferred to the program counter. The carry bit is not affected. |
| | JMS | address | Jump to the subroutine which begins at the specified address. Instruction address which follows JMS is saved for return. |
| | JUN | address | Jump unconditionally to the specified address. |
| | LD | reg. | Load register contents into accumulator; carry bit is not affected. |
| | LDM | data | Load data into accumulator. Carry bit is not affected. |
| | NOP | | No operation. Program counter incremented by one. |
| | ORG | address | Assembly instruction. Sets location counter to specified address. Assembly continues from that location. |
| | OR4 | | Contents of index register 4 are OR'd with accumulator on a bit by bit basis. Carry bit is not affected. |
| | OR5 | | Contents of index register 5 are OR'd with accumulator on a bit by bit basis. Carry bit is not affected. |
| | RAL | | Shift accumulator left through carry. Carry bit goes to LSB of accumulator. |
| | RAR | | Shift accumulator right. Carry bit goes to MSB position. LSB goes to carry position. |
| | RDM | | Read data bus. Character from last RAM specified by SRC instruction is loaded into accumulator. |
| | RDn | | n=0,1,2,3. Read into accumulator status character n of last RAM specified by SRC instruction. |
| | RDR | | Read data bus into accumulator. Last input port specified by SRC instruction is accessed. |
| | RPM | | Reads ½ byte(4 bits) of program memory into accumulator. Need two RPM instructions in sequence. |
| | SBM | | Subtract contents of data bus from accumulator. If the result generates no borrow, the carry bit is set; otherwise, the carry bit is set. |
| | SRC | reg. pair | Accesses the RAM, ROM, input port or output port having the address specified in the register pair. |
| | STC | | Set carry bit equal to 1. |

-continued

| LABEL | CODE | OPERAND | EXPLANATION |
|---|---|---|---|
| | SUB | reg. | Subtract contents of specified register from accumulator. Set carry bit to 1 if there is no borrow out of high order bit position; otherwise, reset carry bit to zero. |
| | TCS | | If carry bit =0, accumulator set to 9. If carry bit =1, accumulator set to 10. Carry bit then reset in either case. |
| | WMP | | Writes contents of accumulator to last output port specified by an SRC instruction. |
| | WPM | | Write contents of accumulator in program RAM specified by last SRC instruction. Need two WPM instructions to transfer 1 byte. |
| | WRM | | Writes accumulator contents into last DATA RAM specified by an SRC instruction. |
| | WRn | | n=0,1,2,3. Contents of accumulator are written into status character n of the last DATA RAM register specified by an SRC instruction. |
| | XCH | reg. | The contents of the accumulator are exchanged with the contents of the specified register. The carry bit is not affected. |

APPENDIUM C

Description of Stepping Motor Operation

The stepping motors 84 and 86 which select the digits on the print wheels and the bank to be set each have four driving coils, a maximum of two of which are energized at a time. In a preferred embodiment, each motor shaft rotates through a predetermined angular increment (called a half step) when the patterns of energization for the coils changes a certain number of times. The patterns of energization must occur in a predetermined sequence in order to establish smooth rotation in the correct direction. A preferred sequence for the energization patterns is shown below where a "1" indicates a coil is energized while a "0" indicates the coil is de-energized:

| PATTERN | COIL | | | |
|---|---|---|---|---|
| NUMBER | 1 | 2 | 3 | 4 |
| 0 | 1 | 0 | 0 | 0 |
| 1 | 1 | 1 | 0 | 0 |
| 2 | 0 | 1 | 0 | 0 |
| 3 | 0 | 1 | 1 | 0 |
| 4 | 0 | 0 | 1 | 0 |
| 5 | 0 | 0 | 1 | 1 |
| 6 | 0 | 0 | 0 | 1 |
| 7 | 1 | 0 | 0 | 1 |

During execution of the STEPS subroutine, pattern numbers 1,2,3,4,5,6,7,0 are employed in sequence to cause stepping motor 86 to drive the main gear 120 to the next more significant bank. Conversely, pattern numbers 7,6,5,4,3,2,1,0 are employed sequentially to drive the main gear from one bank to the next less significant bank.

During execution of the STEPD subroutine, the entire sequence of pattern numbers must be used twice to move from one digit on the print wheel to the next. Specifically, stepping from one digit to the next greater digit requires the following sequence of patterns: 1,2,3,4,5,6,7,0,1,2,3,4,5,6,7,0.

Conversely, stepping from a digit to the next lower digit requires the reverse sequence or: 7,6,5,4,3,2,1,0,7,6,5,4,3,2,1,0.

APPENDIUM D

Format of Messages Sent to and From Control Unit 12

MESSAGE—SET POSTAGE

From Control Unit: $C_0C_1\phi D_oD_1D_2D_3$SOOOO—O

To Control Unit: $C_0C_1\phi D_oD_1D_2D_3$SB$E_1E_2$O—O $C_0$ $C_1$: Checksum (as transmitted or received)

$\phi$: Operation Code $D_o$-$D_3$: Amount of Postage to be sent

S:

=1 if printer disabled

B:

=8 if descending register less than Postage

=4 if descending register less than $100.

=/Cif both $E_1E_2$:

=1X for error during disabling

=2X for error in stepping to high order bank

=3X for error in setting digits to zero

=4X for error in stepping toward disabled

=5X for error in enabling steps

=60 for improper BCD values in data

=70 where setting is inhibited by previous error

MESSAGE—READ REGISTERS

From Control Unit: $C_0C_1$1SO—O

To Control Unit: $C_0C_1$1S$D_o$—$D_7$ O—O $C_0C_1$: Checksum

1: Op Code

S: Specific register to be read

=0 for ascending register

=1 for descending register

=2 for control sum

=3 for piece count

=4 for machine status register

=5 for meter setting

MESSAGE—PRINT POSTAGE

From Control Unit: None

To Control Unit: $C_0C_1$4$D_o$-$D_3$SBO-O $C_0C_1$: Checksum
4: Op Code
$D_oD_3$: Amount of postage to be printed.
S: Indicates whether printer was enabled (S=O) or disabled (S=1).
B: Indicates descending register status.
=4 if descending register will be less than $100.
=8 if descending register will be less than the setting.
=/C if both conditions.

MESSAGE—SET PRINTER TO ZERO
From Control Unit: $C_oC_1$60—0
To Control Unit: $C_0C_1 6E_1E_2 0$—0
$C_0C_1$: Checksum
6: Op Code
$E_1$: Type of error which occurs during setting.
=O for no error.
=1 where too many steps are required to reach the most significant digit
=2 where too many steps are required to reach $\phi$
=3 where the fifth step photocell is not seen
=4 for a stepping error in going to a lower bank
=5 for a zero photocell that doesn't turn off upon step past zero
=6 for a zero photocell that doesn't turn on upon step back to zero
=7 for error during STEPD subroutine
$E_2$: Data associated with error message.

MESSAGE—LOAD NVM MEMORY (RESTRICTED ACCESS)
From Control Unit: $C_0C_1 7R_oR_1D_o$-$D_7$ OOO
To Control Unit: $C_0C_1 7R_oR_1D_o$-$D_7$ OOO
$C_0C_1$: Checksum
7: Op Code
$R_oR_1$: Address of NVM register into which data is to be written.
$D_o$-$D_7$: Data to be loaded:

MESSAGE—READ NVM MEMORY (RESTRICTED ACCESS)
From Control Unit: $C_0\ C_1 8R_oR_1$O—O
To Control Unit: $C_0C_1 8R_oR_1D_o$—$D_7$ OOO
$C_0C_1$: Checksum
8: Op Code
$R_oR_1$: Address of register to be read.
$D_o$-$D_7$: Data in register being read.

MESSAGE—ENABLE PRINTER
From Control Unit: $C_0C_1$9O—O
To Control Unit: $C_0C_1$9EO—O
$C_0C_1$: Checksum
9: Op Code
E: Error during enabling.
=O if no error
=8 if enabling inhibited
=F if printer not enabled due to insufficient postage
=any other value for error occurring during setting MESSAGE—DISABLE PRINTER
From Control Unit: $C_0C_1$AO—O
To Control Unit: $C_0C_1$AEO—O
$C_OC_1$: Checksum
A: Op Code
E: Error during disabling.
=O for no error
≠O for error MESSAGE—ERROR IN MESSAGE
To Control Unit: $C_OC_1$3EO—O
$C_OC_1$: Checksum
3: Op Code
E: Error in Message
≠for error MESSAGE—RECHARGE METER
From Control Unit $C_OC_1 2D_O$-$D_{12}$
To Control Unit $C_OC_1 2D_O$-$D_3$EX—00
$C_OC_1$: Checksum
2: Op Code
$D_O$-$D_3$: Dollar Amount to be entered
$D_4$-$D_{12}$: Remote Meter Resetting Combination
E: Error Message
=/F Incorrect Combination
=/E Non BCD Data in Message
=/DX Error in Disabling Meter
=/C Inhibited
=/A Postage amount not accepted because if would result in overflow of descending register

What is claimed is:

1. An electronic postal metering system including:
A meter section including
a postage printer,
an electronic control for setting said postage printer and for processing and storing postal accounting and meter setting information,
a secure housing for enclosing said postage printer and said electronic control to prevent physical or electronic tampering,
a control unit for processing and storing information other than postal accounting or meter setting information, and
a communications link between said meter section and said control unit for transmitting data,
Said electronic control further including:
a data processing section for operating on data and instructions generated within the meter or transmitted from the control unit,
a printer setting means for setting the printer to desired postage amounts in accordance with signals provided by said data processing section, and
a printer setting detector array for providing input signals to said data processing section indicative of the current settings of said printer,
Said printer setting detector array including means for verifying the operability of each input from said array to said data processing section.

2. An electronic postal metering system as recited in claim 1 wherein said printer setting detector array includes:
a reference voltage source,
a plurality of detectors, each of said detectors providing a first binary signal when a predetermined printer condition exists and a second binary signal when the predetermined condition does not exist,
a plurality of comparator amplifiers, each having a first input connected to said reference voltage source and a second input connected to at least one of said plurality of detectors, and failure detect means connected to the second input of each of said comparator amplifiers for simultaneously and temporarily driving the second input to the first binary signal level.

3. An electronic postal metering system as recited in claim 1 wherein said printer setting detector array includes:

a reference voltage source, a plurality of detectors, each of said detectors providing a first binary signal when a predetermined printer condition exists and a second binary signal when the predetermined condition does not exist, a plurality of comparator amplifiers, each having a first input connected to said reference voltage source and a second input connected to at least one of said plurality of detectors, multiplexing means connected to said data processing section and to said plurality of detectors for enabling a selected detector in each set of detectors associated with a second input to one of said comparator amplifiers, said multiplexing means including failure detect means for simultaneously and temporarily driving the second input of each of said comparator amplifiers to the first binary signal level.

4. An electronic postal metering system as recited in claim 3 wherein each of said plurality of detectors includes a light source and an associated light sensitive element and wherein the light sources are divided into sets of serially-connected sources, each of said sets being connected between a particular output of said multiplexing means and a source of a second binary voltage.

5. An electronic postal metering system as recited in claim 4 wherein the light sensitive elements are separated into parallel-connected groups, with the elements in each group having a common connection to the second input terminal of one of said comparator amplifiers.

6. An electronic postal metering system as recited in claim 5 wherein said multiplexing means comprises a shift register element having data and clock inputs from said data processing section and parallel output stages, one of said stages being connected to said failure detect means and at least one other of said stages being connected to a set of serially-connected light sources.

7. An electronic postal metering system including:

a meter section including a postage printer, a central electronic processor system for setting said postage printer and for processing and storing all critical postal accounting and meter setting information, a secure housing for enclosing said postage printer and said electronic system to prevent physical or electronic tampering, a peripheral unit for processing and storing noncritical and meter setting information, and including means providing data corresponding to postage to be printed, and a communications link between said meter section and said peripheral unit for transmitting data therebetween, whereby noncritical data may be changed without affecting said critical information stored in said electronic system, Said electronic system further including a data processing section for operating on data and instructions generated within the meter or transmitted from the peripheral unit, a printer setting means for setting the printer to desired postage amounts in accordance with signals provided by said data processing section, and a printer setting detector array for providing input signals to said data processing section indicative of the current settings of said printer, Said data processing section further including:

a substantially non-volatile random access memory for storing postal accounting information, and a read-only memory for storing programs for execution in said central processor unit, and an event-indicating signal generator coupled to apply a signal to the central processor unit upon the occurrence of predetermined events, Said event-indicating signal generator further comprising:

(a) means for generating at least one electrical signal upon the occurrence of a predetermined event, and (b) means for applying event-indicating signals from said signal generating means to the data input terminals of said central processor unit, said signal generating means including:

a source of reference voltage, an event-sensing circuit for producing a first signal upon the occurrence of an event and a second signal at all other times, and a comparator amplifier having a first input connected to the source of reference voltage and a second input connected to said event-sensing circuit, said comparator amplifier producing an event-indicating signal only when said first signal applied from said event-sensing circuit is greater than the signal applied from said reference voltage source.

8. An electronic postal metering system including:

a meter section including a postage printer, a central electronic processor system for setting said postage printer and for processing and storing all critical postal accounting and meter setting information, a secure housing for enclosing said postage printer and said electronic system to prevent physical or electronic tampering, a peripheral unit for processing and storing noncritical and meter setting information, and including means providing data corresponding to postage to be printed, and a communications link between said meter section and said peripheral unit for transmitting data therebetween, whereby noncritical data may be changed without affecting said critical information stored in said electronic system, Said electronic system further including:

a data processing section for operating on data and instructions generated within the meter or transmitted from the peripheral unit, a printer setting means for setting the printer to desired postage amounts in accordance with signals provided by said data processing section, and a printer setting detector array for providing input signals to said data processing section indicative of the current settings of said printer, said data processing section further including:

a substantially non-volatile random access memory for storing postal accounting information, and a read-only memory for storing programs for execution in said central processor unit, an event-indicating signal generator coupled to apply a signal to the central processor unit upon the occurrence of predetermined events, Said event-indicating signal generator comprising:

(a) means for generating at least one electrical signal upon the occurrence of a predetermined event, and
(b) means for applying event-indicating signals from said signal generating means to the data input terminals of said central processor unit, Said signal generating means including:

a source of a reference voltage, a plurality of event-sensing circuits, each of which produces a first binary signal upon the occurrence of a predetermined event and a second binary signal at all other times, and a plurality of comparator amplifiers, each having a first input connected to the source of reference voltage and a second input connected to one of said event-sensing circuits, each comparator amplifier producing an event-indicating signal only when the first signal from the associated event-sensing circuit is greater than the signal from said source of reference voltage.

9. An electronic postal metering system as recited in claim 8 wherein said signal generating means further includes a detector circuit having inputs from a power supply for said data processing unit, said detector being adapted to produce an event-identifying signal when the output of said power supply falls below a predetermined level.

10. An electronic postal meter comprising a physically secure housing enclosing a printing mechanism and an electronic processing system, a communication link, and a peripheral unit external of said housing and connected to said processing system by way of said communication link for providing input signals corresponding to the value of postage to be printed, said electronic processing system including an electronic ascending register, storage means for storing routines for electronic accounting of postage printed by said printing mechanism, and for storing routines for preserving stored accounting data intact in the event of determined conditions, a pair of DC operating voltage terminals connected to an internal series fuse and thence to a shunt diode poled opposite to the operating voltage polarity of the postal meter, a shunt varistor connected to suppress spike voltages, and a shunt overvoltage protector to prevent the application of over-voltage to said meter.

11. The electronic postal meter of claim 10 wherein said printing mechanism has a plurality of independently settable printing wheels and clutch means for independently setting said wheels, and further comprising a first stepping motor for stepping said clutch means and a second stepping motor for stepping said print wheels sequentially.

12. The postal meter of claim 10 wherein said printing mechanism comprises a monitor connected to said processing system and including a plurality of optical detectors mounted to detect the positions of elements of said printing mechanism, said detectors being connected in a matrix of columns and rows, means for sequentially enabling said columns, and comparator means connected to said rows for producing output signals when voltages on the respective rows exceed given values.

13. The postal meter of claim 12 further comprising means for simultaneously forcing said rows to a given state for determining fault conditions in said comparator means.

14. The postal meter of claim 10 further comprising storage means for storing error checking values, means for dividing checking values from the contents of said ascending register, and means for disabling said meter when said error checking values are unequal to checking values previously stored in said storage means.

15. The postal meter of claim 10 further comprising storage means storing complements of values arithmetically derived from the contents of said ascending register, and means for comparing the complements of values derived in accordance with a determined relationship with the contents of said storage means to produce error signals for disabling said postal meter.

16. In an electronic postal meter having an electronic accounting system connected to control a postage printing device, and wherein means are provided for applying data and control signals to said electronic accounting system, the improvement wherein said electronic accounting system includes a memory, means responsive to determined errors in said signals for storing the number of said determined errors that have occurred in said signals in said memory, and means responsive to the storage of a count of a predetermined number of said errors in said memory for disabling further operation of said postal meter.

17. The electronic postal meter of claim 16 wherein said memory is a non-volatile memory.

18. The electronic postal meter of claim 16 wherein said means applying data and control signals comprises a plurality of manually operable keys on said postal meter for applying signals to said electronic accounting system related to an amount of postage to be printed.

19. The electronic postal meter of claim 16 further comprising means responsive to determined error conditions for disabling said postal meter even in the absence of the storage of said predetermined number of errors in said memory.

20. A method for controlling an electronic postal meter having an electronic accounting system, a postage printing device and a source of data and control signals coupled to said accounting system, comprising detecting error conditions in said signals, storing the number of said detected error conditions that have occurred, and disabling said postal meter when said number reaches a determined value.

21. The method of claim 20 further comprising detecting determined further error conditions in said postal meter, and disabling said postal meter in response thereto in the absence of the occurrence of said determined number of first mentioned error conditions.

* * * * *